(12) United States Patent
Guan et al.

(10) Patent No.: US 12,118,205 B2
(45) Date of Patent: Oct. 15, 2024

(54) SPLIT-SCREEN DISPLAY METHOD AND ELECTRONIC DEVICE

(71) Applicant: Huawei Technologies Co., Ltd., Guangdong (CN)

(72) Inventors: Chi Guan, Nanjing (CN); Jianfeng Wang, Shenzhen (CN); Hongkai Su, Nanjing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/780,915

(22) PCT Filed: Nov. 12, 2020

(86) PCT No.: PCT/CN2020/128357
§ 371 (c)(1),
(2) Date: May 27, 2022

(87) PCT Pub. No.: WO2021/104030
PCT Pub. Date: Jun. 3, 2021

(65) Prior Publication Data
US 2022/0413695 A1    Dec. 29, 2022

(30) Foreign Application Priority Data
Nov. 30, 2019  (CN) .......................... 201911212028.0

(51) Int. Cl.
*G06F 3/04886* (2022.01)
*G06F 21/32* (2013.01)

(52) U.S. Cl.
CPC .......... *G06F 3/04886* (2013.01); *G06F 21/32* (2013.01); *G06F 2203/04803* (2013.01)

(58) Field of Classification Search
CPC ................. G06F 3/04886; G06F 21/32; G06F 2203/04803
See application file for complete search history.

(56) References Cited

U.S. PATENT DOCUMENTS

| | | | |
|---|---|---|---|
| 9,575,708 B2 * | 2/2017 | Park | G06F 1/1647 |
| 10,417,019 B2 | 9/2019 | Choi | |
| 10,664,158 B2 * | 5/2020 | Kim | G06F 3/0482 |
| 10,691,786 B1 * | 6/2020 | Park | G06F 3/0488 |
| 2009/0044116 A1 | 2/2009 | Kitabayashi | |
| 2012/0122577 A1 | 5/2012 | Aronzon | |
| 2012/0284789 A1 * | 11/2012 | Kim | H04W 4/021 726/19 |

(Continued)

FOREIGN PATENT DOCUMENTS

| | | |
|---|---|---|
| CN | 105573614 A | 5/2016 |
| CN | 107168624 A | 9/2017 |

(Continued)

*Primary Examiner* — Tadesse Hailu
(74) *Attorney, Agent, or Firm* — WOMBLE BOND DICKINSON (US) LLP

(57) ABSTRACT

A split-screen display method and an electronic device are provided. The method may be applied to the field of human-machine interaction. The method includes: A user enters an operation for a split-screen display area, for example, taps a lock control in a split-screen display area; and the electronic device locks display content in the split-screen display area in response to the operation.

20 Claims, 37 Drawing Sheets

(56) References Cited

U.S. PATENT DOCUMENTS

| | | | |
|---|---|---|---|
| 2013/0120295 A1* | 5/2013 | Kim | G06F 3/0486 345/173 |
| 2013/0222321 A1* | 8/2013 | Buening | G06F 3/04886 345/173 |
| 2013/0263042 A1* | 10/2013 | Buening | G06F 3/04883 715/783 |
| 2013/0300684 A1* | 11/2013 | Kim | G06F 3/0488 345/173 |
| 2013/0346912 A1* | 12/2013 | Buening | G06F 3/0482 715/783 |
| 2014/0164941 A1* | 6/2014 | Kim | G06F 3/0488 715/741 |
| 2015/0365306 A1* | 12/2015 | Chaudhri | G06F 3/0484 715/753 |
| 2017/0075517 A1* | 3/2017 | Na | G06F 3/04883 |
| 2017/0245017 A1* | 8/2017 | Chaudhri | H04N 21/47205 |
| 2017/0344253 A1* | 11/2017 | Zhang | H04M 1/72484 |
| 2018/0143734 A1 | 5/2018 | Ochenas et al. | |
| 2018/0188950 A1 | 7/2018 | Choi et al. | |
| 2018/0203578 A1 | 7/2018 | Murphy | |
| 2019/0370448 A1* | 12/2019 | Devine | G06V 40/67 |
| 2020/0320906 A1* | 10/2020 | Knarr | G06F 1/1626 |
| 2021/0311683 A1* | 10/2021 | Jin | G06F 3/1423 |

FOREIGN PATENT DOCUMENTS

| | | |
|---|---|---|
| CN | 107728901 A | 2/2018 |
| CN | 108108076 A | 6/2018 |
| CN | 108416203 A | 8/2018 |
| CN | 109408174 A | 3/2019 |
| CN | 110140342 A | 8/2019 |
| CN | 110231905 A | 9/2019 |
| CN | 110362244 A | 10/2019 |
| CN | 110456951 A | 11/2019 |
| CN | 110471604 A | 11/2019 |
| CN | 110471725 A | 11/2019 |

* cited by examiner

SPLIT-SCREEN DISPLAY METHOD AND ELECTRONIC DEVICE

CROSS-REFERENCE TO RELATED APPLICATIONS

This application is a National Stage of International Application No. PCT/CN2020/128357 filed on Nov. 12, 2020, which claims priority to Chinese Patent Application No. 201911212028.0, filed on Nov. 30, 2019, both of which are hereby incorporated by reference in their entireties.

TECHNICAL FIELD

This application relates to the field of human-machine interaction, and in particular, to a split-screen display method and an electronic device.

BACKGROUND

As mobile communication technologies continuously develop, there are more types of applications on a smart terminal, and services provided by an application also become more complex and diversified. For example, a user may view content of a WeChat official account by using a WeChat application, and may also chat with another user by using the WeChat application. However, in the conventional technology, a display of the smart terminal can display only one display interface of the application at a same moment. In some scenarios, in a process of viewing content of an official account, the user receives a WeChat message sent by another user. If the user wants to reply to the chat message in a timely manner, the user needs to switch the WeChat application to a chat interface to reply, and then switch back to a display interface of the official account to continue viewing. In this manner, the user needs to frequently switch between a plurality of display interfaces of the WeChat application, resulting in complex operations and poor user experience.

SUMMARY

Embodiments of this application provide a split-screen display method and an electronic device, to lock display content in a split-screen display area.

According to a first aspect, this application provides a split-screen display method. The method includes: An electronic device displays a first interface of a first application in a first display area of a display, and displays a second interface of a second application in a second display area of the display. The electronic device receives a first operation entered by a user, and the electronic device displays a home screen of the electronic device on the display in full screen in response to the first operation. The electronic device displays a third interface of a third application in the first display area, and displays a fourth interface of a fourth application in the second display area. The electronic device receives a third operation entered by the user in the first display area. The electronic device receives a fourth operation entered by the user. In response to the fourth operation, the electronic device displays the third interface in the first display area, and displays the home screen in the second display area. An operation manner of the fourth operation is the same as that of the first operation. In this manner, the user can conveniently lock display content in a split-screen display area, to improve user operation efficiency.

In one embodiment, when the electronic device displays the third interface in the first display area, and displays the home screen in the second display area, the electronic device receives a fifth operation entered by the user for the third interface. In response to the fifth operation, the electronic device displays the third interface in the first display area, and displays a fifth interface of the third application in the second display area.

In one embodiment, when the electronic device displays the third interface in the first display area, and displays the fifth interface of the third application in the second display area, the electronic device receives a sixth operation entered by the user in the second display area. The electronic device receives a seventh operation entered by the user for the third interface. In response to the seventh operation, the electronic device displays a sixth interface of the third application in the first display area, and displays the fifth interface in the second display area.

In one embodiment, when the electronic device displays the first interface in the first display area, and displays the second interface in the second display area, the electronic device receives an eighth operation entered by the user. The electronic device displays a seventh interface on the display in full screen in response to the eighth operation. The seventh interface includes interface content of the first interface and interface content of the second interface. When the electronic device displays the third interface in the first display area, and displays the home screen in the second display area, the electronic device receives a ninth operation entered by the user. In response to the ninth operation, the electronic device displays the third interface in the first display area, and displays an eighth interface in the second display area. The eighth interface includes interface content of the first interface, interface content of the second interface, and interface content of the fourth interface. An operation manner of the ninth operation is the same as that of the eighth operation.

In one embodiment, when the electronic device displays the first interface in the first display area, and displays the second interface in the second display area, the electronic device receives a tenth operation entered by the user. The electronic device displays interface content of the first interface or interface content of the second interface on the display in full screen in response to the tenth operation. When the electronic device displays the third interface in the first display area, and displays the fourth interface in the second display area, the electronic device receives an eleventh operation entered by the user in the first display area. An operation manner of the eleventh operation is the same as that of the third operation. The electronic device receives a twelfth operation entered by the user. In response to the twelfth operation, the electronic device displays the third interface in the first display area, and displays the home screen in the second display area.

In one embodiment, the first display area includes a first control, and the second display area includes a second control. Before that the electronic device receives a third operation entered by the user in the first display area, the first control is displayed in a first state, and the second control is displayed in the first state. The method further includes: the electronic device switches, in response to the third operation, the first control from being displayed in the first state to being displayed in a second state.

In one embodiment, after that the electronic device receives a third operation entered by the user in the first display area, the method further includes: the electronic device receives a thirteenth operation entered by the user for the first control, and the electronic device verifies a user identity in response to the thirteenth operation. If the verification succeeds, the electronic device switches the first control from being displayed in the second state to being displayed in the first state.

In one embodiment, after that the electronic device receives a third operation entered by the user in the first display area, the method further includes: the electronic device obtains a biometric feature of the user. The electronic device determines that the biometric feature matches a pre-stored biometric feature. The electronic device receives a fourteenth operation entered by the user for the first control, and the electronic device switches, in response to the fourteenth operation, the first control from being displayed in the second state to being displayed in the first state.

In one embodiment, after that the electronic device receives a third operation entered by the user in the first display area, the method further includes: the electronic device obtains a biometric feature of the user. The electronic device determines that the biometric feature does not match a pre-stored biometric feature. The electronic device receives a fifteenth operation entered by the user, and the electronic device verifies a user identity in response to the fifteenth operation. If the verification succeeds, the electronic device switches the first control from being displayed in the second state to being displayed in the first state.

According to a second aspect, this application provides an electronic device, including one or more memories, a foldable display, and one or more memories. The one or more memories are coupled to the one or more processors. The foldable display communicates with the one or more processors. The one or more memories are configured to store computer program code. The computer program code includes computer instructions. When the one or more processors execute the computer instructions, the electronic device is enabled to perform the split-screen display method according to any one of the first aspect and the possible implementations of the first aspect.

According to a third aspect, this application provides a computer storage medium, including computer instructions. When the computer instructions are run on an electronic device, the electronic device is enabled to perform the split-screen display method according to any one of the first aspect and the possible implementations of the first aspect.

According to a fourth aspect, this application provides a computer program product. When the computer program product runs on a computer, the computer is enabled to perform the split-screen display method according to any one of the first aspect and the possible implementations of the first aspect.

In this embodiment of this application, the user enters an operation for a split-screen display area, for example, taps a lock control in a split-screen display area. The electronic device locks display content in the split-screen display area in response to the operation. According to the method in this embodiment of this application, display content in a split-screen display area can be conveniently locked, to improve user operation efficiency.

BRIEF DESCRIPTION OF DRAWINGS

To describe the technical solutions in embodiments of this application or in the conventional technology more clearly, the following briefly describes the accompanying drawings required for describing embodiments or the conventional technology.

DESCRIPTION OF EMBODIMENTS

Figure 1A:
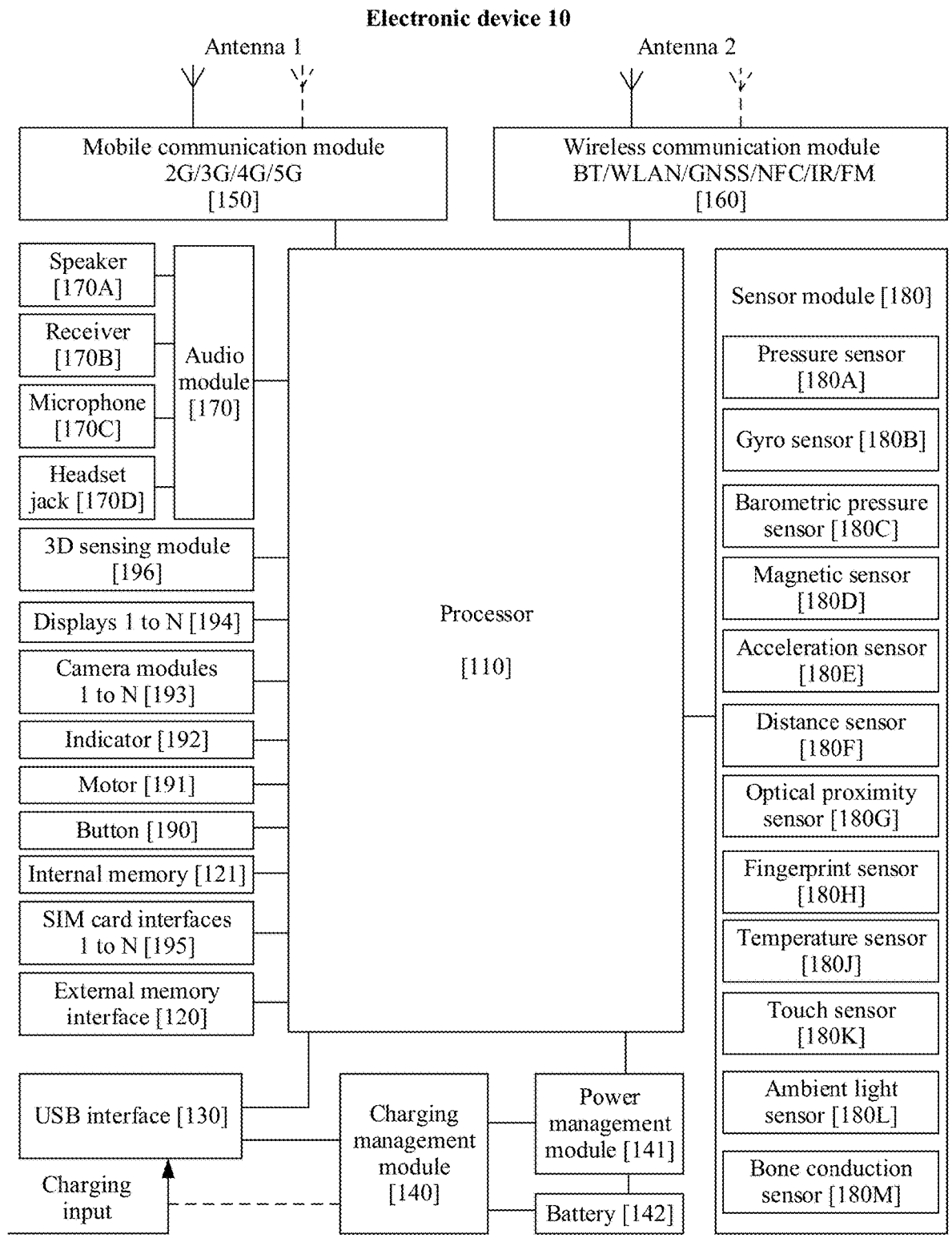
FIG. 1A is a schematic diagram of a structure of an electronic device according to an embodiment of this application.

The following describes the technical solutions in embodiments of this application in more detail.

Terms used in the following embodiments of this application are only intended to describe particular embodiments, and are not intended to limit this application. Terms "one", "a", "the", "the foregoing", "this", and "the one" of singular forms used in this specification and the appended claims of this application are also intended to include plural forms, unless otherwise specified in the context clearly. It should further be understood that the term "and/or" used in this application indicates and includes any one or all of possible combinations of one or more listed items.

The following describes an electronic device, a user interface used for such an electronic device, and an embodiment for using such an electronic device. In some embodiments, the electronic device may be a portable electronic device that further includes another function, for example, a personal digital assistant function and/or a music player function, for example, a mobile phone, a tablet computer, or a wearable electronic device (for example, a smartwatch) having a wireless communication function. The portable electronic device may alternatively be another portable electronic device, for example, a laptop having a touch-sensitive surface or a touch panel. It should further be understood that, in some other embodiments, the electronic device may not be a portable electronic device, but is a desktop computer having a touch-sensitive surface or a touch panel.

The term "user interface (UI)" in the specification, claims, and accompanying drawings of this application is a medium interface for interaction and information exchange between a user and an application or an operating system, and the user interface implements conversion between an internal form of information and a form that can be accepted by the user. A user interface of an application is source code written in a specific computer language, for example, Java or an extensible markup language (XML). The interface source code is parsed and rendered on an electronic device 300, and is finally presented as content that can be identified by the user, for example, a control, for example, a picture, a text, or a button. A control is a basic element of a user interface. Typical controls include a button, a widget, a toolbar, a menu bar, a text box, a scrollbar, a picture, and a text. An attribute and content of the control on the interface are defined by using a tag or a node. For example, the control included in the interface is defined in the XML by using a node, for example, <Textview>, <ImgView>, or <VideoView>. One node corresponds to one control or one attribute on the interface. After being parsed and rendered, the node is presented as content visible to the user. In addition, interfaces of many applications such as a hybrid application usually further include a web page. A web page, also referred to as a page, may be understood as a special control that is embedded in an interface of an application. The web page is source code written in a specific computer language, for example, a hypertext markup language (HTML), a cascading style sheet (CSS), or a JavaScript (JS). A browser or a web page display component whose function is similar to that of a browser may load and display the web page source code as content that can be identified by the user. Specific content included in the web page is also defined by using a tag or a node in the web page source code. For example, the HTML defines an element and an attribute of the web page by using <p>, <img>, <video>, or <canvas>.

The user interface is usually in a representation form of a graphical user interface (GUI), which is a user interface that is related to a computer operation and that is displayed in a graphical manner. The graphical user interface may be an interface element, for example, a window or a control displayed on a display of the electronic device.

The term "activity" in the specification, claims, and accompanying drawings of this application is one of basic Android components. An activity may provide a graphical user interface for the electronic device, to implement interaction between the electronic device and the user. In an Android architecture, one application includes a plurality of user interfaces. For example, a WeChat application may include a chat interface and a message list interface. Each user interface corresponds to one activity, and a plurality of activities corresponding to the plurality of user interfaces constitute one application activity stack, namely, one task. These activities are queued and stored in one stack based on a starting sequence. The electronic device manages the activity by using the stack.

In most cases, a home screen (launcher interface) of the electronic device 10 is a start point of a task. When the user touches an icon (or a shortcut on the home screen) in an application starter, a task of the application appears in the foreground. If the application has no task (that is, the application is not used recently), a new task is created, and an initial activity of the application is started as a root activity in the stack.

When a current activity starts another activity, the new activity is pushed to the top of the stack, and becomes a focus. A previous activity remains in the stack but is in a stop state. When an activity is stopped, a system retains a current state of a user interface of the activity. When the user presses a "back" button, the current activity pops up from the top of the stack (that is, the activity is destroyed), and the previous activity is restored for execution (that is, a previous state of a UI of the previous activity is restored). The activities in the stack are not rearranged, and only pushed into or pop up from the stack, that is, are pushed into the stack when being started by the current activity, and pop up from the stack when being exited by the user by using the "back" button.

In some embodiments of this application, if the electronic device displays a display interface of an application in full screen, there is a task stack of the application on the electronic device. If the electronic device displays a plurality of display areas in a split-screen manner, there are a plurality of task stacks corresponding to the plurality of display areas on the electronic device, and one display area corresponds to one task stack. One task stack may include activities of one or more applications. For example, refer to a user interface 31 shown in FIG. 3A. The display of the electronic device includes two display areas, namely, a display area 221 and a display area 223. The display area 221 may correspond to an activity task stack A, and the display area 223 corresponds to an activity task stack B.

In some embodiments of this application, the electronic device provides a split screen locking function. When the display of the electronic device is split, the display of the electronic device is split into two or more display areas. One display area may display an interface of one application, and one display area may include one lock control. For example, refer to the user interface 31 shown in FIG. 3A. The display of the electronic device includes two display areas, namely, the display area 221 and the display area 223. The display area 221 is used to display a chat interface of an instant messaging application (for example, QQ), and the display area 223 is used to display an interface of another instant messaging application (for example, WeChat (WeChat)). The display area 221 includes a lock control 225, and the display area 223 includes a lock control 227. Both the lock control 225 and the lock control 227 are displayed in an unlocking state. When a user operation performed by the user on the lock control 227 is detected, the electronic device switches a display status of the lock control 227 to a locking state (refer to a display state of the lock control 227 in FIG. 3B) in response to the user operation, and switches a task stack corresponding to the display area in which the lock control is located to a locked state. After the task stack is switched to the locked state, no new activity is added to a task stack corresponding to a first display area, or no new activity other than an activity of a first application is added to a task stack corresponding to a first display area. In this manner, the electronic device locks display content in the first display area.

First, an example electronic device 10 provided in the following embodiments of this application is described.

FIG. 1A is a schematic diagram of a structure of the electronic device 10.

The electronic device 10 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera module 193, a display 194, a subscriber identity module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180G, a temperature sensor 180J, a touch sensor 180K, an ambient light sensor 180L, a bone conduction sensor 180M, and the like.

It may be understood that the structure shown in this embodiment of the present disclosure constitutes no specific limitation on the electronic device 10. In some other embodiments of this application, the electronic device 10 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (AP), a central processing unit (CPU), a graphics processing unit (GPU), a neural-network processing unit (NPU), a modem processor, an image signal processor (ISP), a controller, a memory, a video codec, a digital signal processor (DSP), a baseband processor, and the like. Different processing units may be independent components, or may be integrated into one or more processors. In some embodiments, the electronic device 10 may alternatively include one or more processors 110.

The controller may be a nerve center and a command center of the electronic device 10. The controller may generate an operation control signal based on an instruction operation code and a time sequence signal, to complete control of instruction fetching and instruction execution.

A memory may further be disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor 110 may directly invoke the instructions or the data from the memory. This avoids repeated access and reduces a waiting time of the processor 110, thereby improving efficiency of the electronic device 10.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes a serial data line (SDA) and a serial clock line (SCL). In some embodiments, the processor 110 may include a plurality of groups of I2C buses.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170.

The PCM interface may also be configured to perform audio communication, and sample, quantize, and code an analog signal. In some embodiments, the audio module 170 may be coupled to the wireless communication module 160 through a PCM bus interface.

The UART interface is a universal serial data line, and is configured to perform asynchronous communication. The bus may be a two-way communication bus. The bus converts to-be-transmitted data between serial communication and parallel communication.

The MIPI interface may be configured to connect the processor 110 to peripheral components such as the display 194 and the camera module 193. The MIPI interface includes a camera serial interface (CSI), a display serial interface (DSI), and the like. In some embodiments, the processor 110 communicates with the display 194 through the DSI interface, to implement a display function of the electronic device 10.

The GPIO interface may be configured by using software. The GPIO interface may be configured as a control signal, or may be configured as a data signal. In some embodiments, the GPIO interface may be configured to connect the processor 110 to the display 194, the wireless communication module 160, the audio module 170, the sensor module 180, and the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB Type-C interface, or the like. The USB interface 130 may be configured to connect to a charger to charge the electronic device 10, or may be configured to transmit data between the electronic device 10 and a peripheral device.

It may be understood that an interface connection relationship between the modules that is shown in this embodiment of the present disclosure is merely an example for description, and constitutes no limitation on the structure of the electronic device 10. In some other embodiments, the electronic device 10 may alternatively use an interface connection manner different from that in the foregoing embodiment, or use a combination of a plurality of interface connection manners.

The charging management module 140 is configured to receive a charging input from the charger. The charger may be a wireless or wired charger. When charging the battery 142, the charging management module 140 may further supply power to the electronic device by using the power management module 141.

The power management module 141 is configured to connect to the battery 142, the charging management module 140, and the processor 110. The power management module 141 receives an input from the battery 142 and/or the charging management module 140, and supplies power to the processor 110, the internal memory 121, an external memory, the display 194, the camera module 193, the wireless communication module 160, and the like.

A wireless communication function of the electronic device 10 may be implemented through the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 10 may be configured to cover one or more communication frequency bands. Different antennas may be multiplexed to improve antenna utilization. For example, the antenna 1 may be multiplexed as a diversity antenna of a wireless local area network. In some other embodiments, the antenna may be used in combination with a tuning switch.

The mobile communication module 150 may provide a solution that includes wireless communication such as 2G, 3G, 4G, and 5G and that is applied to the electronic device 10. The mobile communication module 150 may include at least one filter, a switch, a power amplifier, a low noise amplifier (LNA), and the like.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low-frequency baseband signal is transmitted to the application processor. The application processor outputs a sound signal through an audio device (which is not limited to the speaker 170A, the receiver 170B, and the like), or displays an image or a video on the display 194. In some embodiments, the modem processor may be an independent component. In some other embodiments, the modem processor may be independent of the processor 110, and disposed in a same component as the mobile communication module 150 or another function module.

The wireless communication module 160 may provide a solution that includes wireless communication such as a wireless local area network (WLAN) (for example, a wireless fidelity (Wi-Fi) network), Bluetooth (Bluetooth, BT), a global navigation satellite system (GNSS), frequency modulation (FM), near field communication (NFC), an infrared (IR) technology and that is applied to the electronic device 10. The wireless communication module 160 may be one or more components integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2. For example, the wireless communication module 160 may include a Bluetooth module, a Wi-Fi module, and the like.

In some embodiments, the antenna 1 of the electronic device 10 is coupled to the mobile communication module 150, and the antenna 2 is coupled to the wireless communication module 160, so that the electronic device 10 may communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like.

The electronic device 10 may implement a display function through the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs, which execute instructions to generate or change display information.

The display 194 is configured to display an image, a video, and the like. The display 194 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, quantum dot light emitting diodes (QLEDs), or the like. In some embodiments, the electronic device 10 may include one or N displays 194, where N is a positive integer greater than 1.

The electronic device 10 may implement a photographing function through the camera module 193, the ISP, the video codec, the GPU, the display 194, the application processor AP, the neural-network processing unit NPU, and the like.

The camera module 193 may be configured to collect color image data of a shot object. The ISP may be configured to process the color image data collected by the camera module 193.

The digital signal processor is configured to process a digital signal, and may further process another digital signal in addition to the digital image signal. For example, when the electronic device 10 selects a frequency, the digital signal processor is configured to perform Fourier transform and the like on frequency energy.

The video codec is configured to compress or decompress a digital video. The electronic device 10 may support one or more types of video codecs. In this way, the electronic device 10 can play or record videos in a plurality of encoding formats, for example, moving picture experts group (MPEG)-1, MPEG-2, MPEG-3, and MPEG-4.

The NPU is a neural-network (NN) computing processor, quickly processes input information by referring to a structure of a biological neural network, for example, by referring to a mode of transfer between human brain neurons, and may further continuously perform self-learning. The NPU can implement applications such as intelligent cognition of the electronic device 10, for example, image recognition, facial recognition, speech recognition, and text understanding.

The external memory interface 120 may be configured to connect to an external memory card, for example, a micro SD card, to extend a storage capability of the electronic device 10. The external storage card communicates with the processor 110 through the external memory interface 120, to implement a data storage function. For example, data such as music, a photo, and a video are stored in the external memory card.

The internal memory 121 may be configured to store one or more computer programs, and the one or more computer programs include instructions. The processor 110 may run the foregoing instructions stored in the internal memory 121, so that the electronic device 10 is enabled to perform a photographing preview method of an electronic device, various function applications, data processing, and the like provided in some embodiments of this application. The internal memory 121 may include a program storage area and a data storage area. The program storage area may store an operating system. The program storage area may further store one or more applications (for example, Gallery and Contacts), and the like. The data storage area may store data (for example, a picture and a contact) created during use of the electronic device 10. In addition, the internal memory 121 may include a high-speed random access memory, and may further include a non-volatile memory, for example, at least one magnetic disk storage component, a flash component, or a universal flash storage (, UFS).

The electronic device 10 may implement an audio function, for example, music playing or recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may further be configured to encode and decode an audio signal.

The speaker 170A, also referred to as a "loudspeaker", is configured to convert an audio electrical signal into a sound signal. The electronic device 10 may be used to listen to music or answer a call in a hands-free mode through the speaker 170A.

The receiver 170B, also referred to as an "earpiece", is configured to convert an audio electrical signal into a sound signal. When a call is answered or voice information is listened to by using the electronic device 10, the receiver 170B may be put close to a human ear to listen to a voice.

The microphone 170C, also referred to as a "mike" or a "mic", is configured to convert a sound signal into an electrical signal. When making a call or sending voice information, a user may make a sound near the microphone 170C through the mouth of the user, to input a sound signal to the microphone 170C. At least one microphone 170C may be disposed in the electronic device 10.

The headset jack 170D is configured to connect to a wired headset. The headset jack 170D may be the USB interface 130, or may be a 3.5 mm open mobile terminal platform (OMTP) standard interface or a cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are many types of pressure sensors 180A, for example, a resistive pressure sensor, an inductive pressure sensor, and a capacitive pressure sensor. The capacitive pressure sensor may include at least two parallel plates made of conductive materials. When force is exerted on the pressure sensor 180A, capacitance between electrodes changes. The electronic device 10 determines pressure intensity based on a capacitance change. When a touch operation is performed on the display 194, the electronic device 10 detects intensity of the touch operation through the pressure sensor 180A. The electronic device 10 may also calculate a touch location based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on an icon of a messaging application, an instruction for viewing an SMS message is executed. When a touch operation whose touch operation intensity is greater than or equal to the first pressure threshold is performed on the icon of the messaging application, an instruction for creating an SMS message is executed.

The gyro sensor 180B may be configured to determine a motion posture of the electronic device 10. In some embodiments, angular velocities of the electronic device 10 around three axes (namely, axes x, y, and z) may be determined through the gyro sensor 180B. The gyro sensor 180B may be configured to perform image stabilization during shooting.

The barometric pressure sensor 180C is configured to measure barometric pressure. In some embodiments, the electronic device 10 calculates an altitude based on a barometric pressure value measured by the barometric pressure sensor 180C, to assist in positioning and navigation.

The magnetic sensor 180D includes a Hall effect sensor. The electronic device 10 may detect opening and closing of a flip cover by using the magnetic sensor 180D.

The acceleration sensor 180E may detect magnitude of accelerations of the electronic device 10 in various directions (generally on three axes), and may detect a magnitude and a direction of gravity when the electronic device 10 is still. The acceleration sensor 180E may further be configured to identify a posture of the electronic device, and is used in an application, for example, switching between a landscape mode and a portrait mode or a pedometer.

The distance sensor 180F is configured to measure a distance. The electronic device 10 may measure a distance in an infrared or laser manner. In some embodiments, in a shooting scenario, the electronic device 10 may measure a distance by using the distance sensor 180F to implement quick focusing.

The optical proximity sensor 180G may include, for example, a light-emitting diode (LED) and an optical detector, for example, a photodiode. The light-emitting diode may be an infrared light-emitting diode. The electronic device 10 emits infrared light by using the light-emitting diode. The electronic device 10 detects infrared reflected light from a nearby object by using the photodiode. When sufficient reflected light is detected, it may be determined that there is an object near the electronic device 10. When insufficient reflected light is detected, the electronic device 10 may determine that there is no object near the electronic device 10.

The ambient light sensor 180L is configured to sense ambient light brightness. The electronic device 10 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the electronic device 10 is in a pocket, to prevent an accidental touch.

The fingerprint sensor 180G is configured to collect a fingerprint. The electronic device 10 may implement fingerprint-based unlocking, application access locking, fingerprint-based photographing, fingerprint-based call answering, and the like by using a feature of the collected fingerprint. In this embodiment of this application, the electronic device 10 may further release a locked state of a display area by using the fingerprint feature collected by the fingerprint sensor 180G, to switch the display area from the locked state to an unlocked state.

The temperature sensor 180J is configured to detect a temperature. In some embodiments, the electronic device 10 executes a temperature processing policy based on the temperature detected by the temperature sensor 180J. For example, when the temperature reported by the temperature sensor 180J exceeds a threshold, the electronic device 10 lowers performance of a processor located near the temperature sensor 180J, to reduce power consumption to implement thermal protection. In some other embodiments, when the temperature is less than another threshold, the electronic device 10 heats the battery 142 to prevent the electronic device 10 from being shut down abnormally due to a low temperature.

The touch sensor 180K may also be referred to as a touch panel or a touch-sensitive surface. The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor 180K. The touch sensor may transfer the detected touch operation to the application processor to determine a type of a touch event. A visual output related to the touch operation may be provided through the display 194. In some other embodiments, the touch sensor 180K may alternatively be disposed on a surface of the electronic device 10 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, and receive a blood pressure beating signal.

The button 190 includes a power button, a volume button, and the like. The button 190 may be a mechanical button, or a touch button. The electronic device 10 may receive a button input, and generate a button signal input related to user settings and function control of the electronic device 10.

The motor 191 may generate a vibration prompt. The motor 191 may be used for an incoming call vibration prompt or a touch vibration feedback. For example, in this embodiment of this application, touch operations performed on a lock control in different manners may correspond to different vibration feedback effects. For example, touch operations of tapping the lock control and touching and holding the lock control may correspond to different vibration feedback effects. A touch vibration feedback effect may further be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 10. The electronic device 10 interacts with a network through the SIM card, to implement functions such as calling and data communication. In some embodiments, the electronic device 10 uses an eSIM, namely, an embedded SIM card. The eSIM card may be embedded in the electronic device 10, and cannot be separated from the electronic device 10.

The electronic device 10 shown as an example in FIG. 1A may display, through the display 194, user interfaces described in the following embodiments. The electronic device 10 may detect a touch operation on each user interface by using the touch sensor 180K, for example, a tapping operation on each user interface (for example, a touch operation or a double-tapping operation on an icon), for another example, an upward or downward swipe operation or an operation of making a circle drawing gesture on each user interface. In some embodiments, the electronic device 10 may detect, by using the gyro sensor 180B, the acceleration sensor 180E, or the like, a motion gesture made by the user by holding the electronic device 10, for example, shaking the electronic device. In some embodiments, the electronic device 10 may detect a non-touch gesture operation by using the camera module 193 (for example, a 3D camera or a depth camera).

It may be understood that the structure shown in FIG. 1A constitutes no any specific limitation on the electronic device 10. In some other embodiments of this application, the electronic device 10 may include more or fewer components than those shown in FIG. 1A, or some components may be combined, or some components may be split, or there may be a different component layout. The components shown in the figure may be implemented by hardware, software, or a combination of software and hardware.

In this embodiment of this application, a software system of the electronic device 10 may use a layered architecture, an event-driven architecture, a microkernel architecture, a microservice architecture, or a cloud architecture. In this embodiment of this application, an Android system with a layered architecture is used as an example to describe a software structure of the electronic device 10.

Figure 1B:
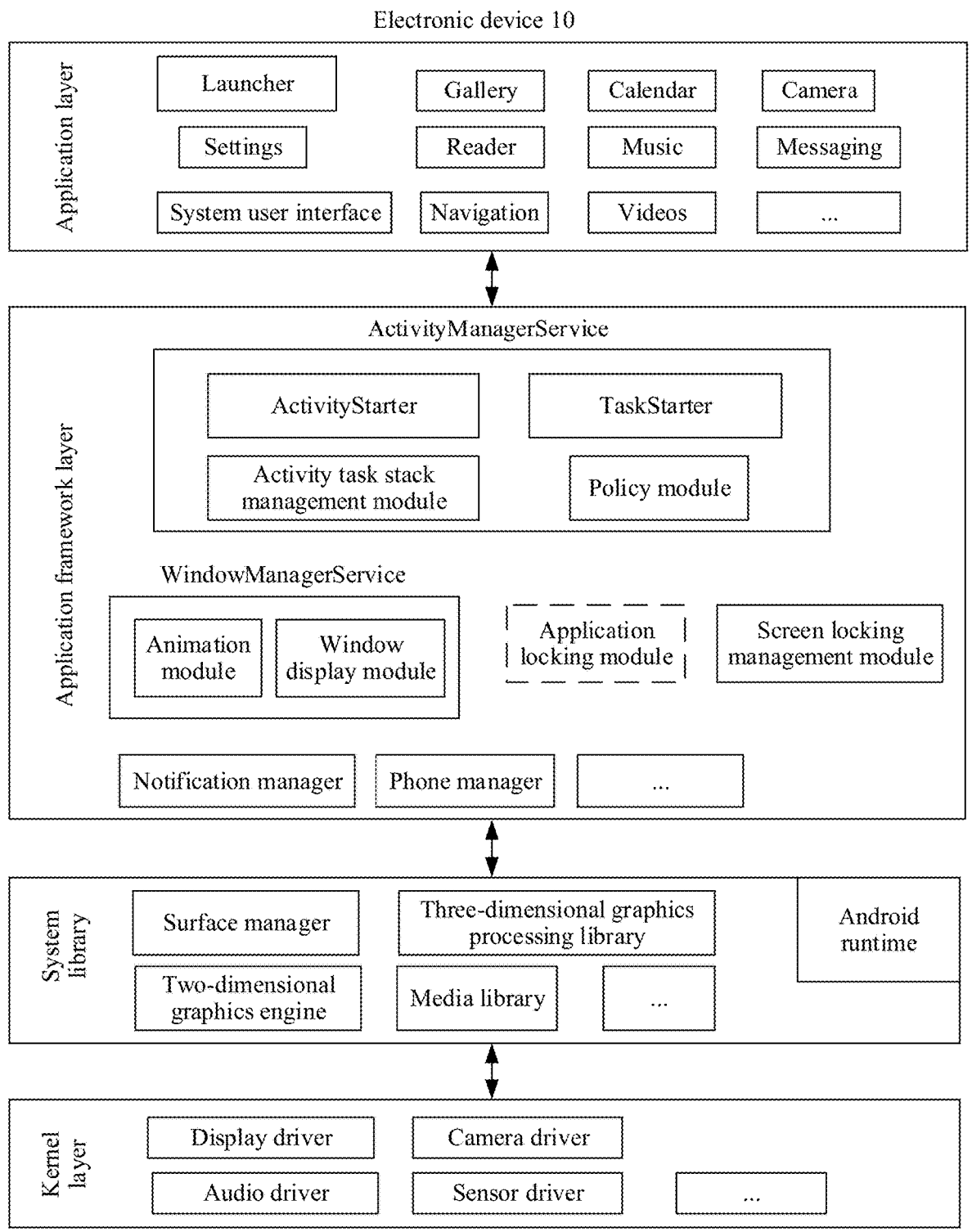
FIG. 1B is a block diagram of a software structure of an electronic device according to an embodiment of this application.

FIG. 1B is a block diagram of the software structure of the electronic device 10 according to an embodiment of this application.

In the layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include one or more applications. FIG. 1B shows examples of applications such as a launcher, a system user interface, Settings, Camera, Gallery, Calendar, Navigation, Books, Music, Videos, and Messaging. In addition, the application layer may further include another application, for example, Phone, a game application, an instant messaging application, or a shopping application, and the like.

The launcher is one of main program components in the Android system. The electronic device 10 starts an Android home screen by using the launcher.

The system UI is a system interface of the Android system. The system UI may include a status bar at the upper part of a user interface of the electronic device 10, and a navigation bar, a keyguard, a power user interface (Power UI), a recent task interface, and the like at the lower part of the user interface of the electronic device 10. In this embodiment of this application, the system UI adjusts, based on a detected operation of tapping a lock control by a user, a display status of a task stack by using a policy module. For example, a locked state of the task stack is switched and displayed as an unlocked state, or an unlocked state of the task stack is switched and displayed as a locked state.

The Settings is an application of the electronic device 10. The user may select various function options of the electronic device 10 through customization by using the Settings, for example, Bluetooth, a Global Positioning System (GPS), and Wi-Fi. The user may further modify various setting options of the electronic device through customization by using the Settings, for example, the brightness of the display, a volume, and a display font size. In some embodiments of this application, the user may select a split screen locking function, provided in this embodiment of this application, through customization by using the Settings, to enable or disable the split screen locking function. For example, when the split screen locking function is enabled, the electronic device 10 is in a split-screen display scenario, and lock controls may be displayed in a plurality of display areas of the display of the electronic device 10. The user may perform tapping (or may perform another operation, for example, double tapping or touching and holding) on the lock control to lock display content in a display area. When the split screen locking function is disabled, the electronic device 10 is in a split-screen display scenario, no lock control is displayed in a plurality of display areas of the display of the electronic device 10.

The application framework layer provides an application programming interface (API) and a programming framework for an application at the application layer. The application framework layer includes some predefined functions. As shown in FIG. 1B, the application framework layer may include an ActivityManagerService, a WindowManagerService, a screen locking module, a phone manager, a notification manager, and the like.

The ActivityManagerService may be used to manage various activities of the electronic device 10. Specifically, for each activity created by an application of the electronic device 10, there is an ActivityRecord, corresponding to the activity, in the ActivityManagerService. The ActivityManagerService uses the ActivityRecord as an identifier to manage an activity of an application. In some embodiments, the ActivityManagerService may include an Activity Starter, a TaskStarter, and an activity task stack and lifecycle management module. The Activity Starter may be configured to start a new activity. The TaskStarter may be configured to create a new task. The activity task stack and lifecycle management module may be configured to: schedule the activity in the application, manage a lifecycle of the activity, adjust a status of a task stack, and the like.

The WindowManagerService is responsible for window management of the electronic device 10. The WindowManagerService may be used to create or destroy a window, display or hide the window, arrange the window, manage an input method, manage a wallpaper, and the like. Each activity has a window of the activity, and there is a WindowState, corresponding to the activity, in the WindowManagerService. The WindowManagerService uses the WindowState to identify the window in the application and store, query, and control a status of the window. In some embodiments, the WindowManagerService may include an animation module and a window display module. The animation effect module may be configured to provide an animation effect of window switching. The window display module may be configured to create and display the window.

The screen locking module may be configured to lock or unlock a screen of the electronic device 10. For example, the screen locking module may display the keyguard at the upper part of an entire display area of a current display of the electronic device 10. In addition, the screen locking module may determine, based on a received unlock password (for example, a number or a pattern) entered by the user or obtained physiological data (for example, fingerprint information, facial information, voiceprint information, or iris information) of the user, whether to unlock the screen of the electronic device. For example, when the received unlock password is the same as a preset unlock password, or the obtained physiological data of the user matches pre-stored physiological data, the screen locking module unlocks the screen, and no longer displays the keyguard.

In some embodiments, the electronic device 10 may further include an application locking module. The application locking module may lock or unlock a display area that displays an application interface and that is on the display. For example, the application locking module may display the keyguard at the upper part of an activity currently displayed by the electronic device 10, and the activity corresponds to an application. In addition, an unlocking manner of the application locking module may be similar to that of the screen locking module. To be specific, the application locking module may determine, based on the received unlock password (for example, the number or the pattern) entered by the user or the obtained physiological data (for example, the fingerprint information, the facial information, the voiceprint information, or the iris information) of the user, whether to unlock the display area of the electronic device. In one embodiment, an unlocking manner of the application locking module may alternatively be different from that of the screen locking module.

The phone manager may be configured to provide a communication function of the electronic device 10, for example, management of a call status (including answering, declining, and the like).

The notification manager may enable the application to display notification information in the status bar, may be configured to convey a notification message, and may automatically disappear after a short pause without user interaction. Alternatively, the notification manager may display a notification in a top status bar of the system in a form of a graph or a scroll bar text, or may display a notification on the screen in a form of a dialog window.

The Android runtime includes a kernel library and a virtual machine. The Android runtime is responsible for scheduling and management of the Android system.

The kernel library includes two parts: a function that needs to be invoked in a Java language and a kernel library of Android.

The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of function modules, for example, a surface manager, a media library, a three-dimensional graphics processing library (for example, an OpenGL ES), and a 2D graphics engine (for example, an SGL).

The surface manager may be configured to manage a display subsystem and provide fusion of 2D and 3D layers for a plurality of applications.

The media library supports playback and recording in a plurality of frequently used audio and video formats, static image files, and the like. The media library may support a plurality of audio and video encoding formats, for example, MPEG-4, G.264, MP3, AAC, AMR, JPG, and PNG.

The three-dimensional graphics processing library may be configured to implement three-dimensional graphics drawing, image rendering, composition, layer processing, and the like.

The 2D graphics engine is a drawing engine for 2D drawing.

The kernel layer is a layer between hardware and the software. The kernel layer includes at least a display driver, a camera driver, an audio driver, and a sensor driver.

It should be noted that the software architecture of the electronic device shown in FIG. 1B is merely an implementation of embodiments of this application. During actual application, the electronic device may alternatively include more or fewer software modules. This is not limited herein.

In embodiments of this application, based on the software structure shown in FIG. 1B, the electronic device 10 may further include a display module. The display module is configured to display a corresponding user interface based on running of each software module. For the user interface displayed by the display module, refer to a user interface shown as an example in the following embodiment. The display module may be specifically implemented as the display 194 in FIG. 1A.

The following describes a split-screen display method provided in embodiments of this application with reference to an interface diagram. First, some manners of enabling the split screen locking function provided in embodiments of this application are described.

Figure 2A:
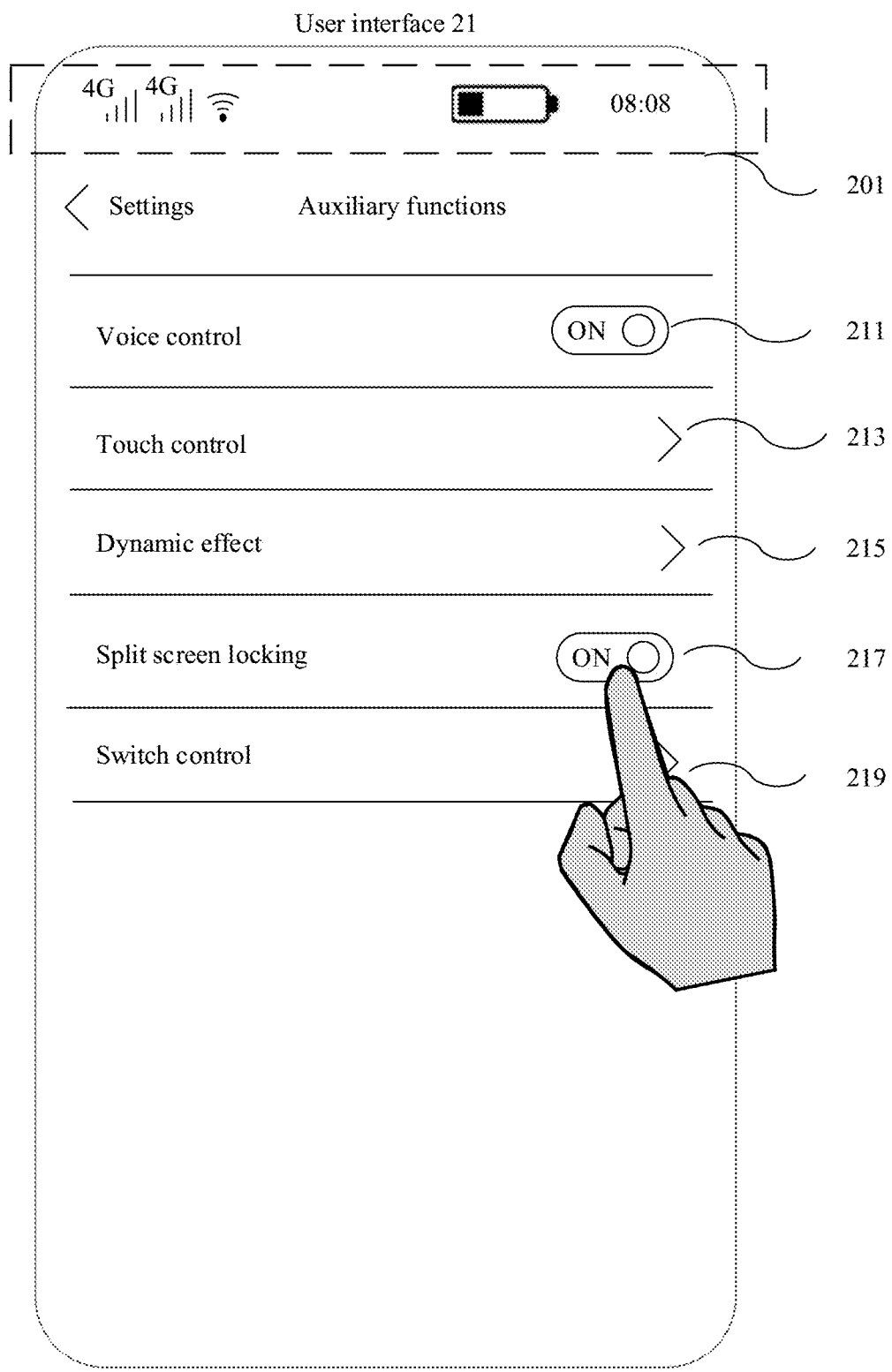
FIG. 2A and FIG. 2B are schematic diagrams of some display interfaces according to an embodiment of this application.

FIG. 2A is a schematic diagram of a display interface according to an embodiment of this application. For example, a user interface 21 is configured to display a setting interface of an auxiliary function on the electronic device 10. The user interface 21 includes a plurality of setting controls, for example, a voice control 211, a touch control 213, a dynamic effect control 215, a split screen locking control 217, and a switch control 219. The user interface 21 may further include another control. An example is merely shown herein.

When the user taps the split screen locking control 217, in response to the tapping operation, the electronic device 10 enables the split screen locking function, and switches the split screen locking control 217 from an "OFF" display state to an "ON" display state.

Figure 2B:
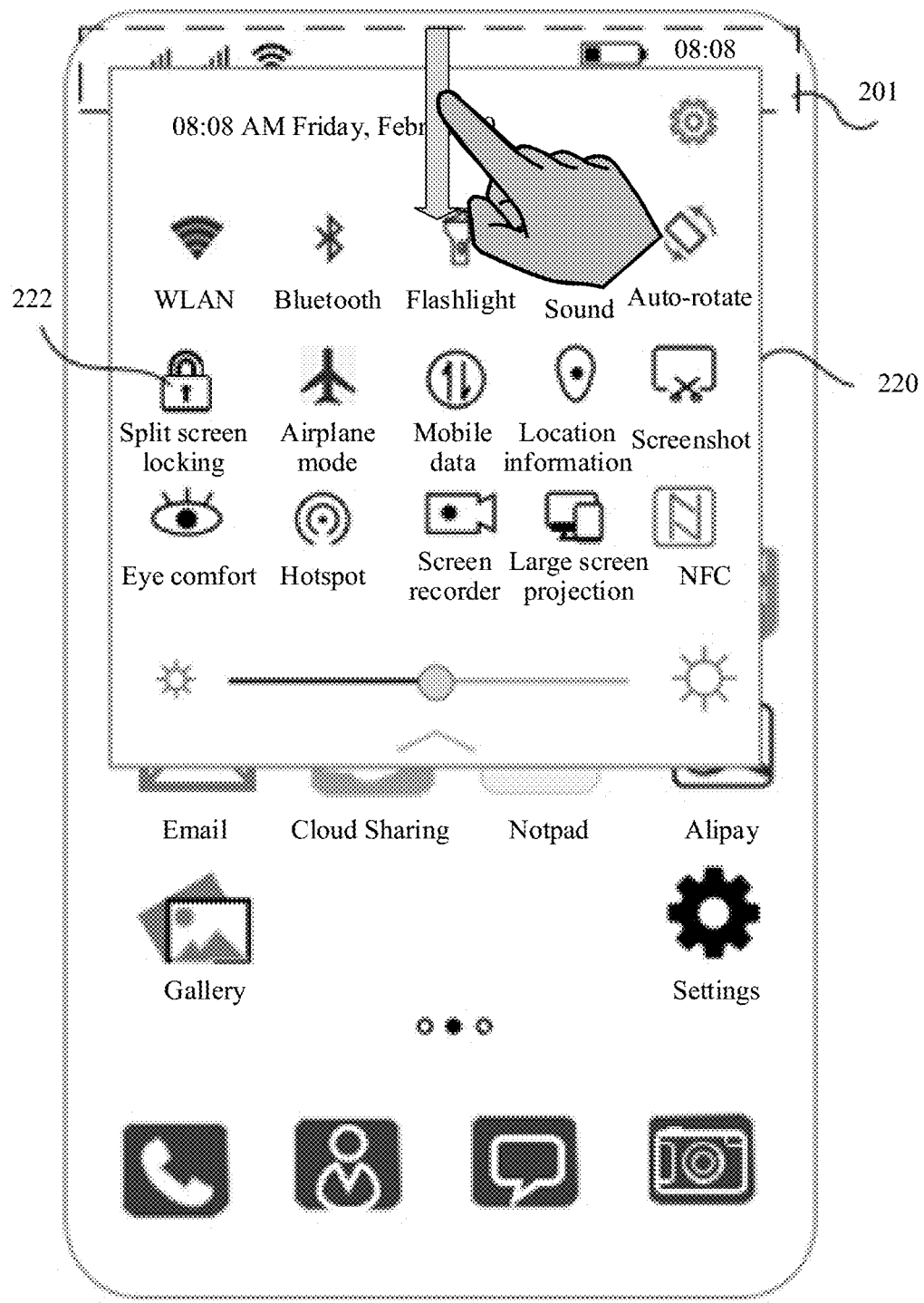

In some embodiments, the electronic device 10 may further display a split screen locking control in a shortcut operation menu. For example, refer to FIG. 2B. When a user operation of sliding downward on a status bar 201 is detected, the electronic device 10 may display a shortcut operation menu 220 on the display in response to the user operation. A user interface 22 includes the shortcut operation menu 220 and a plurality of application icons. The shortcut operation menu 220 includes a plurality of function controls, for example, a Bluetooth control, a flashlight control, a sound control, and a split screen locking control 222. The user may conveniently enable or disable the split screen locking function of the electronic device 10 by using the split screen locking control 222. It should be noted that there may be another manner of calling out the shortcut operation menu. An example is merely shown herein.

In some embodiments, the split screen locking function of the electronic device 10 may alternatively be enabled by default.

Figure 2C:
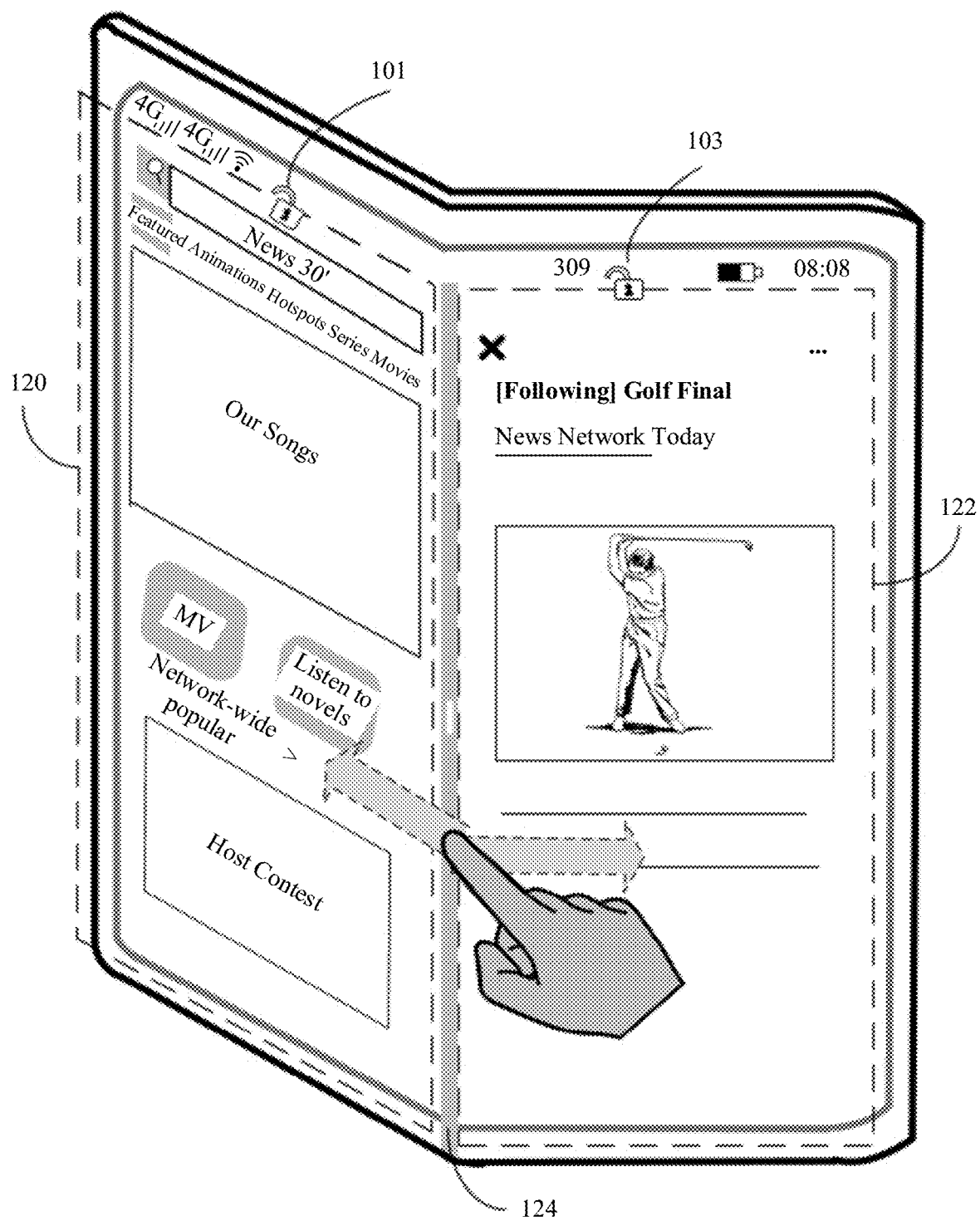
FIG. 2C is a schematic diagram of an electronic device 10 according to an embodiment of this application.

In some embodiments, the display of the electronic device 10 may be a foldable screen. The display 194 of the electronic device 10 may be divided into different display areas by folding the electronic device 10. FIG. 2C is a schematic diagram of the electronic device 10 according to an embodiment of this application.

As shown in FIG. 2C, the display 194 of the electronic device 10 is a foldable screen. The display 194 may be divided into a display area 120, a display area 122, and a screen separation bar 124 by folding the electronic device 10. The screen separation bar 124 may be used to separate the display area 120 from the display area 122.

In some embodiments, the screen separation bar 124 may overlap a folded area of the display 194. In some embodiments, the screen separation bar 124 may alternatively not overlap a folded area of the display 194. When an operation (for example, a sliding operation) of dragging the screen separation bar 124 by the user is detected, the electronic device 10 adjusts sizes of the display area 120 and the display area 122 in response to the operation. In some other embodiments, the display 194 may alternatively not include the screen separation bar 124.

The display area 120 is used to display an interface of a video playing application, and the display area 122 is used to display an interface of an instant messaging application. The display area 120 includes a lock control 101, and the display area 122 includes a lock control 103. Both the lock control 101 and the lock control 103 are displayed in an unlocking state. The user may lock or unlock display content in the display area 120 by using the lock control 101, and lock or unlock display content in the display area 122 by using the lock control 103.

It should be noted that a display interface shown as an example in the following embodiments may be displayed on the foldable screen shown in FIG. 2C.

The following describes in detail the split-screen display method provided in embodiments of this application with reference to other accompanying drawings based on the electronic device 10 described in the foregoing content.

Figure 3A:
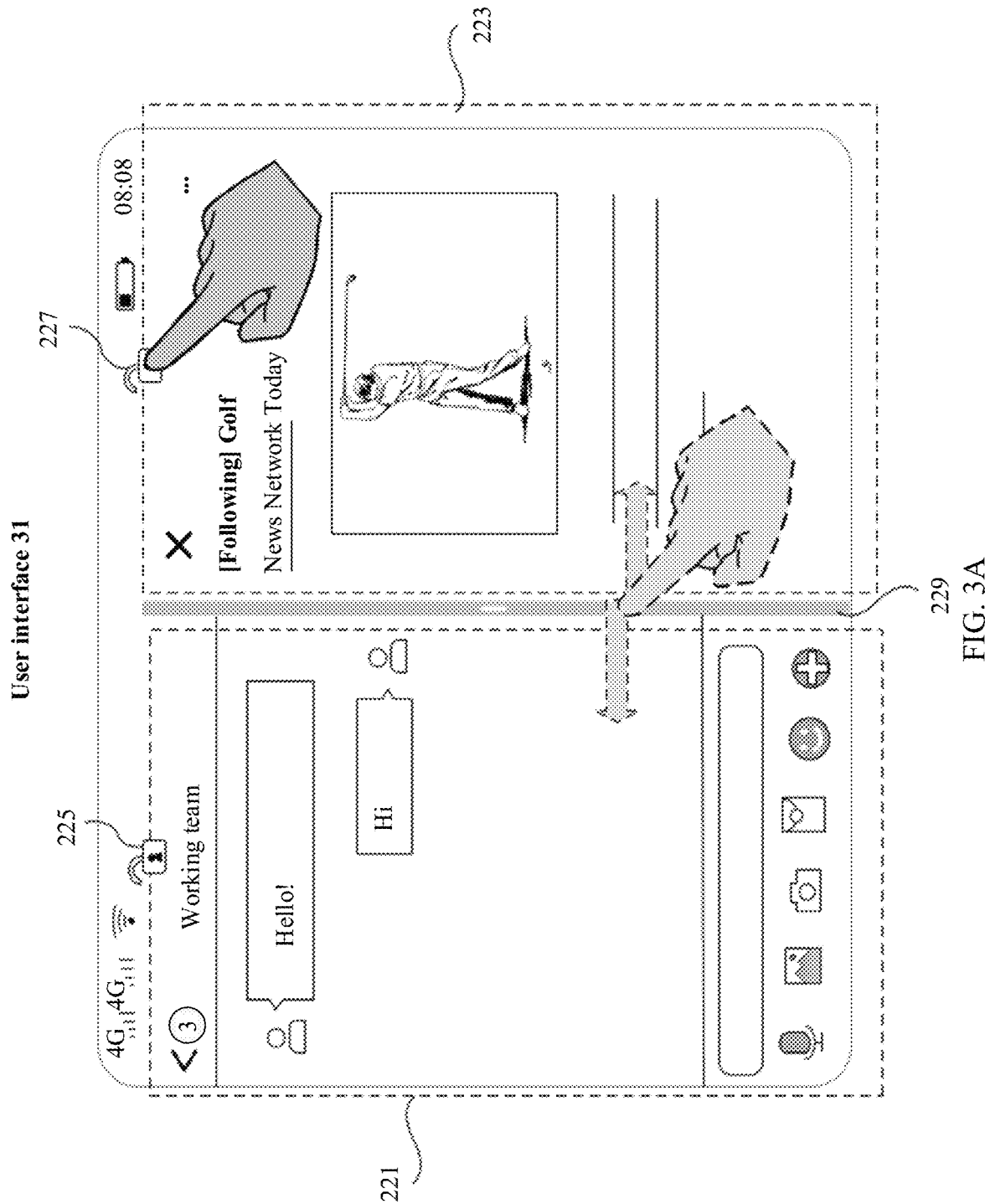
FIG. 3A to FIG. 3C are schematic diagrams of some display interfaces according to an embodiment of this application.

FIG. 3A is a schematic diagram of a display interface according to this application. A user interface 31 includes a status bar, a screen separation bar 229, and two display areas: a display area 221 and a display area 223. For example, the display area 221 is used to display a chat interface of an instant messaging application (for example, QQ), and the display area 223 is used to display an interface of another instant messaging application (for example, a WeChat application). An example is a display interface of an official account. It should be noted that the display area 221 and the display area 223 may alternatively display different interfaces of a same application. For example, the display area 221 may display a chat interface of a WeChat application, and the display area 223 may display a display interface of an official account of the WeChat application.

The screen separation bar 229 is used to separate the display area 221 from the display area 223. In some embodiments, when an operation (for example, a sliding operation) of dragging the screen separation bar 229 by the user is detected, the electronic device 10 adjusts sizes of the display area 221 and the display area 223 in response to the operation. In some embodiments, the user interface 22 may alternatively not include the screen separation bar 229.

When the split screen locking function of the electronic device 10 is enabled, a lock control 225 may be displayed in the display area 221, and a lock control 227 may be displayed in the display area 223. In some embodiments, a lock control may be hidden to avoid blocking interface display content in a display area. For example, after the electronic device 10 enters split-screen display, the electronic device 10 displays the lock control 225 and the lock control 227. After the lock control 225 and the lock control 227 are displayed for preset duration, the electronic device 10 may no longer display the lock controls. In one embodiment, after being hidden, the lock control may be called out again based on a requirement of the user. For example, when the user touches and holds, double taps, or presses (force-touches) the display area 221, or slides in the display area 221, the electronic device 10 calls out the lock control 225 again in response to the user operation. It may be understood that hiding the lock control does not affect the split screen locking function provided by the electronic device for the user.

A display status of the lock control 227 may indicate a lock status of the display area 223. When the lock control 227 is displayed in an unlocking state (refer to a display state of the lock control 227 in FIG. 3A), it indicates that the display area 223 is unlocked. When the lock control 227 is displayed in a locking state (refer to a display state of the lock control 227 in FIG. 3B), it indicates that the display area 223 is locked. Similarly, a display status of the lock control 225 may indicate a lock status of the display area 221.

Figure 3B:
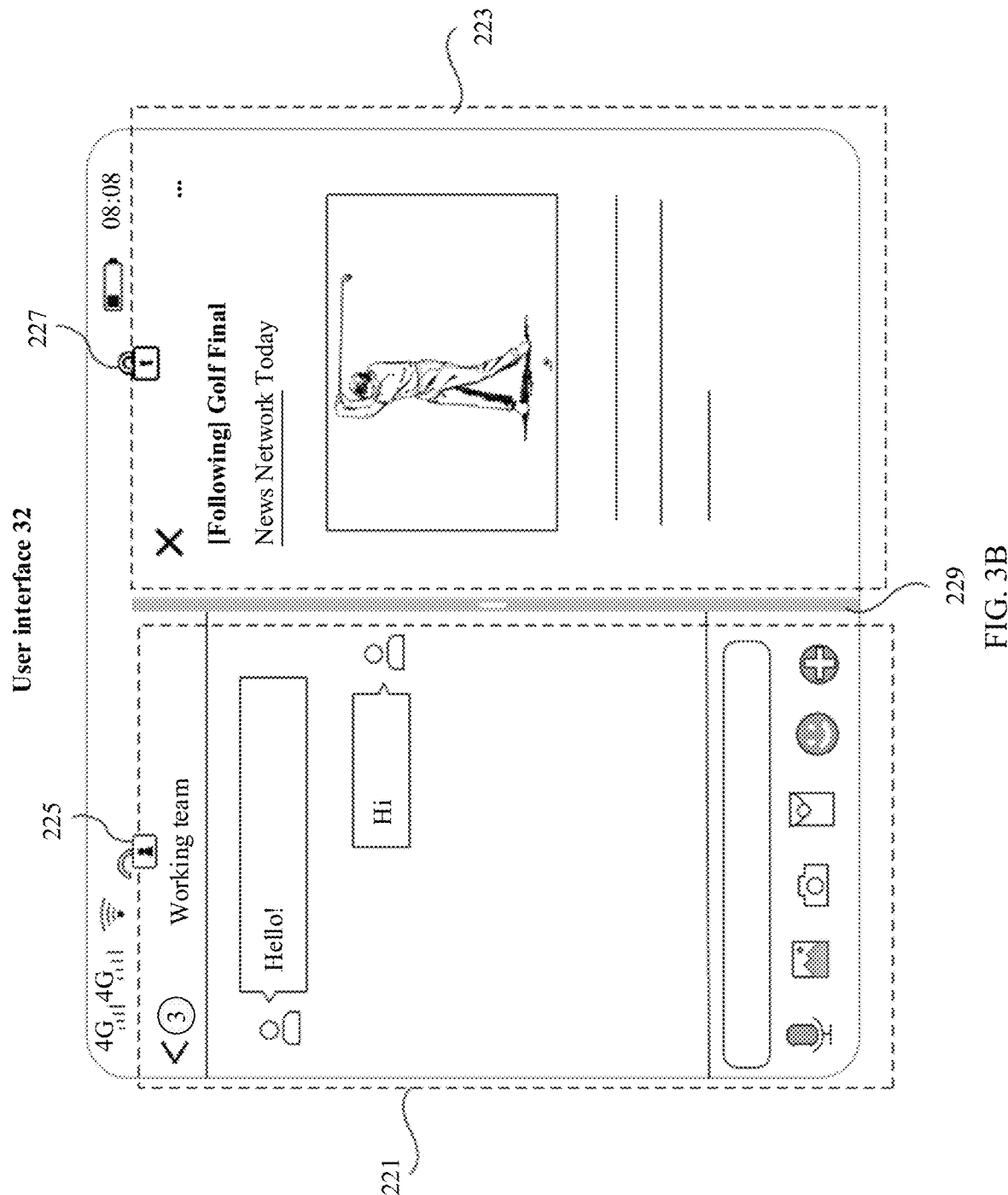

As shown in an example in FIG. 3A and FIG. 3B, when the user performs tapping (which may alternatively be double tapping, touching and holding, or another operation) on the lock control 227, in response to the tapping operation, the electronic device 10 switches the display status of the lock control 227 to the locking state, and locks the display area 223.

Figure 3C:
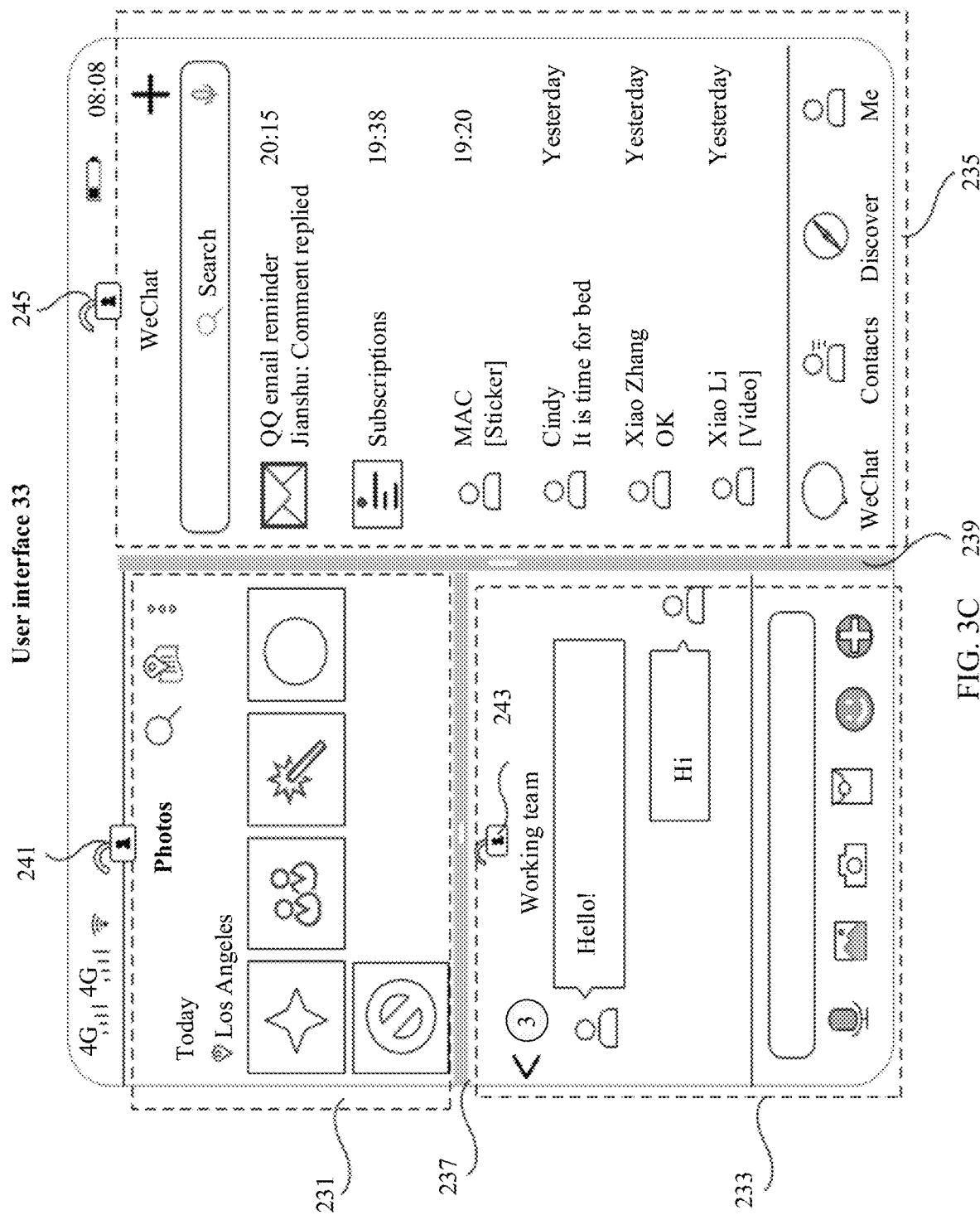

In some embodiments, the electronic device 10 may include more than two display areas. For example, the electronic device 10 includes three display areas (which may be referred to as three split screens), or the electronic device 10 includes four display areas (which may be referred to as four split screens). In this case, the electronic device 10 may include more than two lock controls. One lock control corresponds to one display area. For example, FIG. 3C is a schematic diagram of a display interface according to an embodiment of this application. As shown in FIG. 3C, a user interface 33 includes a display area 231, a display area 233, a display area 235, a screen separation bar 237, and a screen separation bar 239. The screen separation bar 237 and the screen separation bar 239 may be used to separate the display area 231, the display area 233 and the display area 235.

Similar to that by using the screen separation bar described above, the user may adjust a display size of each display area by using the screen separation bar. In some other embodiments, the display 194 may alternatively not include the screen separation bar 237 and/or the screen separation bar 239.

For example, the display area 231 is used to display an interface of a gallery application, the display area 233 is used to display an interface of a QQ application, and the display area 235 is used to display an interface of a WeChat application. The display area 231 includes a lock control 241, and the user may lock or unlock display content in the display area 231 by using the lock control 241. The display area 233 includes a lock control 243, and the user may lock or unlock display content in the display area 233 by using the lock control 243. The display area 235 includes a lock control 245, and the user may lock or unlock display content in the display area 235 by using the lock control 245.

Figure 3D:
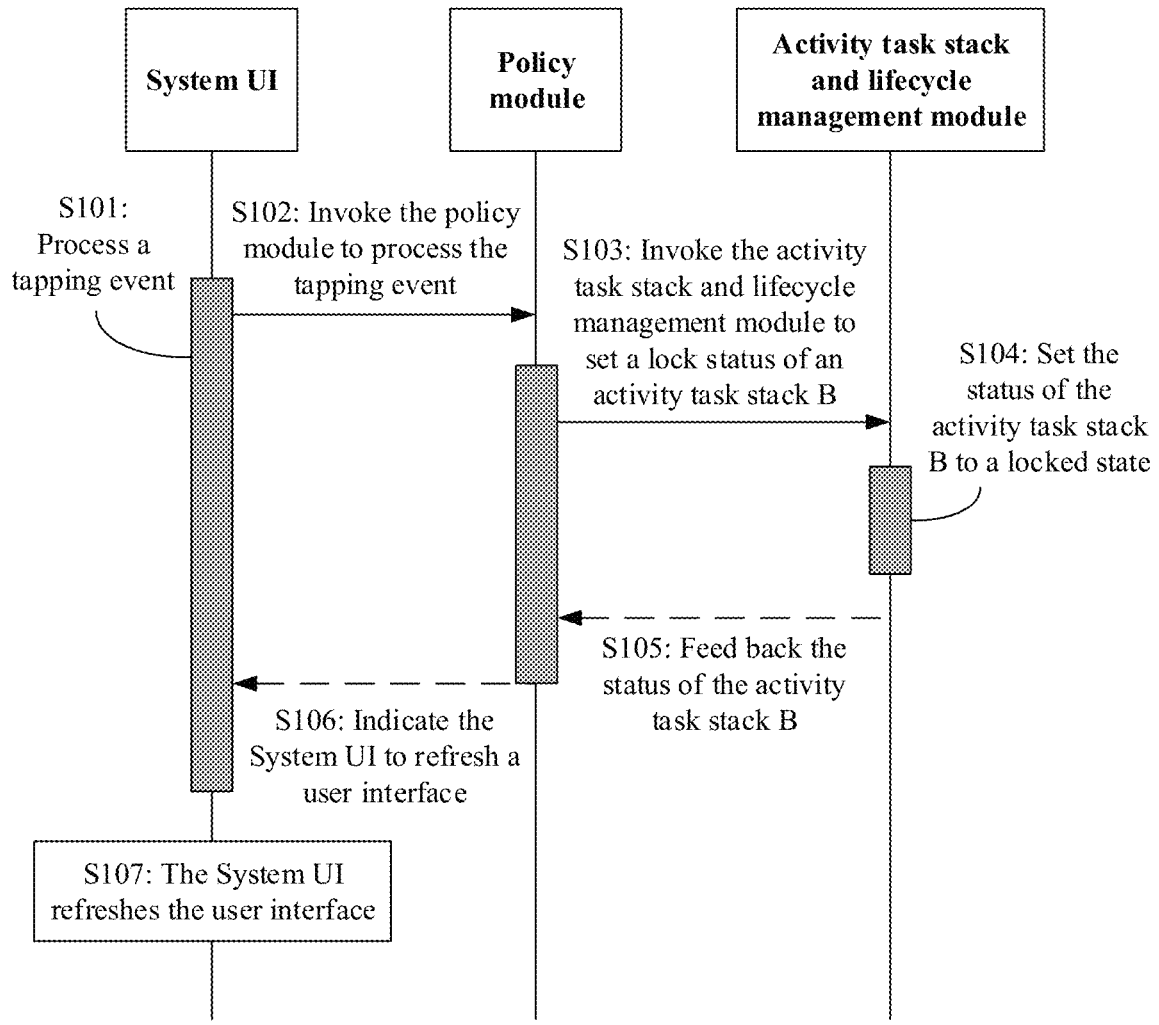
FIG. 3D is a flowchart of a display area locking method according to an embodiment of this application.

The following uses a lock control 227 (refer to the lock control 227 on the user interface 31 shown in FIG. 3A) as an example to describe a procedure of locking a display area 223. FIG. 3D is a flowchart of locking a display area according to an embodiment of this application. The display of the electronic device 10 includes a display area 221 and a display area 223. A user interface displayed in the display area 221 corresponds to an activity task stack A, and a user interface displayed in the display area 223 corresponds to an activity task stack B.

S101: The system UI processes a tapping event in response to an operation of tapping the lock control 227 by the user.

S102: The system UI invokes the policy module to process the tapping event.

S103: The policy module invokes the activity task stack and lifecycle management module based on the tapping event, to set a lock status of the activity task stack B.

In one embodiment, before the policy module invokes the activity task stack and lifecycle management module to set the lock status of the activity task stack B, the policy module may query a status of the activity task stack B, and determine that a current state of the activity task stack B is an unlocked state.

S104: The activity task stack and lifecycle management module sets the status of the activity task stack B to a locked state.

The activity task stack and lifecycle management module may set, store, query, and modify the status of the activity task stack B. In some embodiments, a status of an activity task stack may be represented by using a state identifier. The state identifier may be various data structures. For example, the state identifier may be a number. Specifically, the state identifier may be a number or a string of numbers, for example, 1, 0, 10, or 11. The state identifier may alternatively be a letter. Specifically, the state identifier may be a letter or a string of letters, for example, Y or AA. The state identifier may alternatively be a symbol. Specifically, the state identifier may be a symbol or a symbol sequence, for example, "○", "□", or "□○". In addition, in this application, the state identifier may be one or more data structures used to indicate the status of the activity task stack. These data structures may be stored in one or more memories, or stored in different parts of one memory. For example, a state identifier "1" indicates that the activity task stack is locked, and a state identifier "0" indicates that the activity task stack is unlocked.

For example, a manner in which the activity task stack and lifecycle management module adjusts the status of the activity task stack B to the locked state may be: modifying a state identifier of the activity task stack B to the state identifier "1".

S105: The activity task stack and lifecycle management module feeds back the lock status of the activity task stack B to the policy module.

S106: The policy module indicates the system UI to refresh a user interface.

S107: The system UI refreshes the user interface, and switches the display status of the lock control 227 to a locking state.

In some embodiments, if a display area is in a locked state, switching a display interface in another display area does not affect a display interface of the locked display area.

Figure 4A:
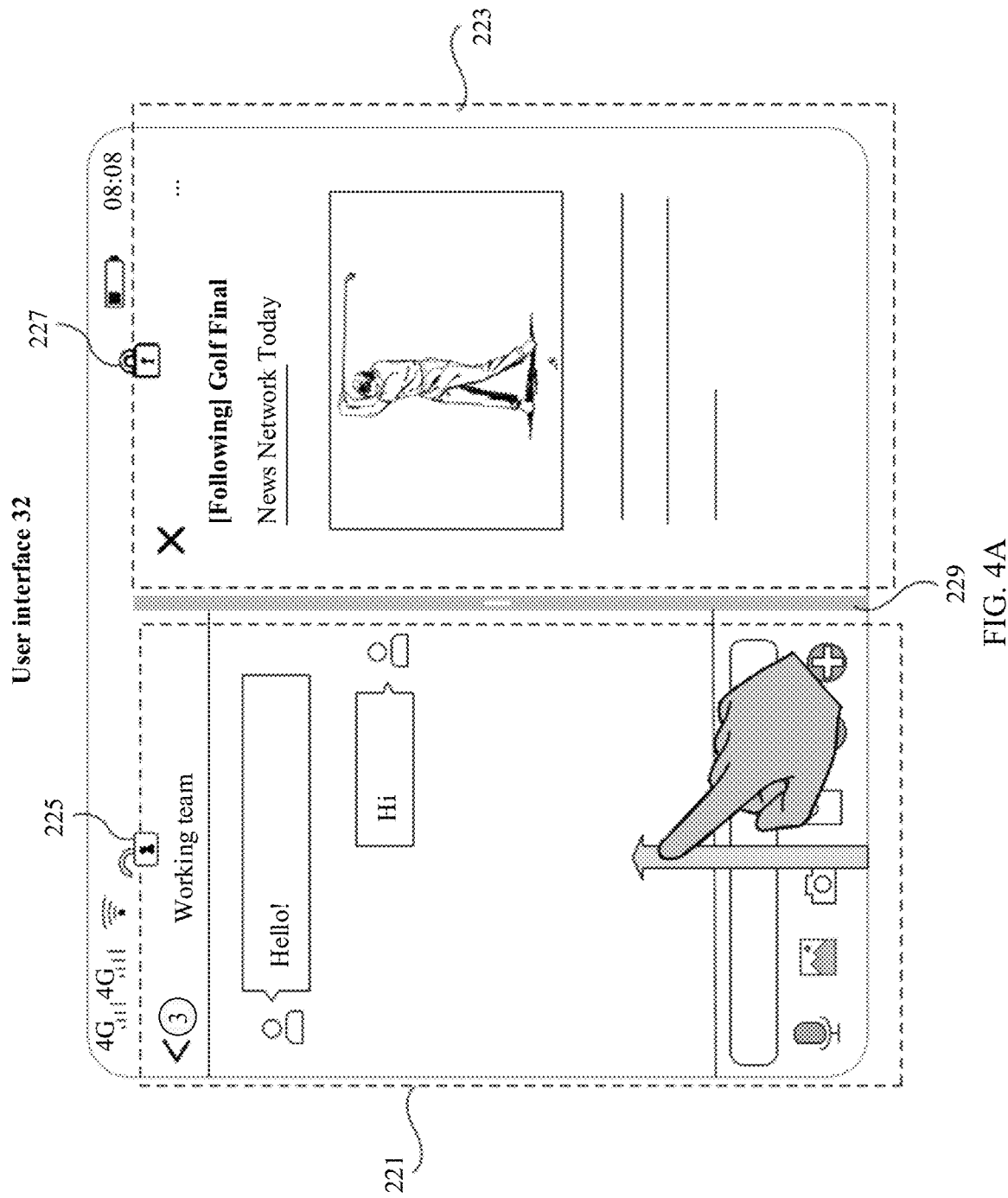
FIG. 4A to FIG. 4F are schematic diagrams of some display interfaces according to an embodiment of this application.
Figure 4B:
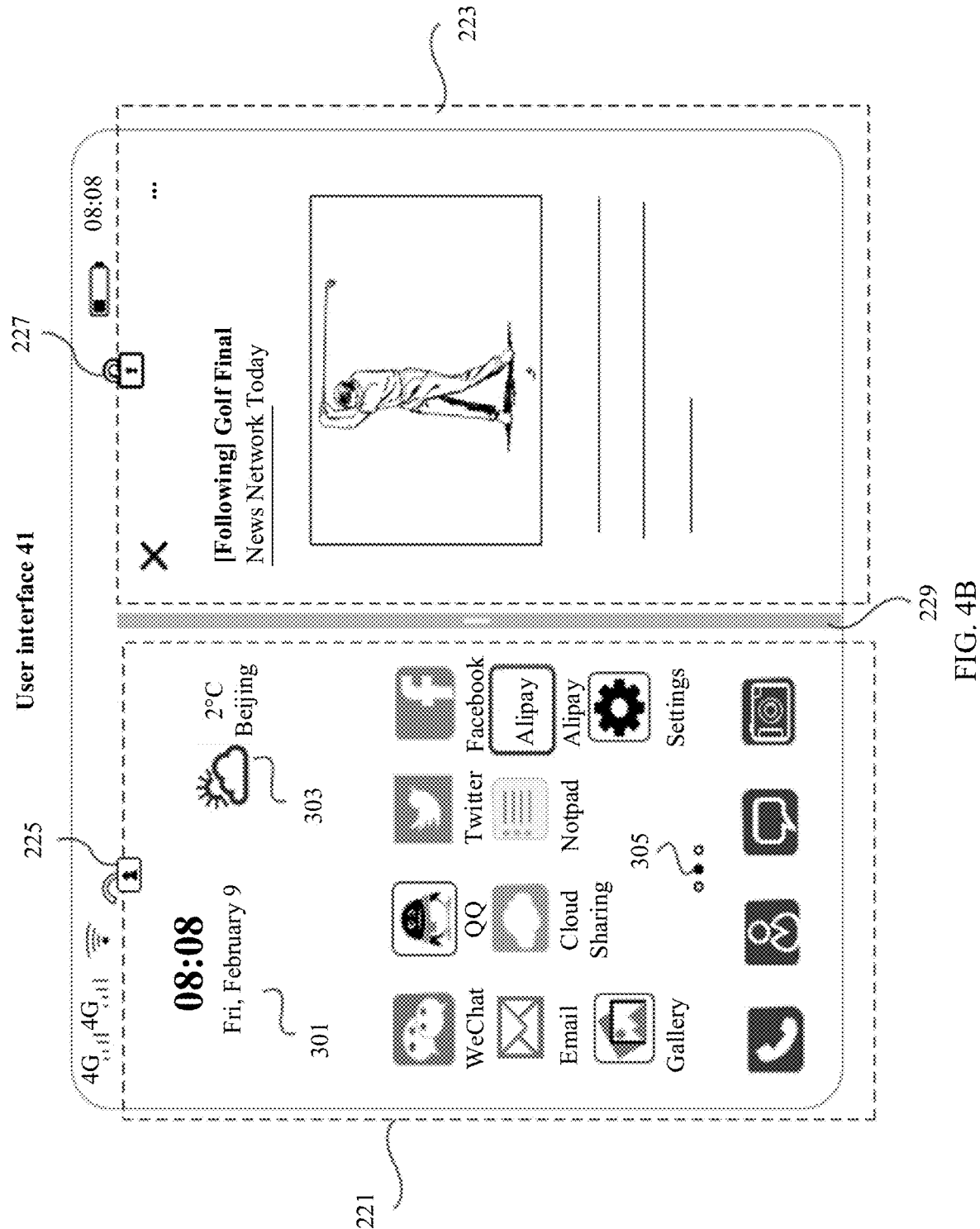

As shown in an example in FIG. 4A and FIG. 4B, when the user slides upward from the bottom of the display area 221, in response to the sliding operation, the electronic device 10 exits the displayed chat interface, and switches the display area 221 to the home screen of the electronic device 10, and display content in the display area 223 remains unchanged.

As shown in an example of a user interface 41, the display area 221 is used to display the home screen of the electronic device 10. The home screen of the electronic device 10 may include a calendar widget 301 for indicating current time, a weather widget 303 for indicating a weather type, a page indicator 305, and a plurality of application icons. The page indicator 305 may be used to indicate a quantity of pages and which page the user is currently browsing. In addition, the user may swipe leftward or rightward on a current page to browse an application icon on another page.

Figure 9A:
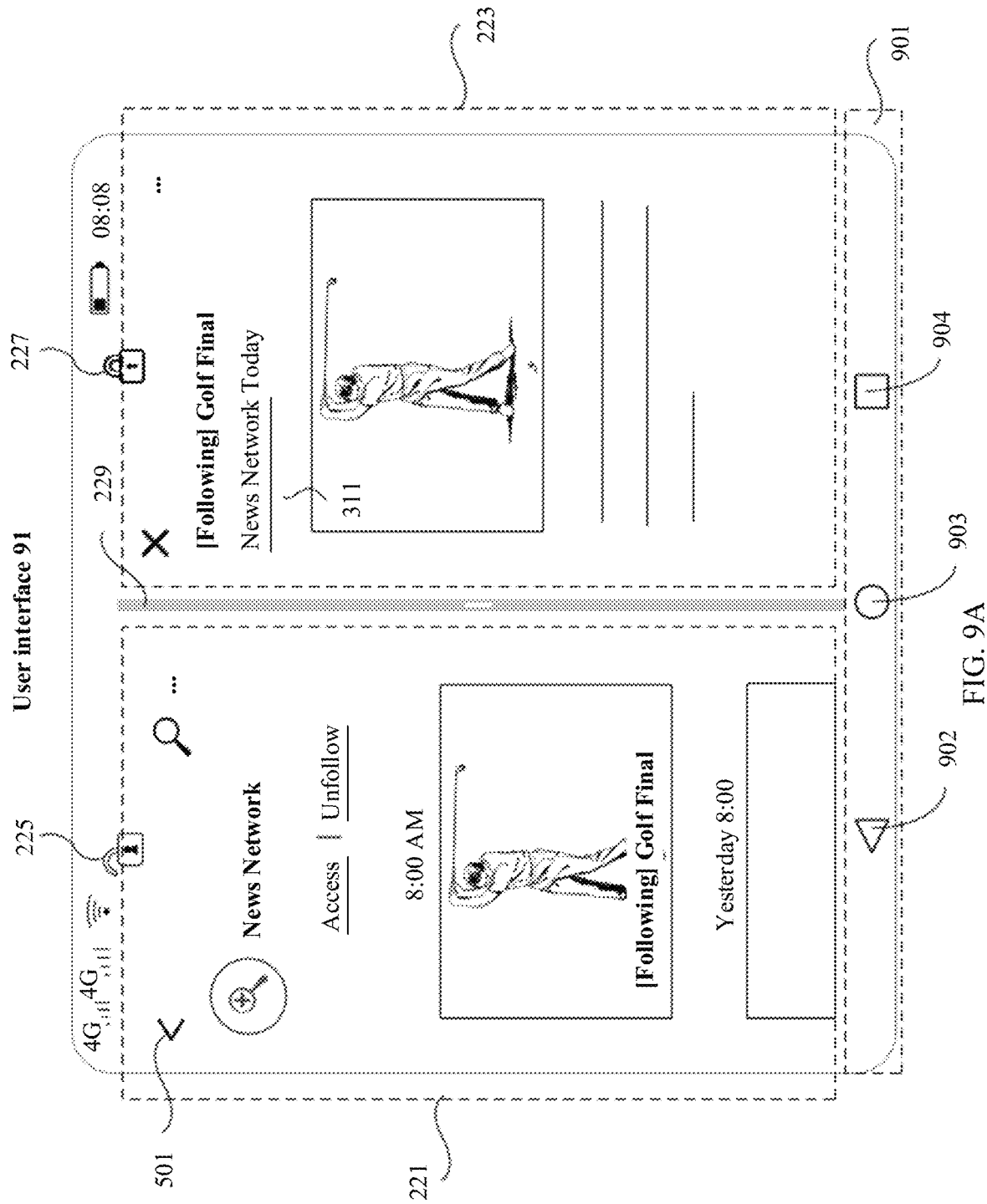
FIG. 9A is a schematic diagram of a display interface according to an embodiment of this application.

In some possible implementations, there may be another manner of closing the chat interface in the display area 221. For example, the electronic device 10 may include the navigation bar. For example, refer to a user interface 91 shown in FIG. 9A. A navigation bar 901 may include system navigation buttons such as a back button 902, a home screen button 903, and a historical task call-out button 904. The user may close the display area 221 by using the back button 902 or the home screen button 903. This manner is described in following content. Details are not described herein.

In some possible implementations, if the user closes the chat interface in the display area 221, there may be another display manner in the display area 221. For example, the display area 221 may be switched to display an icon of an application that is installed on the electronic device and that supports a screen splitting function. For this display manner, refer to a user interface 42 shown in FIG. 4C. A manner of switching a display interface in the display area 221 after the user closes the chat interface in the display area 221 is not limited in this application.

In some embodiments, if a display area is in an unlocked state, after a display interface of another display area is exited, the display area may cover the display area from which the display interface is exited. For example, as shown in FIG. 4D to FIG. 4E, both the display area 221 and the display area 223 are in an unlocked state. When the user slides upward from the bottom of the display area 221, in response to the sliding operation, the electronic device exits the displayed chat interface, and displays, on the display in full screen, an interface displayed in the original display area 223 (namely, the display area 223 in FIG. 4D).

Figure 4C:
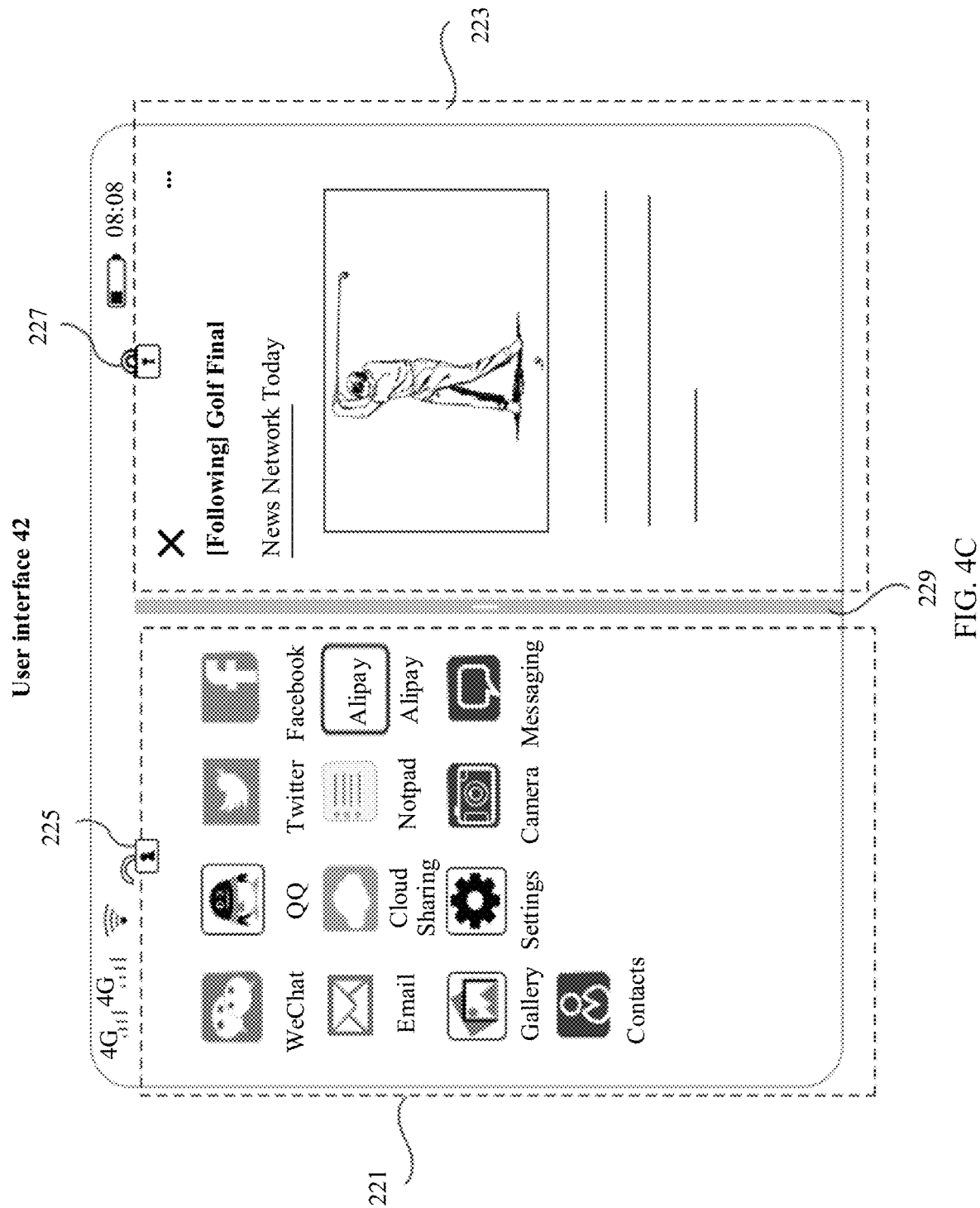
Figure 4D:
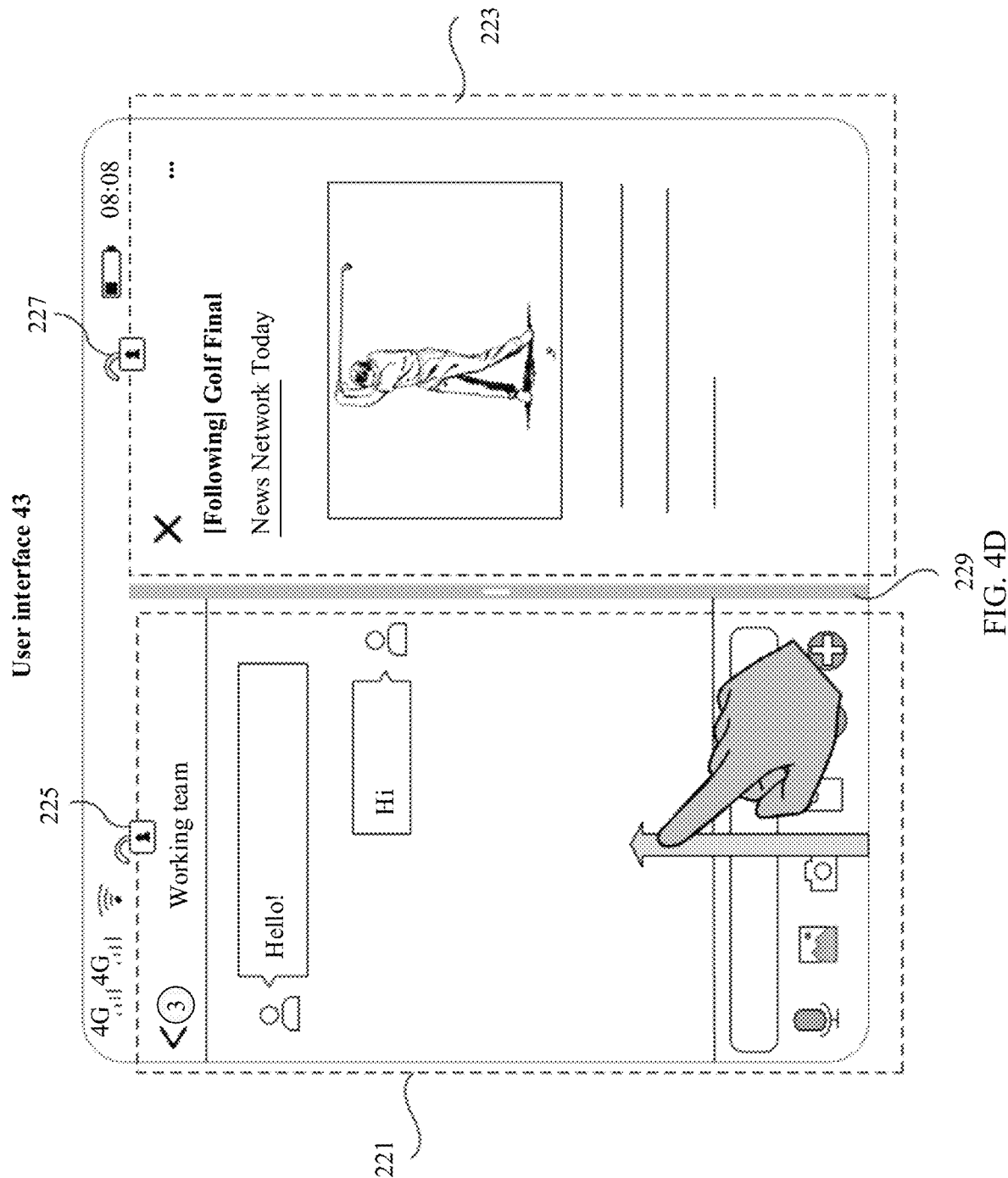
Figure 4E:
Figure 4F:
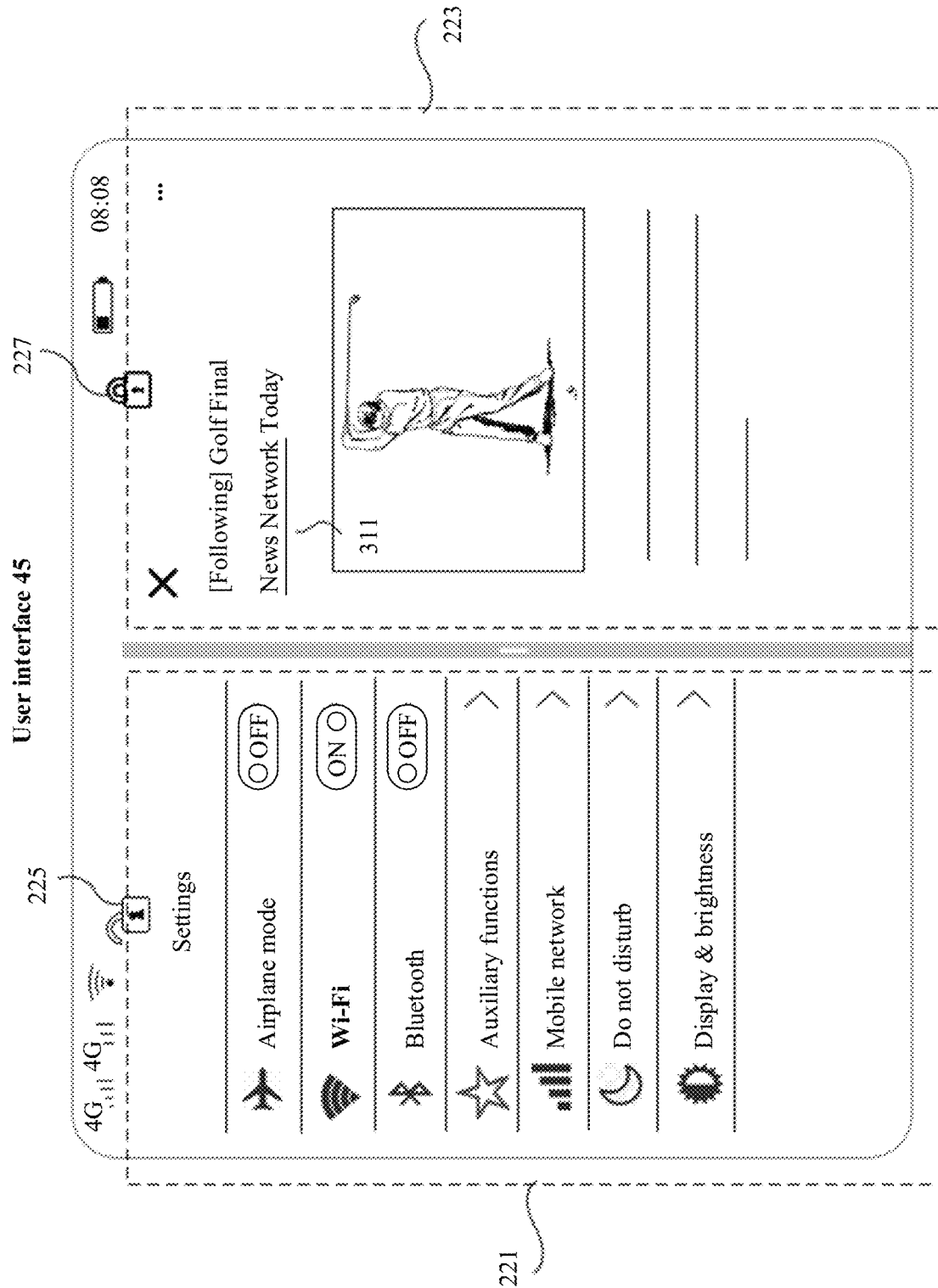

In some embodiments, in the display area 221 shown in FIG. 4B or FIG. 4C, when the user taps an application icon (for example, an application icon of "Settings"), in response to the tapping operation, the display area 221 of the electronic device 10 is switched from displaying the home screen to displaying a display interface of an application corresponding to the application icon, and the display content in the display area 223 remains unchanged. For a display interface of the electronic device 10 after switching, refer to FIG. 4F. On a user interface 45, the display area 221 is switched from displaying the home screen to displaying a display interface of the "Settings" application. For example, the display interface of the "Settings" application includes a plurality of setting controls. The user may set various functions of the electronic device 10 by using these setting controls.

Figure 4G:
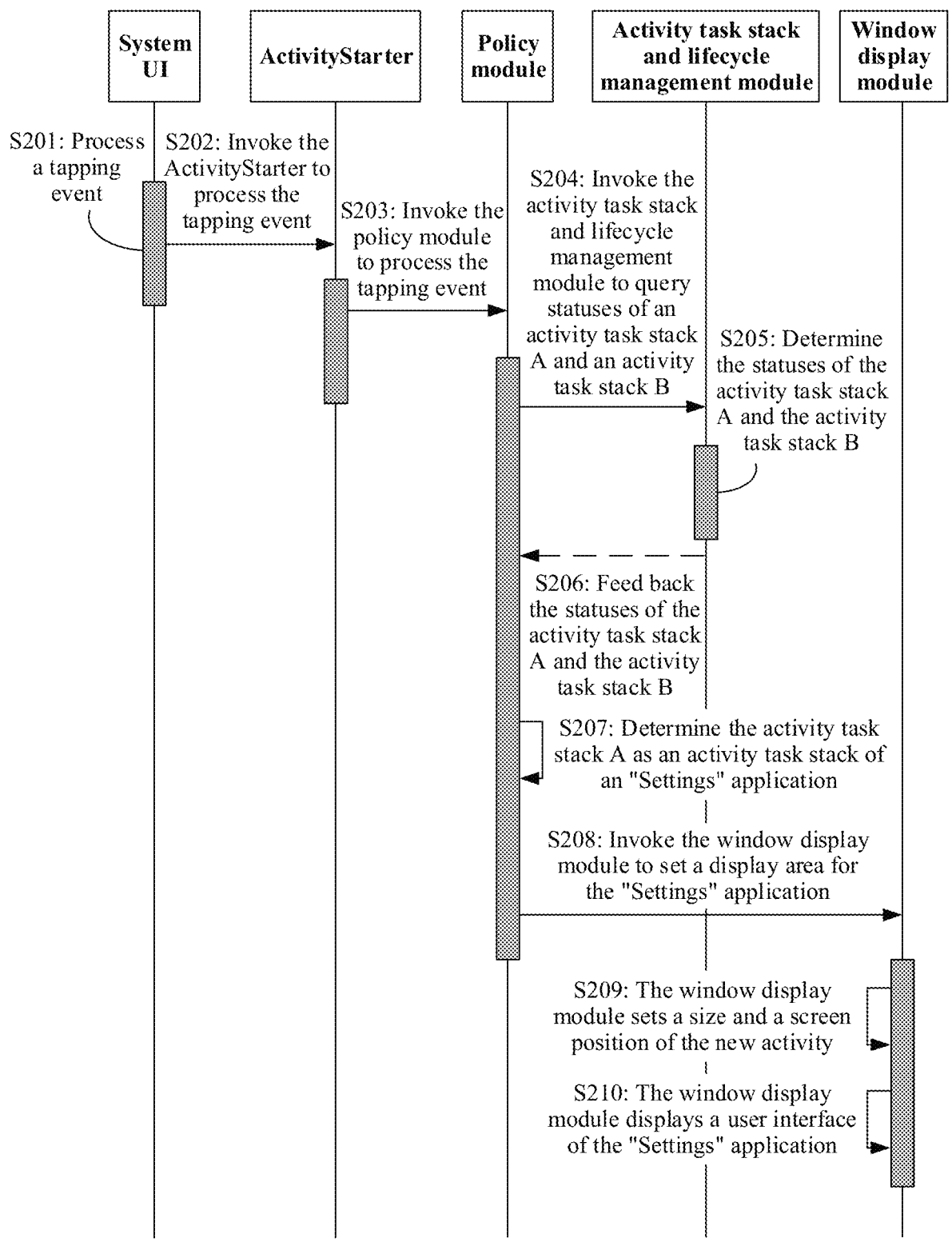
FIG. 4G is a flowchart of an application starting method according to an embodiment of this application.

The following uses an example in which the user taps the application icon of the "Settings" application to describe a procedure in which the electronic device 10 starts a new application. FIG. 4G is a flowchart of an application starting method according to an embodiment of this application.

S201: The system UI processes a tapping event in response to tapping the application icon of the "Settings" application by the user.

S202: The system UI invokes the Activity Starter to process the tapping event.

S203: The ActivityStarter invokes the policy module to process the tapping event.

In some embodiments, the Activity Starter invokes a WindowService, and the WindowService invokes the policy module to process the tapping event.

S204: The policy module invokes the activity task stack and lifecycle management module to query statuses of an activity task stack A and an activity task stack B.

S205: The activity task stack and lifecycle management module determines the statuses of the activity task stack A and the activity task stack B.

Specifically, in this example, the status of the activity task stack A is an unlocked state, and the status of the activity task stack B is a locked state.

S206: The activity task stack and lifecycle management module feeds back the statuses of the activity task stack A and the activity task stack B to the policy module.

S207: After receiving the statuses of the activity task stack A and the activity task stack B, the policy module determines, based on the statuses of the activity task stack A and the activity task stack B, the activity task stack A as an activity task stack of the "Settings" application.

The policy module determines, based on the fed back statuses of the activity task stack A and the activity task stack B, an activity task stack in an unlocked state as the activity task stack A. In this case, the policy module determines the activity task stack A as the activity task stack of the "Settings" application.

S208: The policy module invokes the window display module to set a display area for the "Settings" application.

S209: The window display module invokes a setLaunchBounds(A) interface of the activity task stack A to set a size and a screen position of a new activity of a newly started application.

S210: The window display module displays a user interface of the "Settings" application.

Figure 5A:
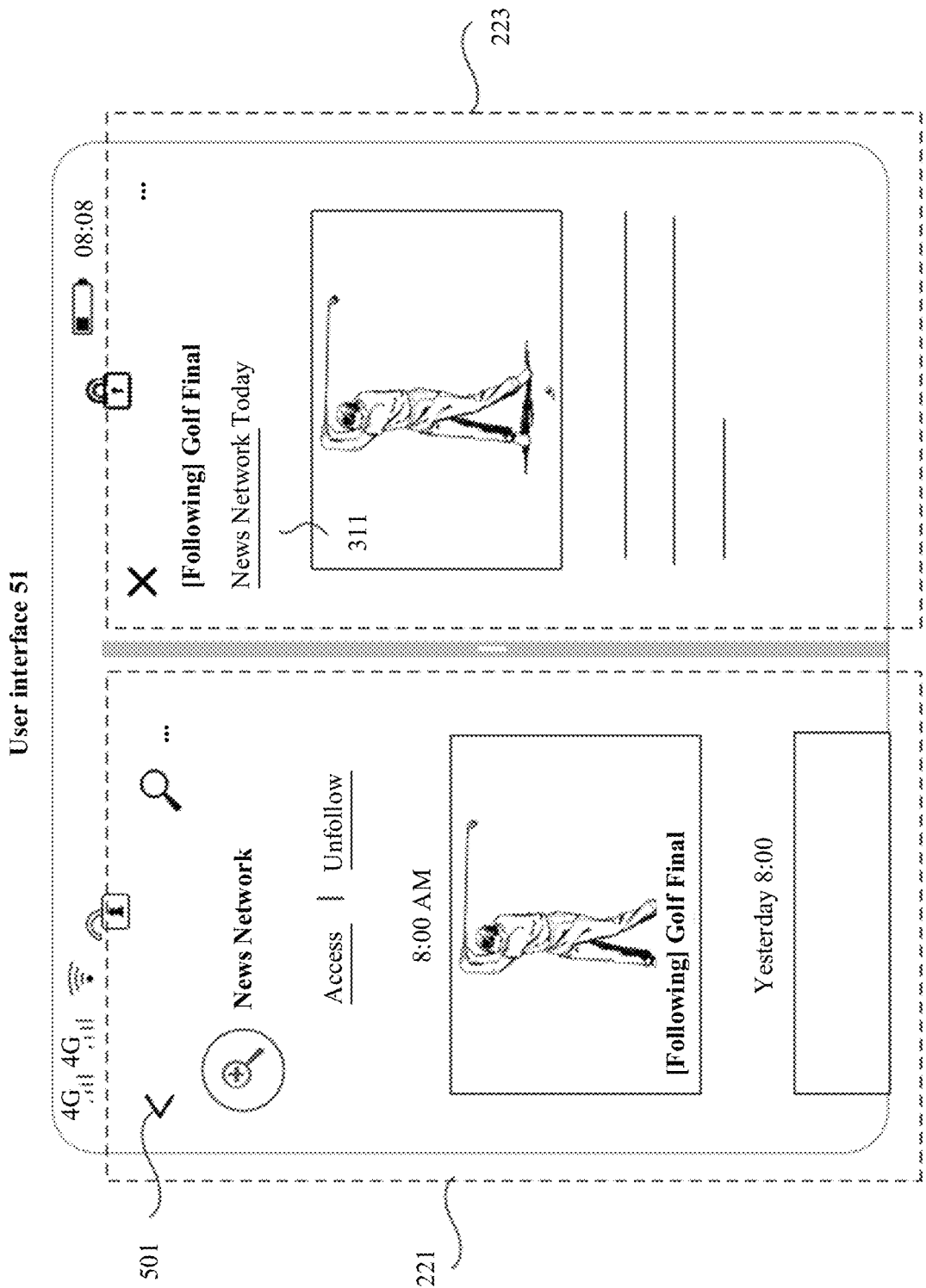
FIG. 5A is a schematic diagram of a display interface according to an embodiment of this application.

In some embodiments, if a display area is in a locked state, the display area no longer displays another user interface. For example, when the user taps a jump control 311 (refer to a jump control 311 on the user interface 41 shown in FIG. 4B) on a display interface in the display area 223, in response to the tapping operation, the electronic device 10 displays, in the display area 221 (which is an area in an unlocked state), a user interface associated with the jump control 311. For a display interface of the electronic device 10 after switching, refer to FIG. 5A. On a user interface 51, an interface in the display area 221 is switched to the user interface associated with the jump control 311, and an interface in the display area 223 is the same as that in the display area 223 in FIG. 4B.

Figure 5B:
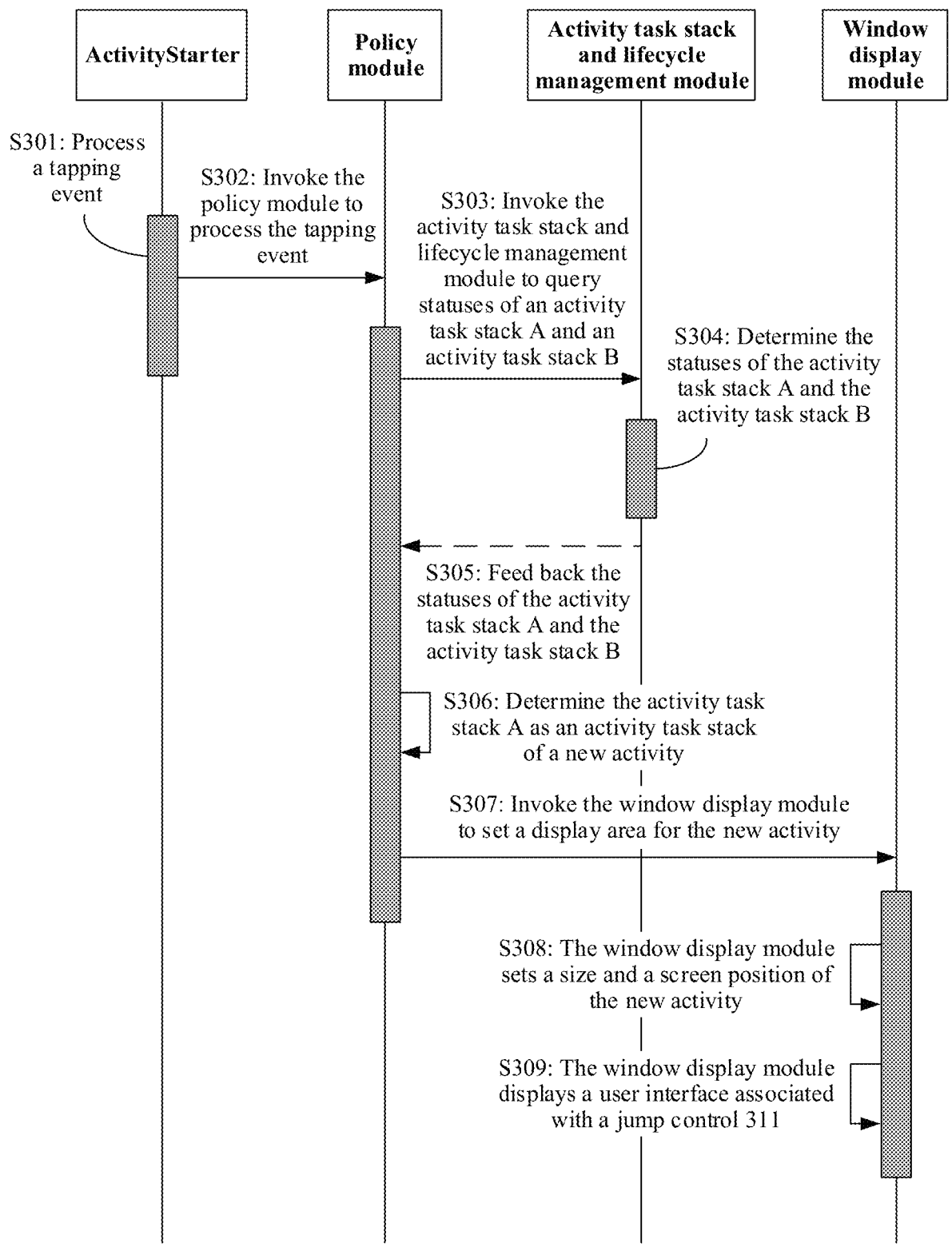
FIG. 5B is a flowchart of an activity starting method according to an embodiment of this application.

The following uses an example in which the user taps the jump control 311 to describe a procedure of starting a new activity by the electronic device 10. FIG. 5B is a flowchart of an activity starting method according to an embodiment of this application.

S301: The Activity Starter processes a tapping event in response to tapping the jump control 311 by the user.

S302: The Activity Starter invokes the policy module to process the tapping event.

In some embodiments, the ActivityStarter invokes the WindowService, and the WindowService invokes the policy module to process the tapping event.

S303: The policy module invokes the activity task stack and lifecycle management module to query statuses of an activity task stack A and an activity task stack B.

S304: The activity task stack and lifecycle management module determines the statuses of the activity task stack A and the activity task stack B.

S305: The activity task stack and lifecycle management module feeds back the statuses of the activity task stack A and the activity task stack B to the policy module.

Specifically, in this example, the status of the activity task stack A is an unlocked state, and the status of the activity task stack B is a locked state.

S306: After receiving the statuses of the activity task stack A and the activity task stack B, the policy module determines, based on the statuses of the activity task stack A and the activity task stack B, the activity task stack A as an activity task stack of a new activity.

The policy module determines, based on the fed back statuses of the activity task stack A and the activity task stack B, an activity task stack in the unlocked state as the activity task stack A. In this case, the policy module determines the activity task stack A as the activity task stack of the new activity.

S307: The policy module invokes the window display module to set a display area for the new activity.

S308: The window display module invokes a setLaunchBounds(A) interface of the activity task stack A to set a size and a screen position of the new activity.

S309: The window display module refreshes a user interface, and displays the new activity, namely, the user interface associated with the jump control 311, in the display area 221.

It should be noted that the new activity is established on the top of the activity task stack A. If the user taps a return control of the new activity, a current activity pops up from the top of the stack (that is, the activity is destroyed). An activity before the new activity is restored for execution (for example, an activity on the home screen). To be specific, if the user taps the return control (refer to a control 501 in FIG. 5A) of the new activity, the display area 221 is switched from displaying the user interface associated with the jump control 311 to displaying the home screen (refer to the display interface of the display area 221 in FIG. 4B).

Figure 5C:
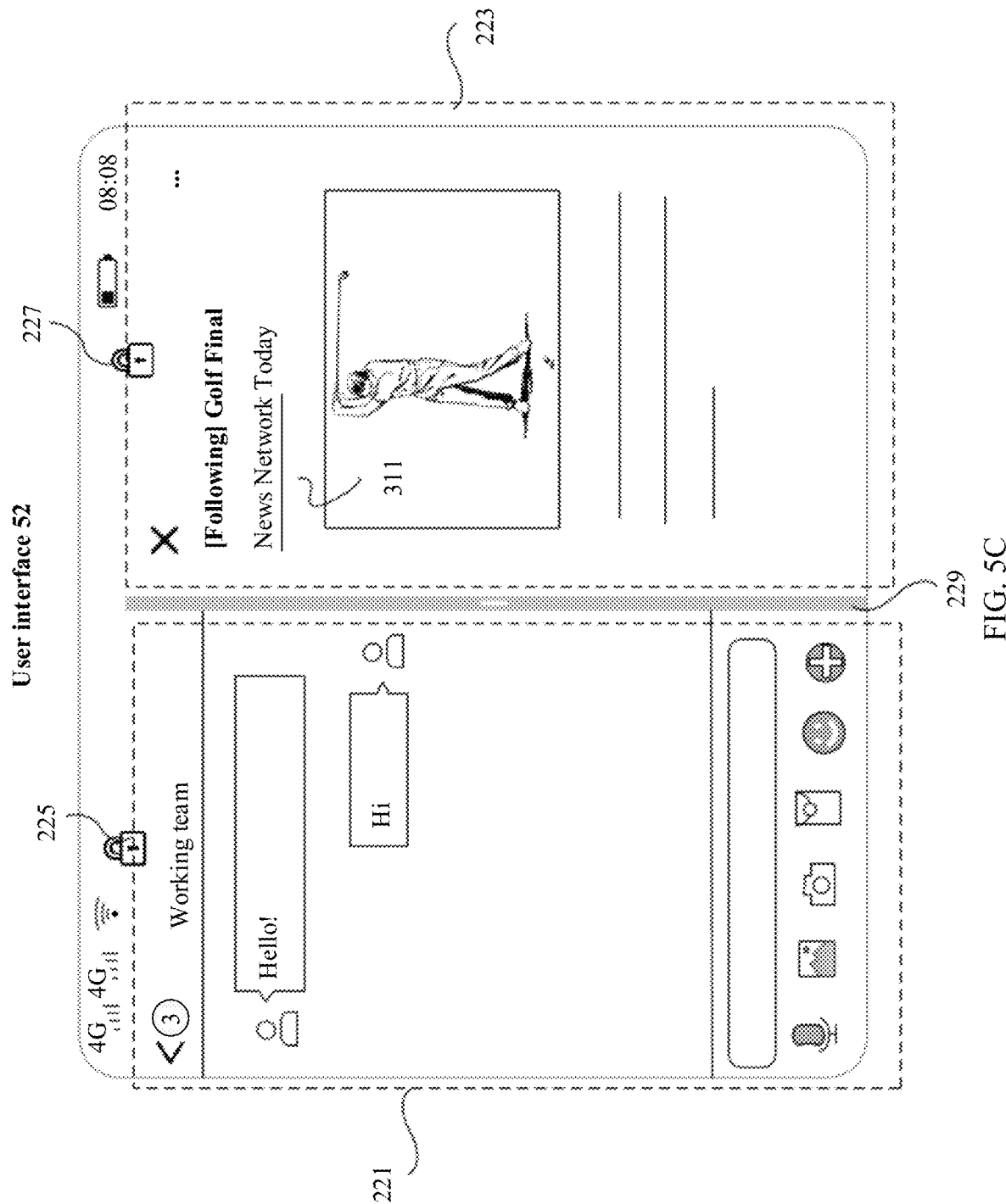
FIG. 5C and FIG. 5D are schematic diagrams of some display interfaces according to an embodiment of this application.
Figure 5D:
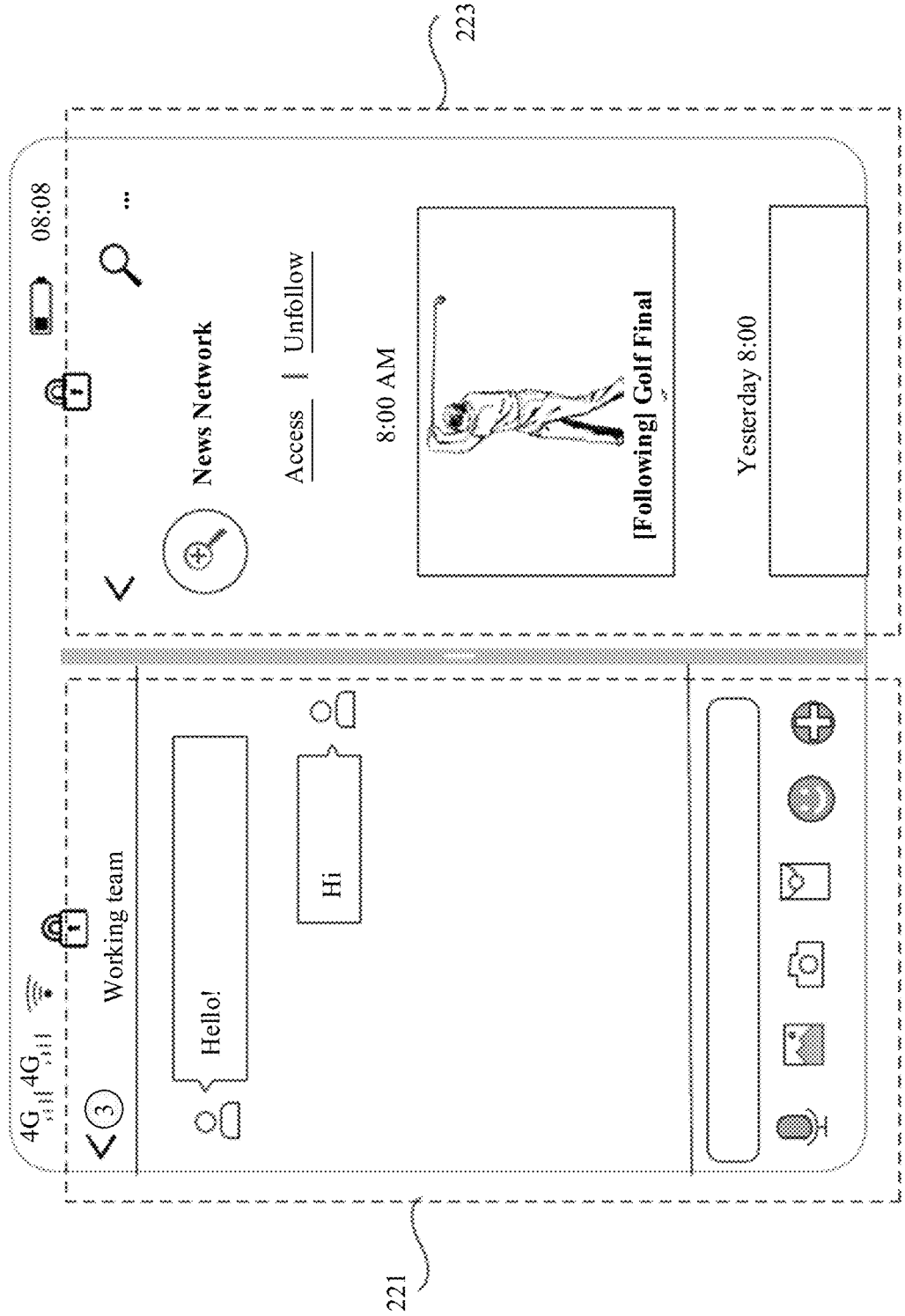

In some other embodiments, as shown in FIG. 5C and FIG. 5D, two display areas (namely, the display area 221 and the display area 223) of the electronic device are both in a locked state. When the user taps a jump control 311 in the display area 223 of a user interface 52 shown in FIG. 5C, the electronic device 10 displays, in the display area 223 in response to the tapping operation, a user interface associated with the jump control 311. For a display interface of the electronic device 10 after switching, refer to a user interface 53 shown in FIG. 5D.

In some embodiments, the split screen locking method provided in embodiments of this application may further be applied to a security mode. In this mode, verification needs to be performed to unlock a locked state of a display area. The following describes a method for entering a split screen locking security mode by the electronic device 10.

Figure 6A:
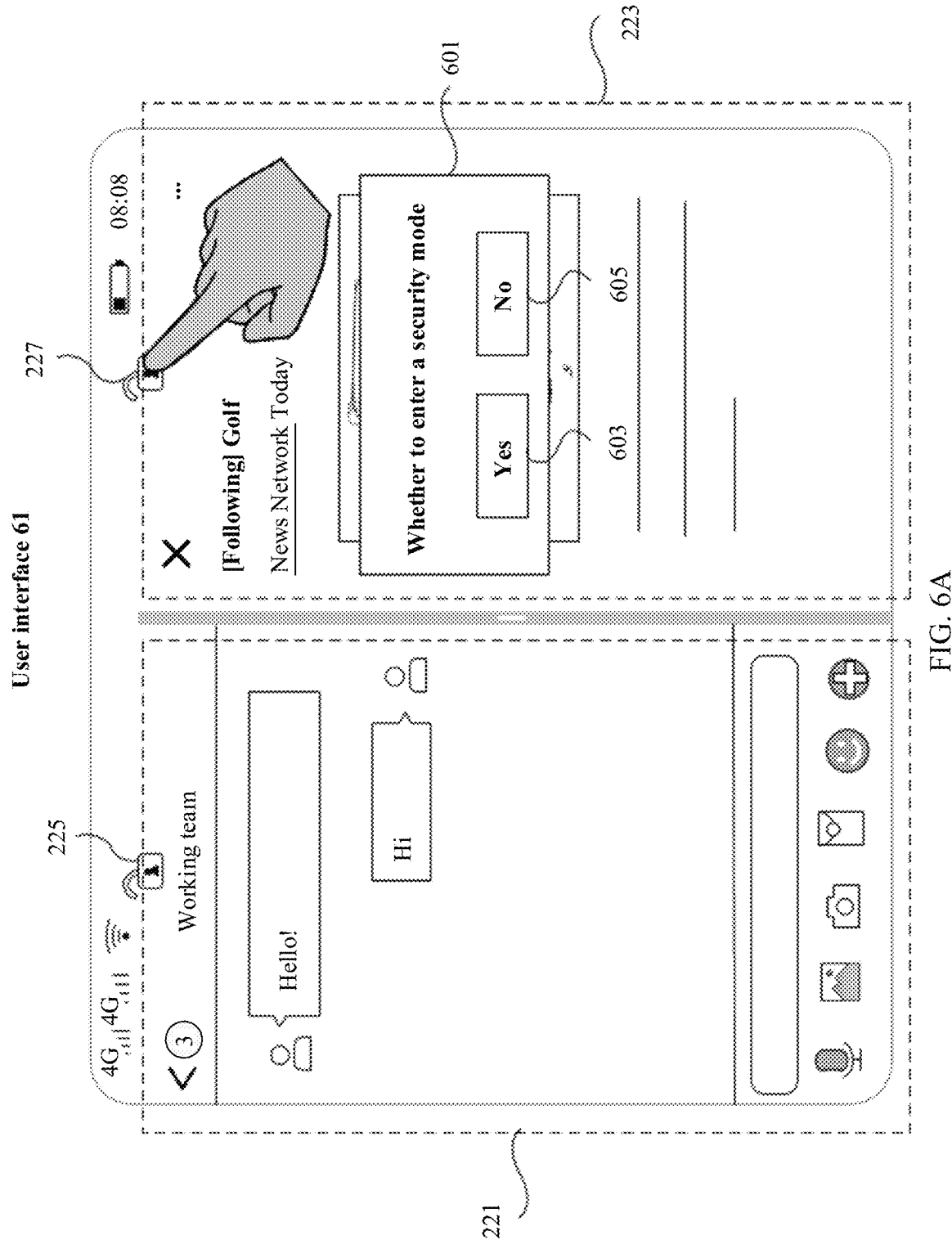
FIG. 6A and FIG. 6B are schematic diagrams of some display interfaces according to an embodiment of this application.

In some embodiments, the user may choose whether to enter the split screen locking security mode. For example, refer to a user interface 61 shown in FIG. 6A. If the user touches and holds a lock control 227 on the user interface 61, the electronic device 10 displays a prompt box 601 in response to the touching and holding operation. On the user interface 61, a display area 223 includes the prompt box 601, and the prompt box 601 includes a control 603 and a control 605.

The control 605 may receive a user operation, and the electronic device 10 no longer displays the prompt box 601 in response to the user operation.

The control 603 may receive a user operation, and in response to the user operation, the electronic device 10 determines that the display area 223 enters the split screen locking security mode. The electronic device 10 switches the lock control 227 from an unlocking state to a locking state. After the control 603 is tapped, for a display interface of the electronic device 10, refer to a user interface 32 shown in FIG. 3B. It should be noted that, when the display area 223 enters the split screen locking security mode, it indicates that the display area 223 is locked, a status of an activity task stack B corresponding to the display area 223 is adjusted to a security locked state, and verification needs to be performed to unlock the display area 223. In other words, a security locked state of an activity task stack is different from a locked state and an unlocked state. When the activity task stack is in the security locked state, verification needs to be performed to unlock a display area corresponding to the activity task stack. When the activity task stack is in the locked state, no verification needs to be performed to unlock the display area corresponding to the activity task stack.

In some other embodiments, when a display area is in the split screen locking security mode, a lock control corresponding to the display area may be displayed in a security locking state. In one embodiment, an icon indicating the security locked state may be different from an icon indicating the locked state, and may alternatively be different from an icon indicating the unlocked state. For example, after the control 603 is tapped, for a display interface of the electronic device 10, refer to a user interface 62 shown in FIG. 6B.

In addition, if the original activity task stack B is in the locked state, the user may also adjust the activity task stack B to the security locked state in a similar manner. In some other embodiments, when display areas of the electronic device 10 are all in the locked state, the user may touch and hold a lock control, so that the electronic device 10 enters the split screen locking security mode. Verification needs to be performed to unlock any display area. In this manner, the user can conveniently lock display content on the electronic device, to improve security of the electronic device 10 and avoid leakage of user information.

In some other embodiments, the electronic device 10 may obtain facial information of the user in real time by using a camera. When the facial information of the user does not match pre-stored facial information, the electronic device 10 switches a display area in the locked state to the security mode. In another embodiment, when the facial information of the user does not match the pre-stored facial information, and each of a plurality of display areas on the display of the electronic device 10 is in the locked state, the electronic device 10 switches the display area in the locked state to the security mode. In this manner, a user whose facial information is not pre-stored cannot release the locked state of the display area, to improve security of the electronic device 10, and avoid leakage of user information.

Figure 7:
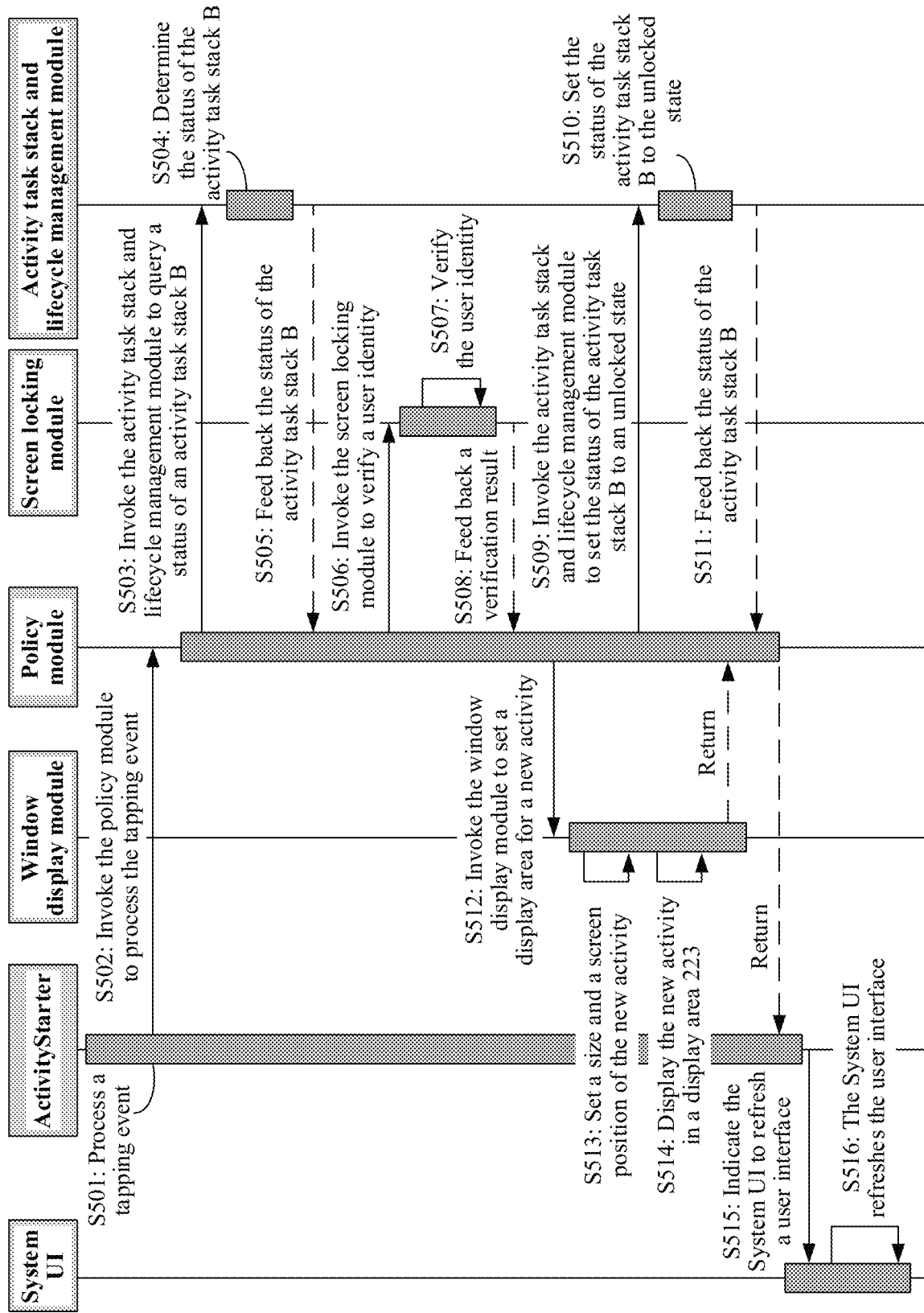
FIG. 7 is a flowchart of an activity starting method according to an embodiment of this application.

In some other embodiments, when the electronic device 10 is applied to the split screen locking security mode, a currently displayed application cannot be exited from a display area in a locked state, and only an activity in the application can be switched. If the user wants to start an activity of another application in the display area in the locked state, the display area needs to be unlocked. FIG. 7 is a flowchart of an activity starting method according to an embodiment of this application. In this example, an activity task stack B corresponding to a display area 223 is in a security locked state.

S501: The Activity Starter processes a tapping event in response to tapping a jump control 701 by the user.

The jump control 701 is associated with an activity of another application different from an application currently displayed in the display area 223. For example, the application currently displayed in the display area 223 may be a shopping application, and the activity associated with the jump control 701 may be a payment application.

S502: The Activity Starter invokes the policy module to process the tapping event.

In some embodiments, the ActivityStarter invokes the WindowService, and the WindowService invokes the policy module to process the tapping event.

S503: The policy module invokes the activity task stack and lifecycle management module to query a status of an activity task stack B.

S504: The activity task stack and lifecycle management module determines the status of the activity task stack B.

In this example, the status of the activity task stack B is a security locked state.

S505: The activity task stack and lifecycle management module feeds back the status of the activity task stack B to the policy module.

S506: After receiving the status of the activity task stack B, the policy module invokes, based on the status of the activity task stack B, the screen locking module to verify a user identity.

S507: The screen locking module verifies the user identity.

For an implementation of this operation, refer to an implementation process of operation S403 in the following content.

S508: The screen locking module feeds back a verification result to the policy module.

S509: The policy module invokes the activity task stack and lifecycle management module based on the verification result, to set the status of the activity task stack B to an unlocked state.

The verification result is that the user identity is successfully verified. It should be noted that, if the verification result is that the user identity is unsuccessfully verified, the policy module does not modify the status of the activity task stack B. The electronic device does not display the new activity.

S510: The activity task stack and lifecycle management module sets the status of the activity task stack B to the unlocked state.

S511: The activity task stack and lifecycle management module feeds back the status of the activity task stack B to the policy module.

S512: The policy module invokes the window display module to set a display area for the new activity.

S513: The window display module invokes a setLaunchBounds(B) interface of the activity task stack B to set a size and a screen position of the new activity.

S514: The window display module displays the new activity in the display area 223.

S515: The Activity Starter indicates the system UI to refresh a user interface.

S516: The system UI refreshes the user interface, and switches a display status of a lock control 227 to an unlocking state.

Figure 8A:
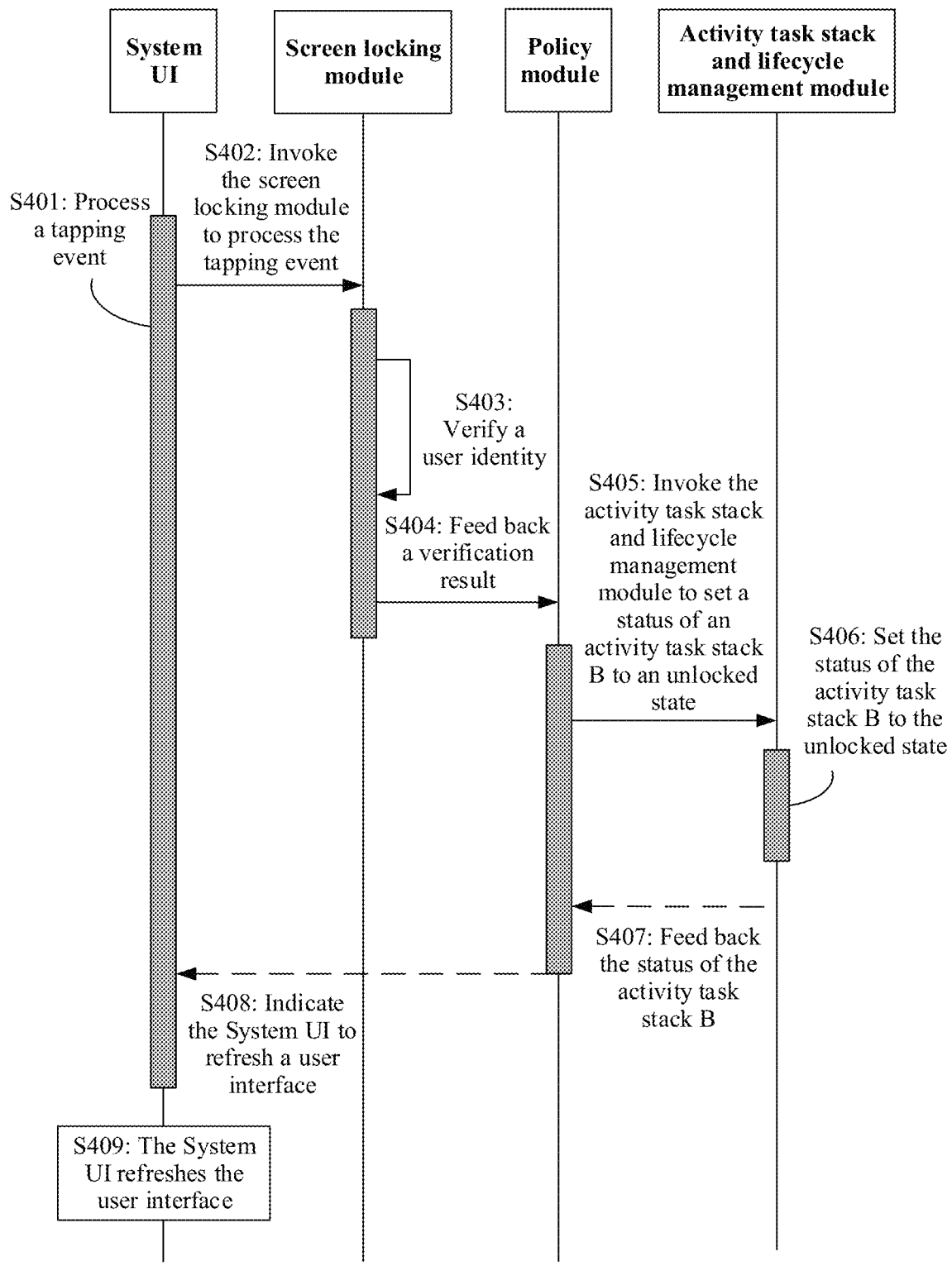
FIG. 8A is a flowchart of a locked state releasing method according to an embodiment of this application.

The following uses an example in which the user taps a lock control 227 (refer to a lock control 227 in FIG. 6B) to describe a procedure of releasing a locked state when the electronic device 10 is used in the split screen locking security mode. FIG. 8A is a flowchart of a locked state releasing method according to an embodiment of this application.

S401: The system UI processes a tapping event in response to an operation of tapping the lock control 227 by the user.

S402: The system UI invokes the screen locking module to process the tapping event.

S403: The screen locking module verifies a user identity.

Figure 8B:
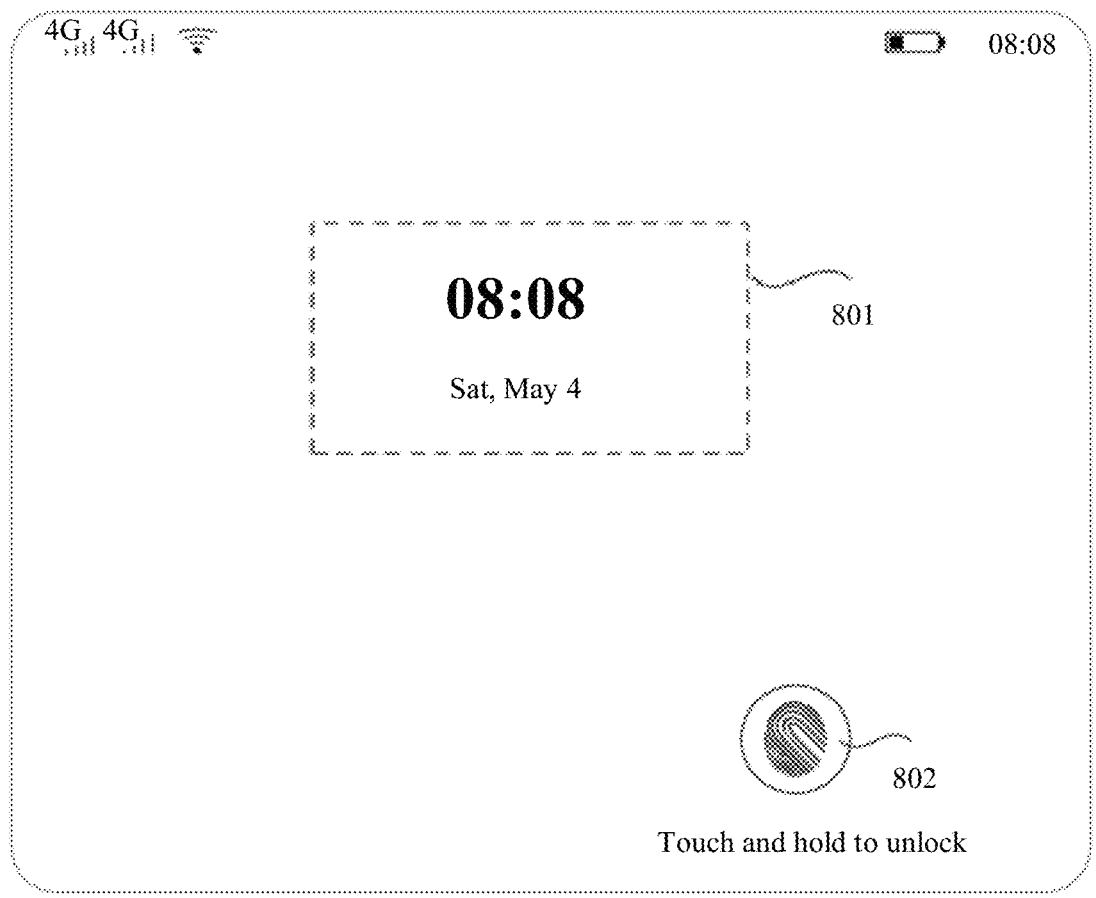
FIG. 8B is a schematic diagram of a display interface according to an embodiment of this application.

In some embodiments, the screen locking module locks the display of the electronic device 10, and the electronic device 10 displays the keyguard on the display. For example, for the keyguard, refer to a user interface 81 shown in FIG. 8B. Specifically, the keyguard includes a time widget 801 and an unlock indicator 802. The time widget 801 may indicate current time. The unlock indicator 802 may be used to indicate an area for receiving fingerprint information of the user. The fingerprint information of the user may be received in a screen area in which the unlock indicator 802 is located. When the received fingerprint information of the user matches pre-stored fingerprint information, the screen locking module unlocks the display, and no longer displays the keyguard. The electronic device 10 may display the user interface 62 shown in FIG. 6B.

Figure 8C:
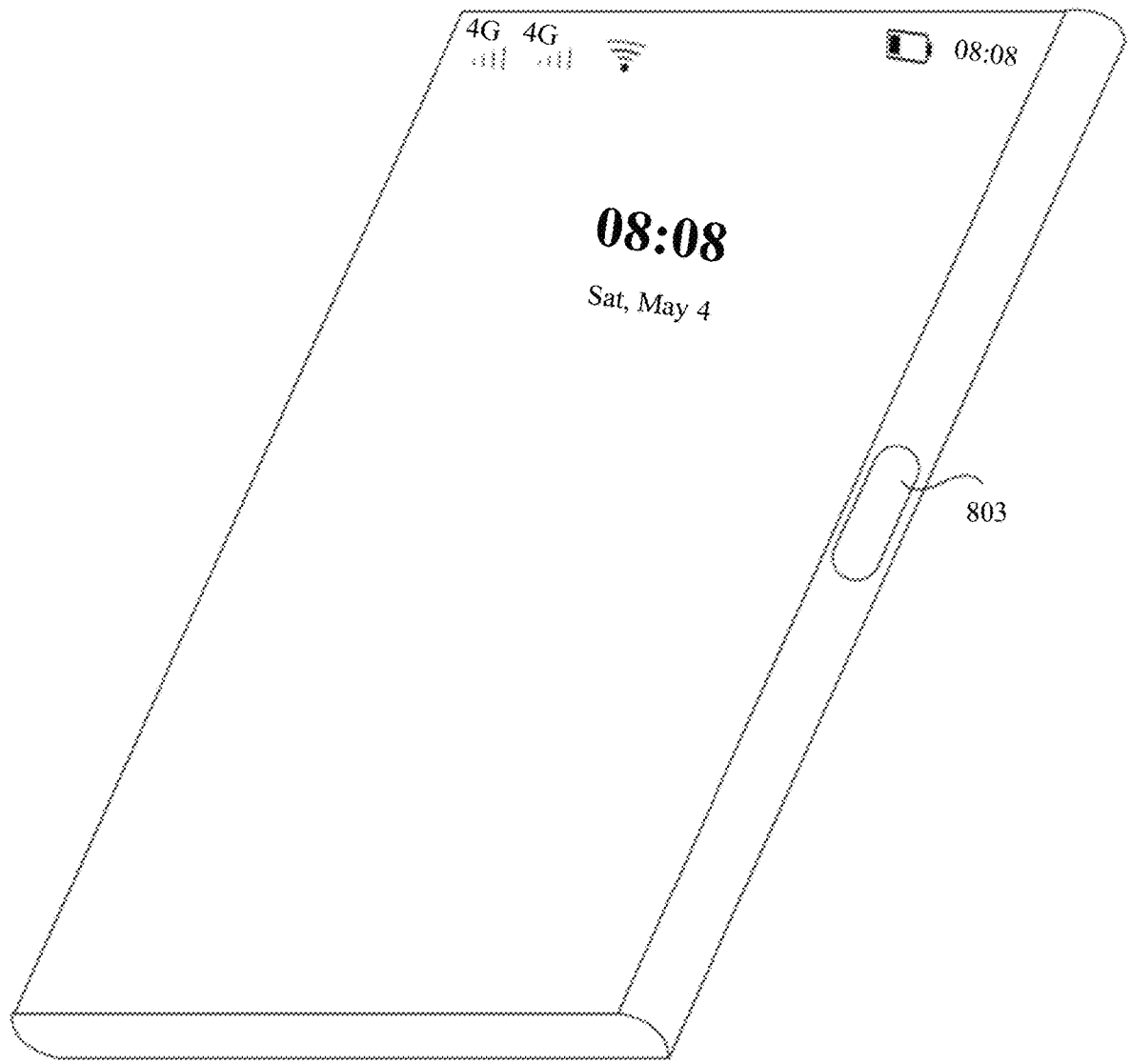
FIG. 8C is a schematic diagram of an electronic device 10 according to an embodiment of this application.

In embodiment, the keyguard may alternatively not include the unlock indicator 802. The user may perform unlocking by using a fingerprint button of the electronic device 10. In one embodiment, the fingerprint button may be a physical button. Refer to a schematic diagram of the electronic device 10 shown in FIG. 8C. The user may unlock a screen by touching a fingerprint button 803.

Figure 8D:
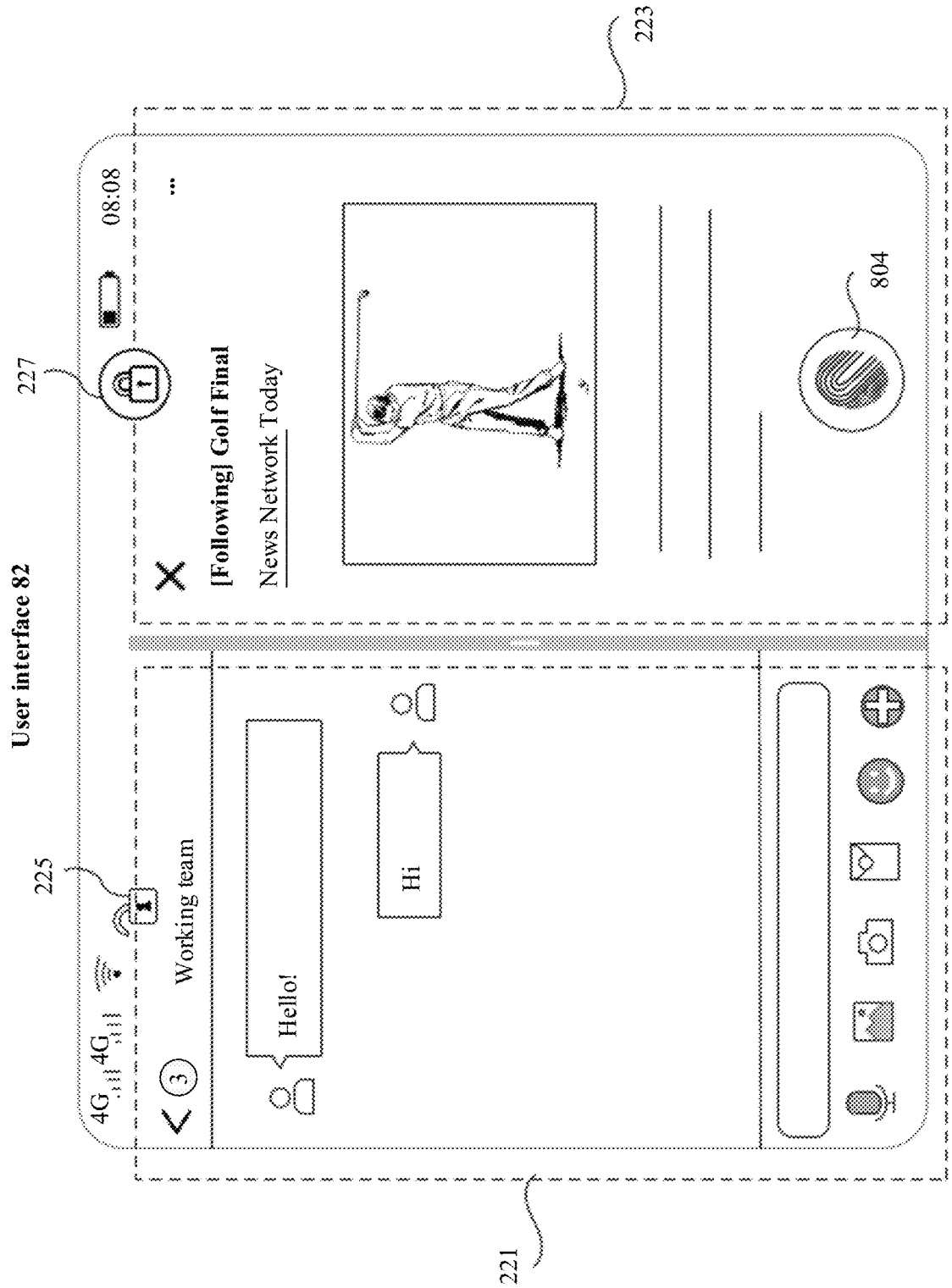
FIG. 8D is a schematic diagram of a display interface according to an embodiment of this application.

In some other embodiments, the system UI may alternatively invoke the application locking module to process the tapping event. The application lock module verifies the user identity. In this manner, the application locking module displays an unlock indicator 804 in a display area 223. For example, for a user interface displayed by the electronic device 10, refer to FIG. 8D. When the received fingerprint information of the user matches the pre-stored fingerprint information, the application locking module unlocks the display area 223 of the display, and no longer displays the unlock indicator 804.

It should be noted that the screen locking module and the application locking module may further have other manners of verifying the user identity, for example, performing facial recognition based on facial information collected by the camera, or performing voiceprint recognition based on sound information collected by the microphone.

In one embodiment, if the screen locking module or the application locking module fails to verify the user identity, the electronic device 10 may display prompt information to prompt the user that the user identity is unsuccessfully verified, and display, after preset duration, a user interface before unlocking. Refer to the user interface 62 shown in FIG. 6B.

S404: The screen locking module feeds back a verification result to the policy module.

S405: The policy module invokes the activity task stack and lifecycle management module based on the verification result, to set a status of an activity task stack B to an unlocked state.

The verification result is that the user identity is successfully verified. It should be noted that, if the verification result is that the user identity is unsuccessfully verified, the policy module does not modify the status of the activity task stack B. The electronic device 10 does not adjust a display status of the lock control 227.

In one embodiment, before the policy module invokes the activity task stack and lifecycle management module to set the status of the activity task stack B, the policy module may query the status of the activity task stack B, and determine that a current state of the activity task stack B is the locked state.

S406: The activity task stack and lifecycle management module sets the status of the activity task stack B to the unlocked state.

S407: The activity task stack and lifecycle management module feeds back the status of the activity task stack B to the policy module.

S408: The policy module indicates the system UI to refresh a user interface.

S409: The system UI refreshes the user interface, and switches the display status of the lock control 227 to an unlocking state.

For example, for a user interface after switching, refer to the user interface 31 shown in FIG. 3A.

In some embodiments, the user interface of the electronic device further includes a navigation bar. For example, refer to a user interface 91 shown in FIG. 9A. The user interface 91 includes a display area 221, a display area 223, a screen separation bar 229, and a navigation bar 901. The navigation bar 901 may include system navigation buttons such as a back button 902, a home screen (Home Screen) button 903, and a historical task call-out button 904. Names of the navigation buttons may alternatively be other names. This is not limited in this application. Not limited to a virtual button, each navigation button in the navigation bar 901 may alternatively be implemented as a physical button. In this example, the display area 221 is in an unlocked state, and the display area 223 is in a locked state.

In some embodiments, when it is detected that the user taps the back button 902, the electronic device 10 switches a display area (namely, the display area 221) in the unlocked state to display a previous interface of a current interface. For example, for a display interface of the electronic device 10 after switching, refer to a user interface 92 shown in FIG. 9C. When it is detected that the user taps the home screen button 903, the electronic device 10 switches a display area (namely, the display area 221) in the unlocked state to display the home screen. For example, for a display interface of the electronic device 10 after switching, refer to a user interface 93 shown in FIG. 9D. When it is detected that the user taps the historical task call-out button 904, the electronic device 10 displays, in a display area (namely, the display area 221) in the unlocked state, a task recently started by the user. In one embodiment, the task recently started by the user includes only a user interface in an activity task stack corresponding to the display area 221. In another embodiment, the task recently started by the user includes user interfaces in activity task stacks corresponding to the display area 221 and the display area 223. For example, for a display interface of the electronic device 10 after switching, refer to a user interface 94 shown in FIG. 9E. If the user selects a historical interface, the electronic device 10 displays the historical interface in the display area in the unlocked state.

In another example, both the display area 221 and the display area 223 are in the unlocked state. For example, refer to a user interface 98 shown in FIG. 9I. The user interface 98 includes the display area 221, the display area 223, a screen separation bar 229, and a navigation bar 901. The navigation bar 901 may include system navigation buttons such as a back button 902, a home screen (Home Screen) button 903, and a historical task call-out button 904. When it is detected that the user taps the back button 902, the electronic device 10 exits split-screen display, and displays the original display area 221 in full screen or displays an interface of the original display area 223 in full screen. For example, for a display interface of the electronic device 10 after switching, refer to a user interface 44 shown in FIG. 4E. When it is detected that the user taps the home screen button 903, the electronic device 10 exits the split-screen display, and displays the home screen in full screen. For example, for a display interface of the electronic device 10 after switching, refer to a user interface 95 shown in FIG. 9F. When it is detected that the user taps the historical task call-out button 904, the electronic device 10 may display, in full screen, a task recently started by the user. In one embodiment, the task recently started by the user includes user interfaces in activity task stacks corresponding to the display area 221 and the display area 223. For example, for a display interface of the electronic device 10 after switching, refer to a user interface 96 shown in FIG. 9G. If the user selects a historical interface, the electronic device 10 displays the historical interface in full screen.

Figure 9B:
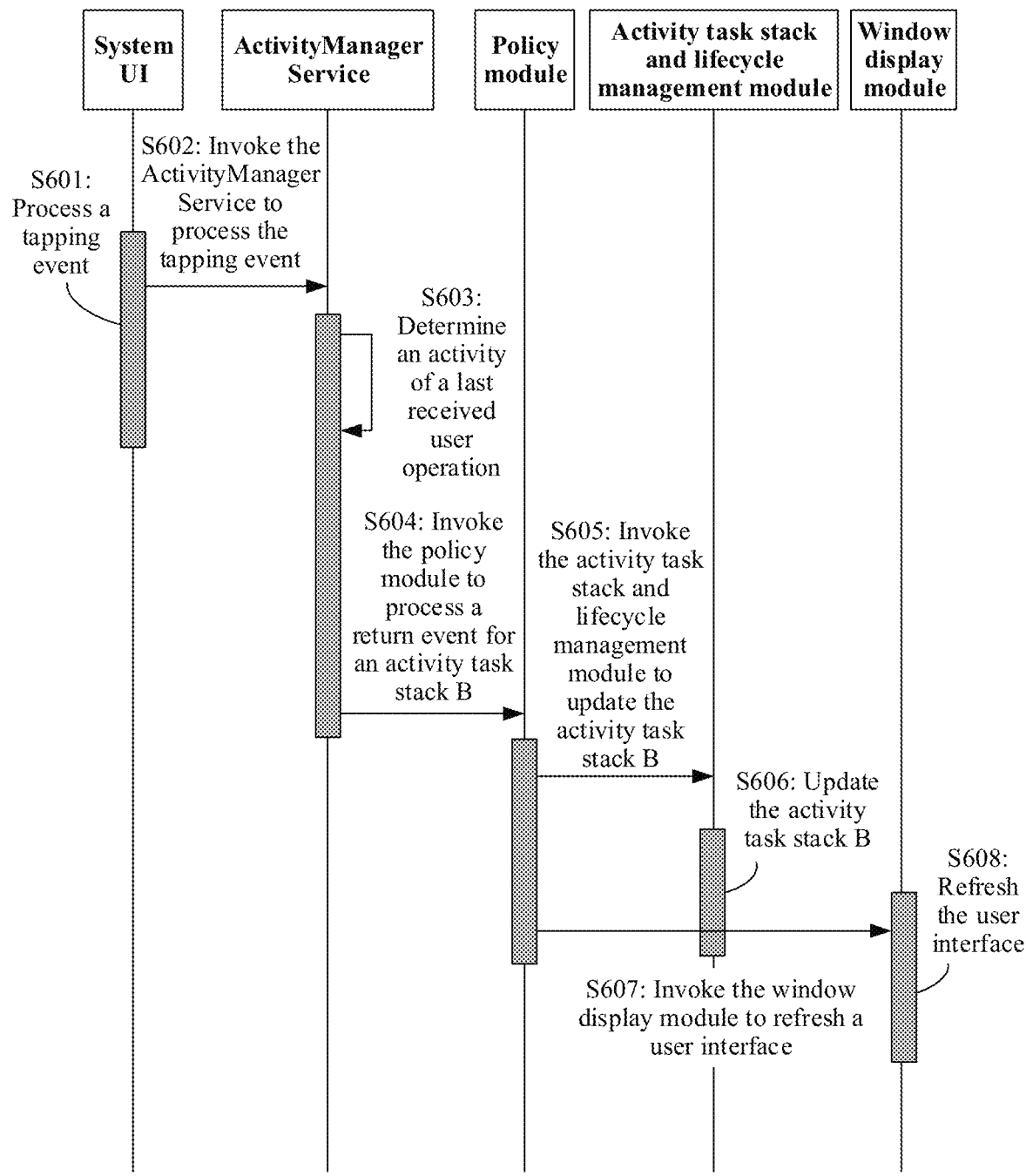
FIG. 9B is a flowchart of a return operation according to an embodiment of this application.
Figure 9C:
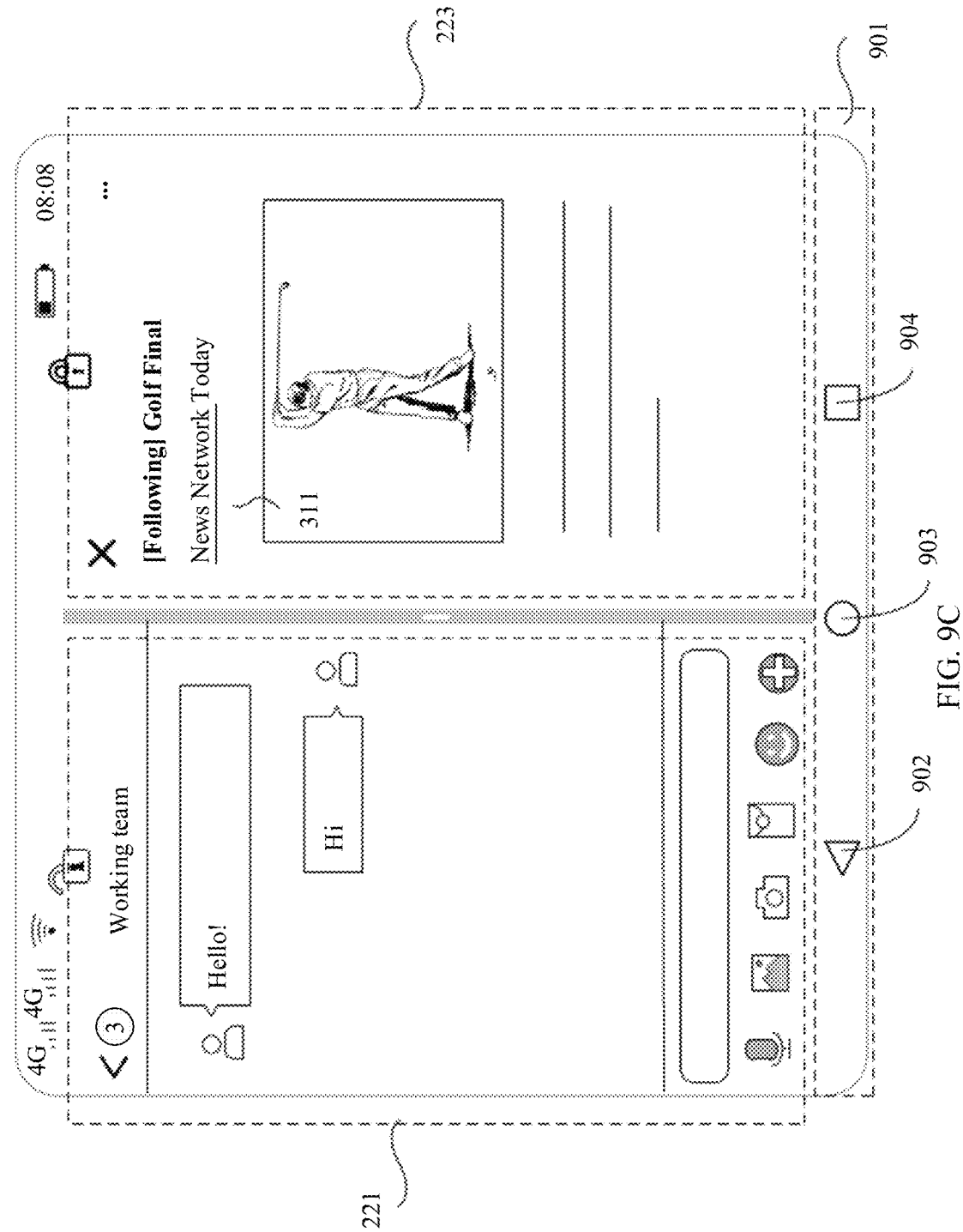
FIG. 9C to FIG. 9I are schematic diagrams of some display interfaces according to an embodiment of this application.
Figure 9D:
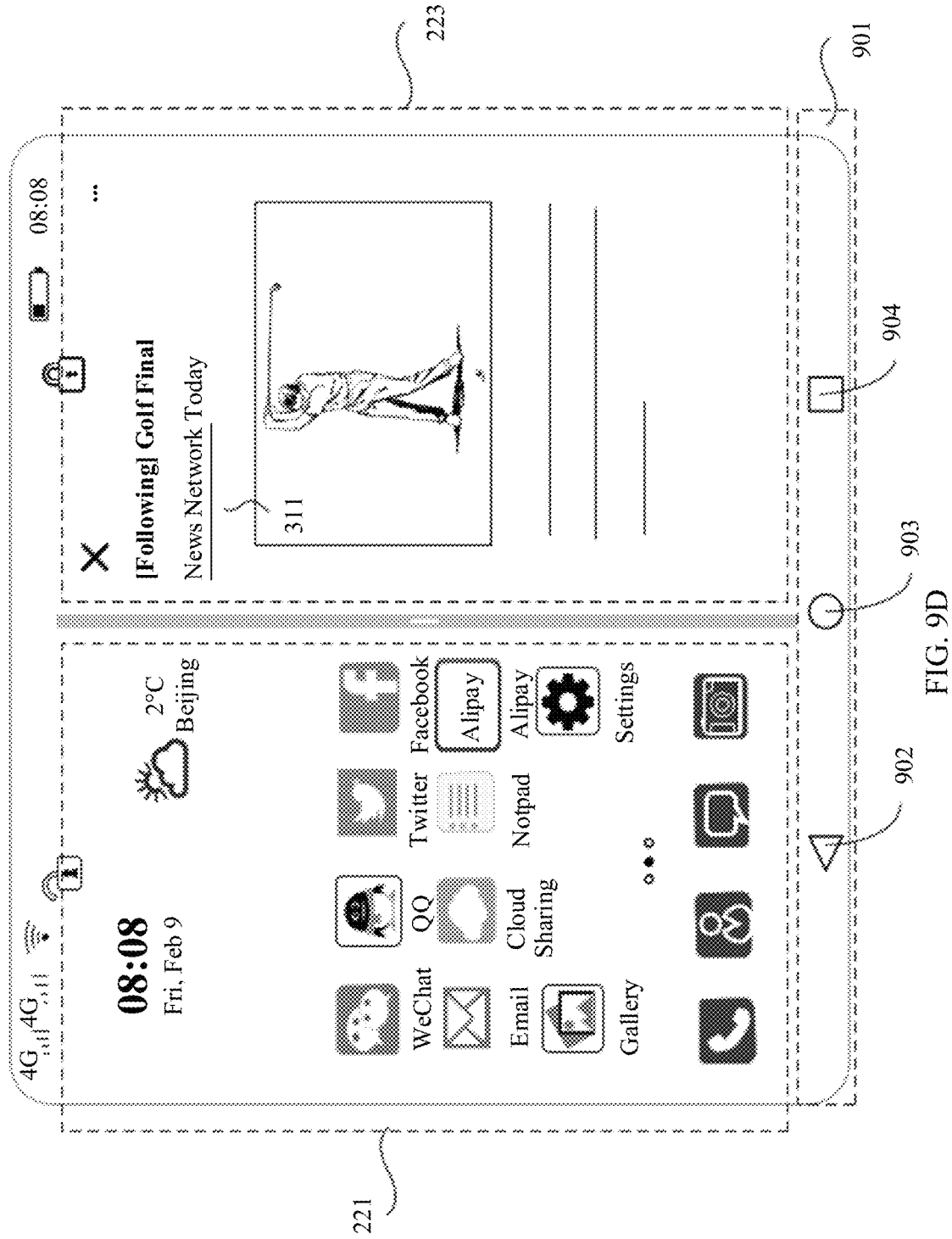
Figure 9E:
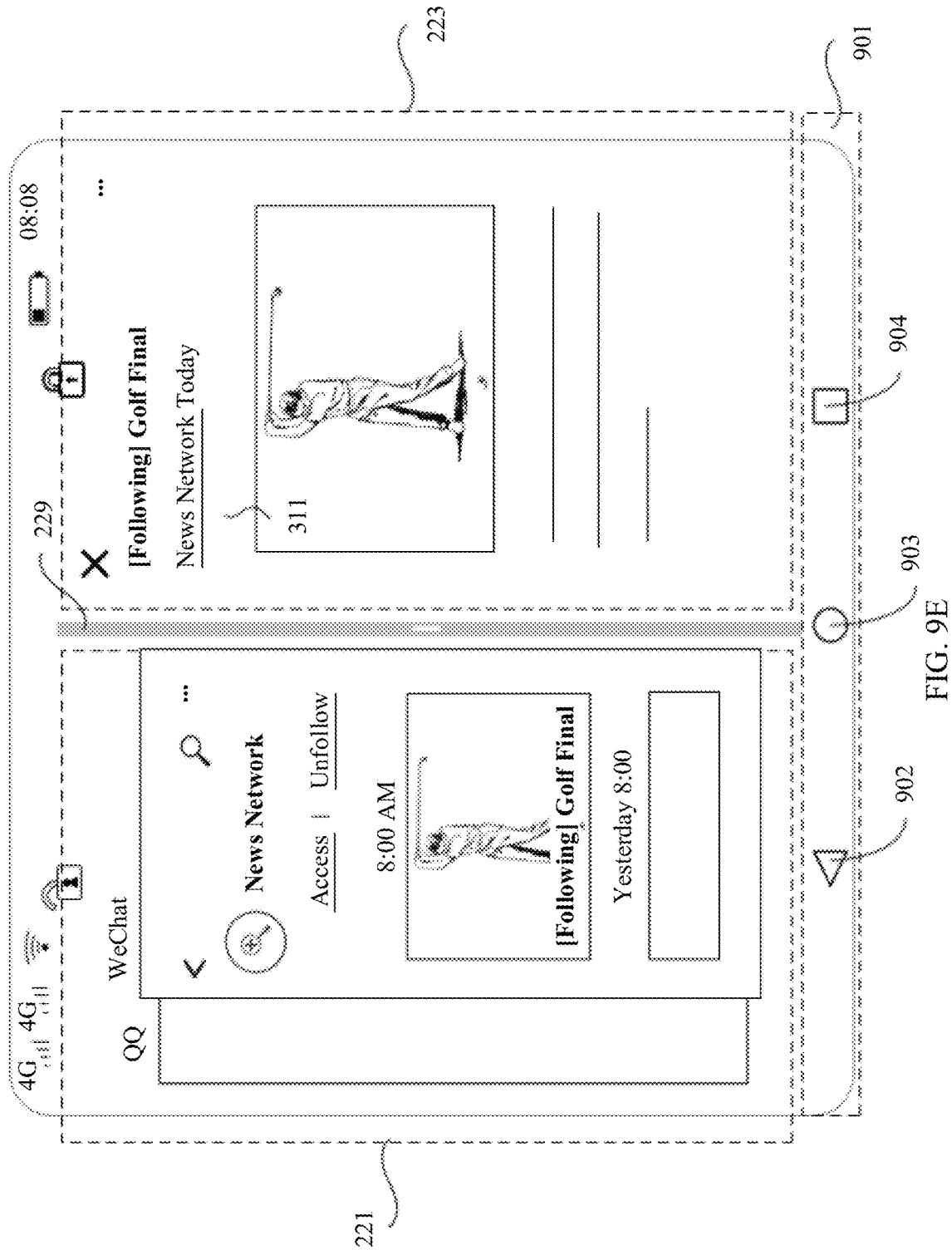
Figure 9F:
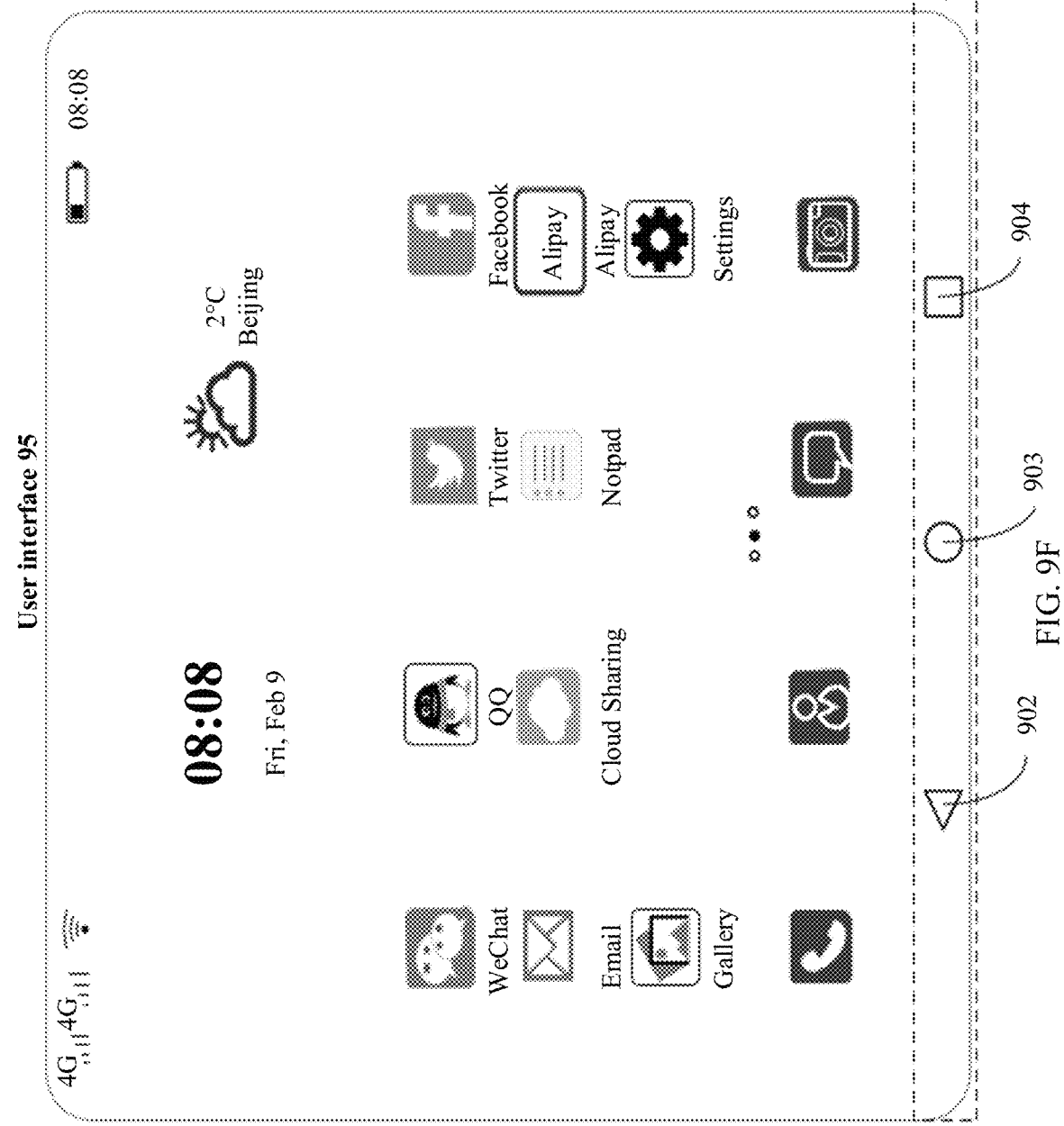
Figure 9G:
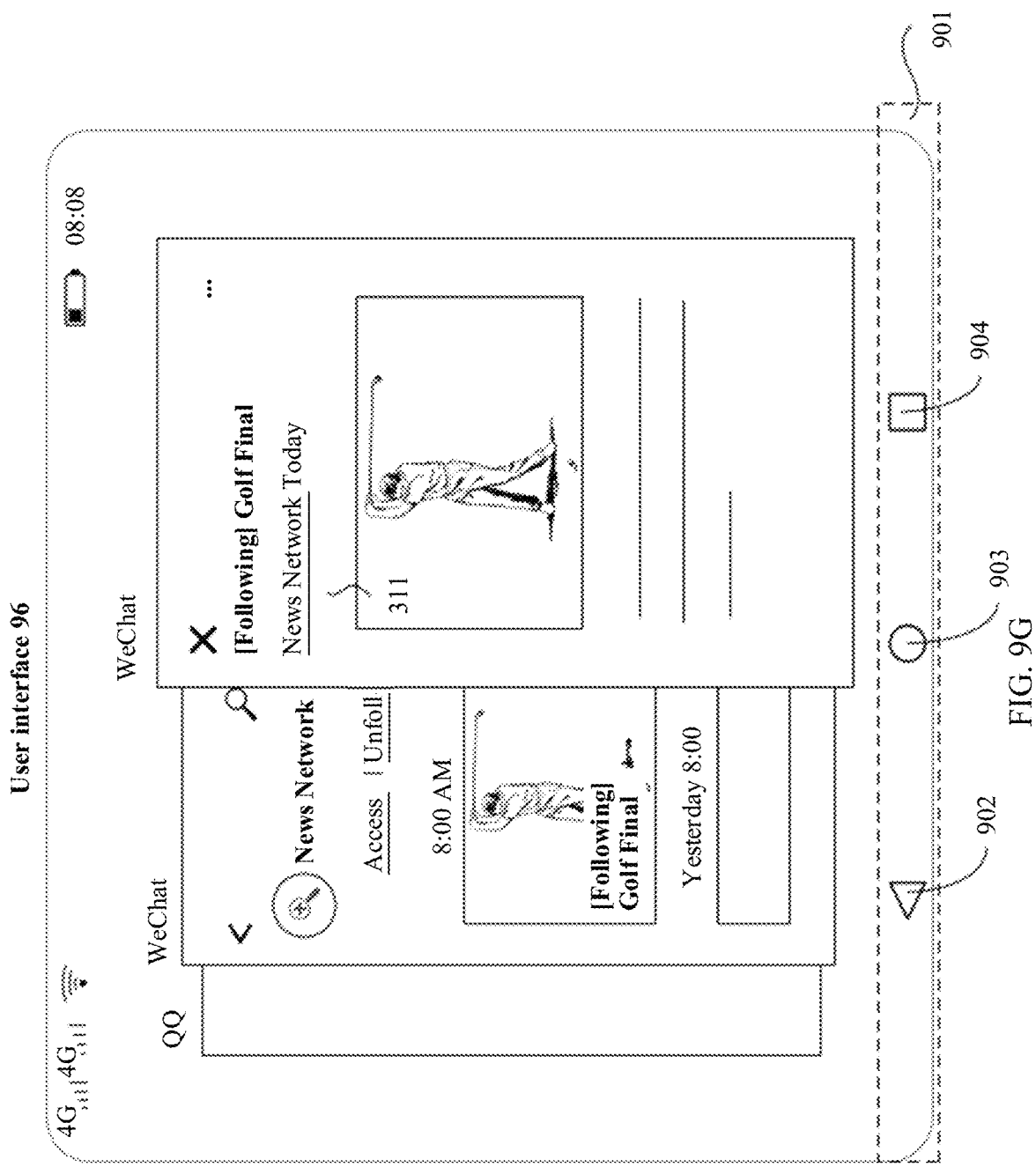

In some other embodiments, if the user taps the back button 902, in response to the tapping operation, the electronic device 10 determines an activity of a last received user operation before the back button 902 is tapped, and switches a display area corresponding to the activity to display a previous activity of the currently displayed activity. For example, FIG. 9B is a flowchart of a return operation according to an embodiment of this application.

S601: The system UI processes a tapping event in response to an operation of tapping a lock control by the user.

S602: The system UI invokes the ActivityManagerService to process the tapping event.

S603: The ActivityManagerService determines an activity of a last received user operation.

In this example, an example in which the activity of the last received user operation is an activity displayed in a display area 221 on the user interface 91 is used.

S604: The ActivityManagerService invokes, based on the activity of the last received user operation, the policy module to process a return event for an activity task stack B.

The activity task stack B is an activity task stack corresponding to the display area 221.

S605: The policy module invokes the activity task stack and lifecycle management module to update the activity task stack B.

S606: The stack and lifecycle management module updates the activity task stack B.

Specifically, the activity task stack and lifecycle management module pops up a current activity of the activity task stack B from the top of the stack (where the activity is destroyed), and restore execution of an activity (which is a chat interface of a QQ application in an example) before the new activity.

S607: The policy module invokes the window display module to refresh a user interface.

S608: The window display module refreshes the user interface, and switches the display area 221 to display the chat interface of the QQ application. For example, for a display interface of the electronic device 10 after switching, refer to the user interface 92 shown in FIG. 9C.

It should be noted that, when the electronic device 10 is in a split-screen display state, if the user taps the home screen button 903, in response to the tapping operation, the electronic device 10 determines the activity of the last received user operation before the home screen button 903 is tapped, and switches the display area corresponding to the activity to display the home screen. For example, for a display interface of the electronic device 10 after switching, refer to the user interface 93 shown in FIG. 9D.

In some other embodiments, when the electronic device 10 is in the split-screen display state, if the user taps the historical task call-out button 904, the electronic device 10 may display, in full screen in response to the tapping operation, a task recently started by the user. If the user selects a historical interface, the electronic device 10 determines the activity of the last received user operation before the historical task call-out button 904 is tapped, and switches the display area corresponding to the activity to display the historical interface.

Figure 9H:
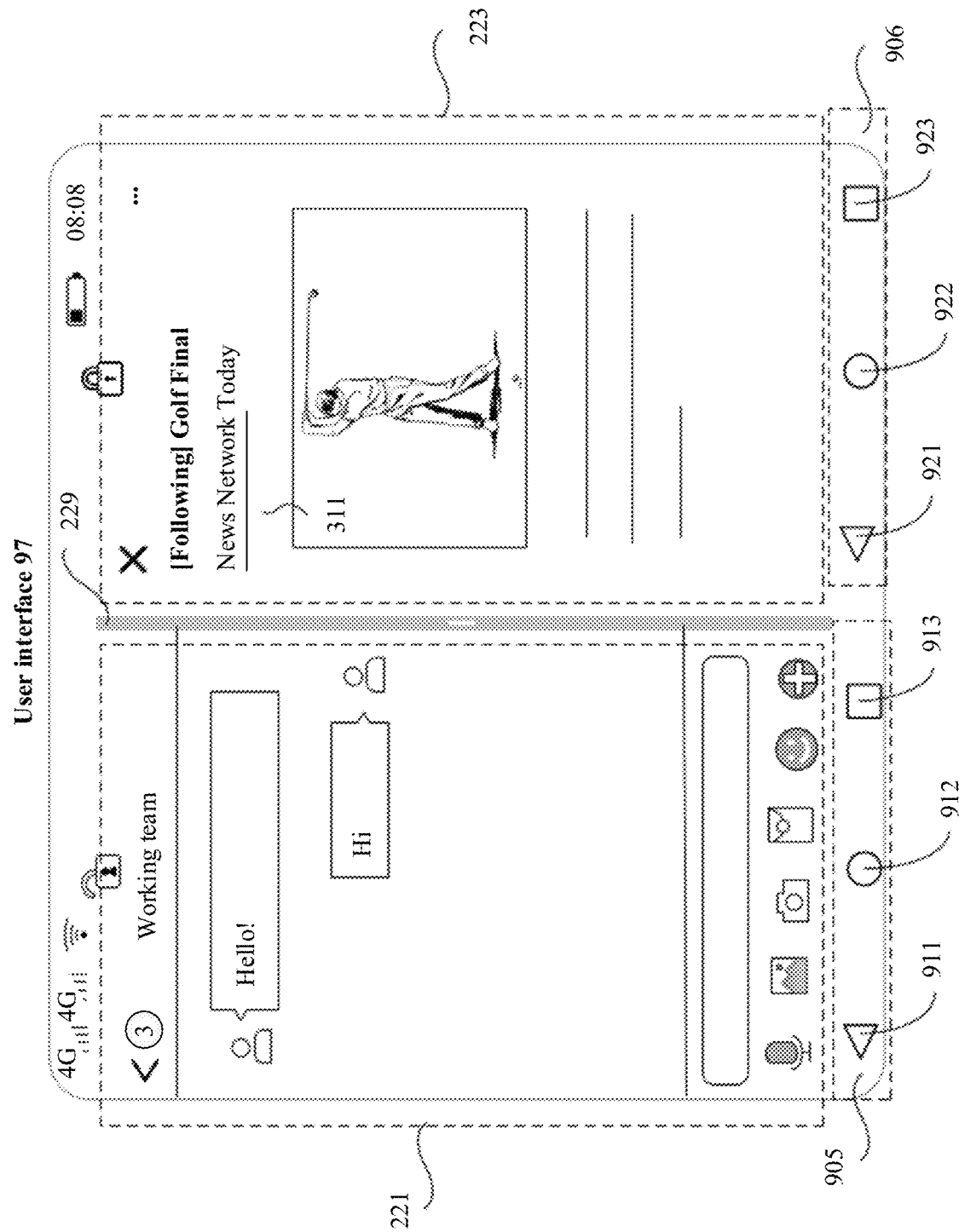

In another embodiment, for a manner in which the user interface of the electronic device 10 includes the navigation bar, further refer to a user interface 97 shown in FIG. 9H. The user interface 97 includes a display area 221, a display area 223, a screen separation bar 229, a navigation bar 905, and a navigation bar 906. The navigation bar 905 may include system navigation buttons such as a back button 911, a home screen (Home Screen) button 912, and a historical task call-out button 913. The navigation bar 906 may include system navigation buttons such as a back button 921, a home screen (Home Screen) button 922, and a historical task call-out button 923. Names of the navigation buttons may alternatively be other names. This is not limited in this application.

In this embodiment, there is a correspondence between the navigation bar 905 and the display area 221. When it is detected that the user taps the back button 911, the electronic device 10 switches the display area 221 to display a previous interface of a current interface. When it is detected that the user taps the home screen button 912, the display area 221 of the electronic device 10 is switched to display the home screen. When it is detected that the user taps the historical task call-out button 913, the electronic device 10 may display, in the display area 221, a task recently started by the user. In one embodiment, the task recently started by the user includes only a user interface in an activity task stack corresponding to the display area 221. In another embodiment, the task recently started by the user includes user interfaces in activity task stacks corresponding to the display area 221 and the display area 223. If the user selects a historical interface, the electronic device 10 displays the historical interface in the display area 221.

There is a correspondence between the navigation bar 906 and the display area 223. When it is detected that the user taps the back button 921, the electronic device 10 switches the display area 223 to display a previous interface of a current interface. When it is detected that the user taps the home screen button 922, the display area 223 of the electronic device 10 is switched to display the home screen. When it is detected that the user taps the historical task call-out button 923, the electronic device 10 may display, in the display area 223, a task recently started by the user. In one embodiment, the task recently started by the user includes only a user interface in an activity task stack corresponding to the display area 223. In another embodiment, the task recently started by the user includes user interfaces in activity task stacks corresponding to the display area 221 and the display area 223. If the user selects a historical interface, the electronic device 10 displays the historical interface in the display area 221.

It should be noted that, if the electronic device 10 includes a plurality of display areas, one display area may correspond to one group of navigation bars. Refer to the foregoing example, the user may switch a display interface of the display area by using a navigation bar corresponding to the display area.

Figure 10:
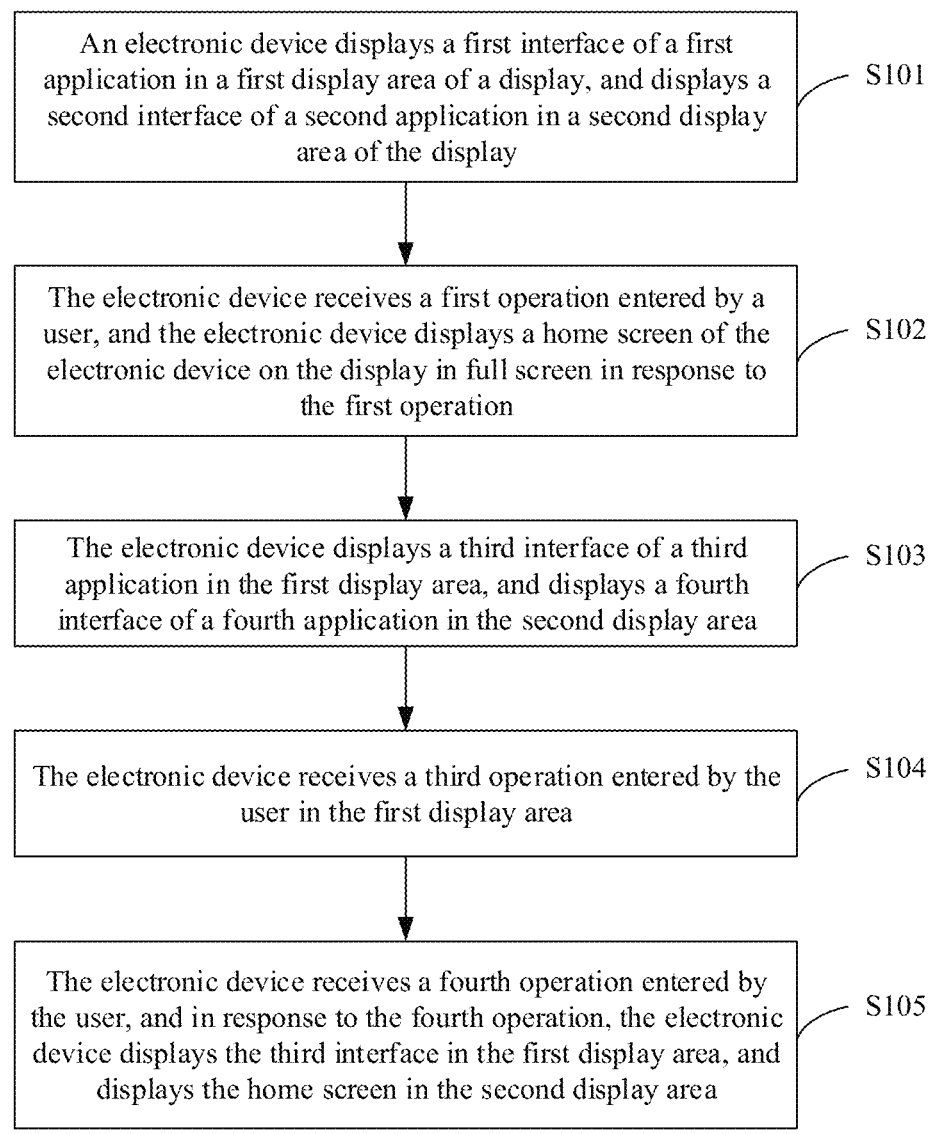
FIG. 10 is a flowchart of a split-screen display method according to an embodiment of this application.

Based on the embodiments and the electronic device 10 that are described in the foregoing content, the following describes the split-screen display method provided in embodiments of this application. FIG. 10 is a flowchart of the split-screen display method according to an embodiment of this application. As shown in FIG. 10, the method includes the following operations.

S101: An electronic device displays a first interface of a first application in a first display area of a display, and displays a second interface of a second application in a second display area of the display.

Figure 9I:
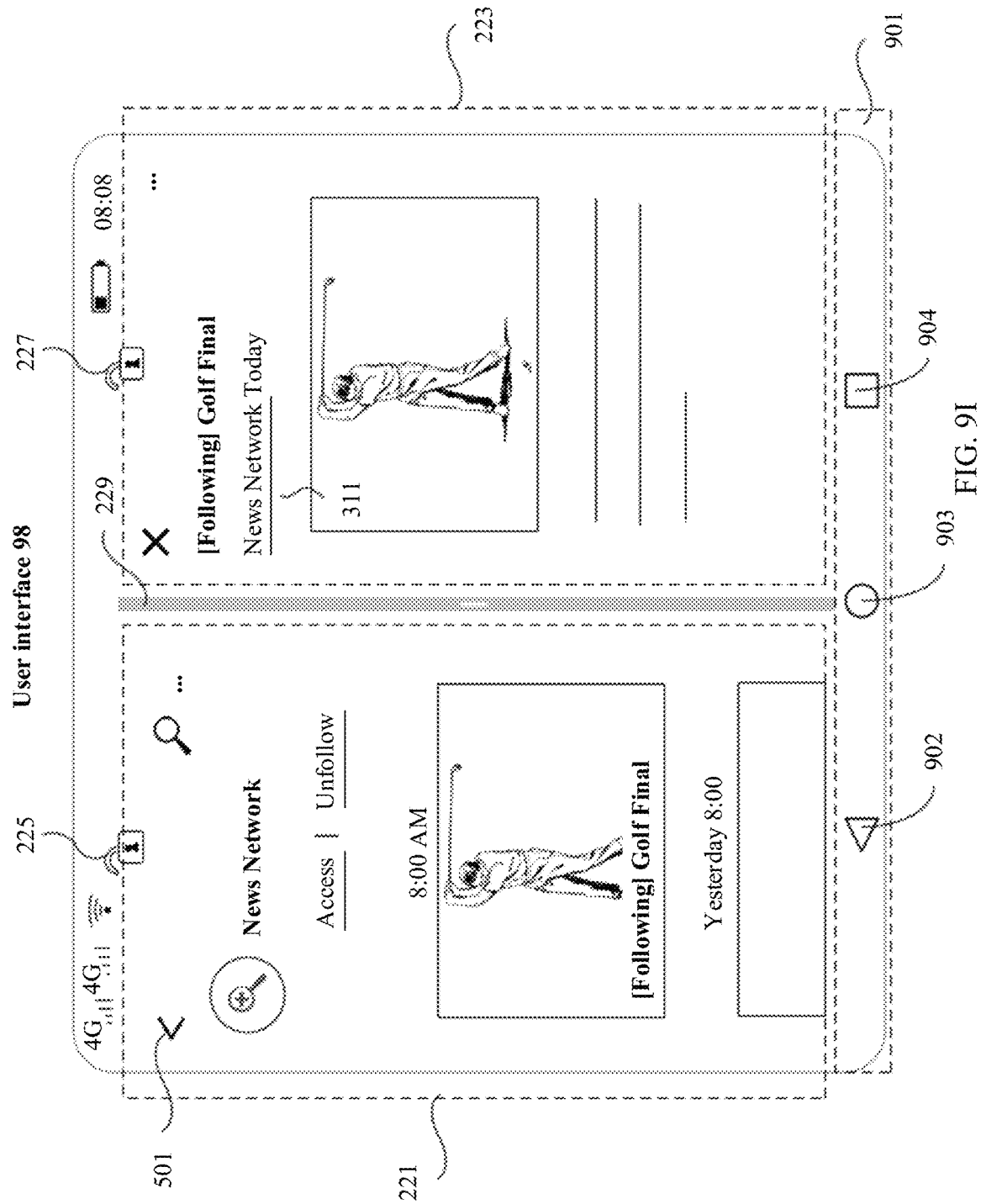

For example, for a user interface displayed by the electronic device, refer to the user interface 98 shown in FIG. 9I. For the first display area, refer to the display area 223 in FIG. 9I. For the second display area, refer to the display area 221 in FIG. 9I. The first application is a WeChat application, and the second application is also the WeChat application.

For example, for the user interface displayed by the electronic device, alternatively refer to the user interface 31 shown in FIG. 3A. For the first display area, refer to the display area 223 in FIG. 3A. For the second display area, refer to the display area 221 in FIG. 3A. The first application is a WeChat application, and the second application is a QQ application. It should be noted that the first application and the second application may be a same application, or the first application and the second application may be different applications.

S102: The electronic device receives a first operation entered by a user, and the electronic device displays a home screen of the electronic device on the display in full screen in response to the first operation.

The first operation may be an operation that is used to trigger the electronic device to switch back to the home screen and that is entered by the user. For example, refer to embodiments corresponding to FIG. 9F to FIG. 9I. The first operation may be an operation (for example, a tapping operation, a double-tapping operation, a touching and holding operation, or another operation) performed by the user on the home screen button 903. In one embodiment, the first operation may alternatively be a dragging operation, a force-touching operation, a voice input operation, an optical input operation, a floating gesture operation, or an operation in another manner. For example, for a user interface on the home screen displayed by the electronic device in full screen, refer to the user interface 95 shown in FIG. 9F.

S103: The electronic device displays a third interface of a third application in the first display area, and displays a fourth interface of a fourth application in the second display area.

It should be noted that, before performing operation S103, the electronic device may receive a second operation entered by the user, and in response to the second operation, the electronic device displays the third interface of the third application in the first display area, and displays the fourth interface of the fourth application in the second display area. The second operation may include a plurality of operations. For example, a procedure of triggering the electronic device to display the third interface and the fourth interface may be as follows: The user first enters, on the home screen, an operation for an icon of the third application, and the electronic device displays the third interface of the third application on the display in response to the operation. Then, the user enters a screen splitting operation on the display of the electronic device (for example, the user touches and holds a historical task call-out button on a navigation bar (refer to the historical task call-out button 904 on the user interface 95)), and the electronic device displays the third interface in the first display area of the display, and displays, in the second display area of the display, an icon of an application that supports a screen splitting function and that is installed on the electronic device. Then, the user enters an operation for an icon of the fourth application, and the electronic device displays the fourth interface of the fourth application in the second display area in response to the operation. The second operation includes the operation entered by the user on the home screen for the icon of the third application, the screen splitting operation entered by the user on the display of the electronic device, and an operation entered by the user for the icon of the fourth application. The second operation may alternatively be another operation. This is not limited in this embodiment of this application.

For example, for a user interface displayed by the electronic device, refer to the user interface 98 shown in FIG. 9I. For the first display area, refer to the display area 223 in FIG. 9I. For the second display area, refer to the display area 221 in FIG. 9I. The third application is a WeChat application, and the fourth application is also the WeChat application. It should be noted that the third application and the fourth application may be a same application, or the third application and the fourth application may be different applications. The third application, the first application, and the second application may be a same application or different applications. The fourth application, the first application, and the second application may be a same application or different applications.

For example, for the user interface displayed by the electronic device, alternatively refer to the user interface 31 shown in FIG. 3A. For the first display area, refer to the display area 223 in FIG. 3A. For the second display area, refer to the display area 221 in FIG. 3A. The third application is a WeChat application, and the fourth application is a QQ application.

S104: The electronic device receives a third operation entered by the user in the first display area.

The third operation may be an operation that is used to lock display content in the first display area and that is entered by the user. For example, refer to embodiments shown in FIG. 3A and FIG. 3B. The third operation may be an operation (for example, a tapping operation, a double-tapping operation, a touching and holding operation, or another operation) performed by the user on the control 227. In one embodiment, the third operation may alternatively be a dragging operation, a force-touching operation, a voice input operation, an optical input operation, a floating gesture operation, or an operation in another manner. The user can conveniently lock the display content in the first display area by performing the third operation. It should be noted that, after the display content of the first display area is locked, the user may perform an operation on the display content in the first display area. For example, refer to the embodiment shown in FIG. 3B. The user may slide up or down in the first display area to view other content of a current official account. In some other embodiments, if a document editing screen is displayed in the first display area, the user may enter content in the first display area.

In one embodiment, the first display area includes a first control, and the second display area includes a second control. Before that the electronic device receives a third operation entered by the user in the first display area, the first control is displayed in a first state, and the second control is displayed in the first state. The method further includes: The electronic device switches, in response to the third operation, the first control from being displayed in the first state to being displayed in a second state.

For example, refer to the embodiments shown in FIG. 3A and FIG. 3B, the first display area may be the display area 223 in FIG. 3A or FIG. 3B, and the first control may be the control 227 in FIG. 3A or FIG. 3B. The second display area may be the display area 221 in FIG. 3A or FIG. 3B, and the second control may be the control 225 in FIG. 3A or FIG. 3B. Before the third operation is received, the first control is displayed in the first state (refer to a display state of the control 227 in FIG. 3A), and the second control is displayed in the first state (refer to the display state of the control 225 in FIG. 3A). After the third operation is received, the first control is switched from being displayed in the first state to being displayed in the second state (refer to the display state of the control 227 in FIG. 3B). In this manner, the user can conveniently view a lock status of a split-screen display area.

S105: The electronic device receives a fourth operation entered by the user, and in response to the fourth operation, the electronic device displays the third interface in the first display area, and displays the home screen in the second display area.

An operation manner of the fourth operation is the same as that of the first operation. The fourth operation may also be the operation that is used to trigger the electronic device to switch back to the home screen and that is entered by the user. For example, refer to embodiments shown in FIG. 9A to FIG. 9D. The fourth operation may be an operation (for example, a tapping operation, a double-tapping operation, a touching and holding operation, or another operation) performed by the user on the home screen button 903. In one embodiment, the fourth operation may alternatively be a dragging operation, a force-touching operation, a voice input operation, an optical input operation, a floating gesture operation, or an operation in another manner. For example, for a user interface displayed by the electronic device in response to the fourth operation, refer to the user interface 93 shown in FIG. 9D. On the user interface 93, for the first display area, refer to the display area 223, and for the second display area, refer to the display area 221.

In one embodiment, after that the electronic device receives a third operation entered by the user in the first display area, the method further includes: The electronic device receives a thirteenth operation entered by the user for the first control. The electronic device verifies a user identity in response to the thirteenth operation. If the verification succeeds, the electronic device switches the first control from being displayed in the second state to being displayed in the first state. In this way, unlocking security can be improved.

Figure 6B:
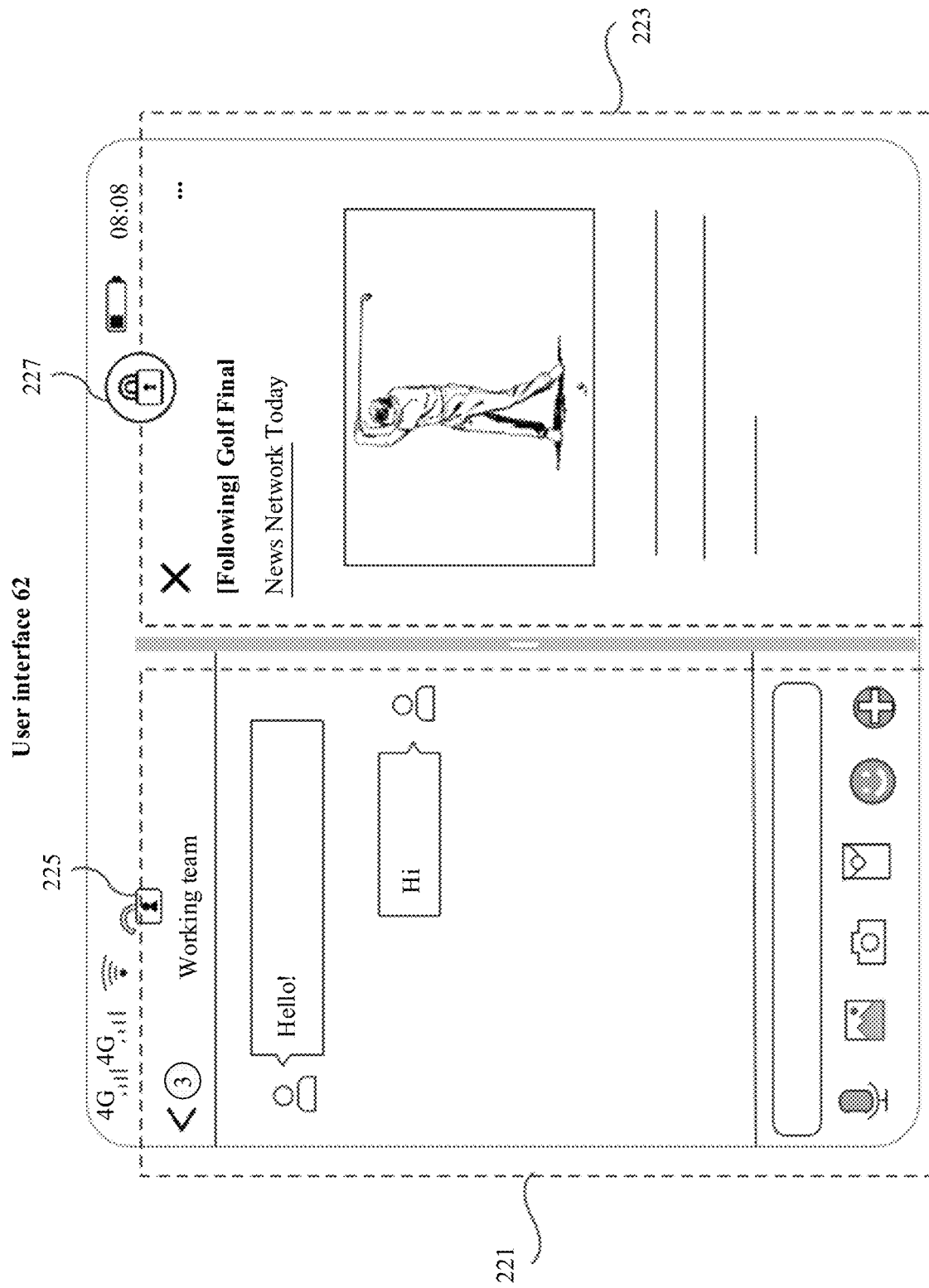

For example, refer to an embodiment corresponding to FIG. 6B. The thirteenth operation may be an operation of tapping the lock control 227 by the user. For a procedure of releasing the locked state of the first display area by the electronic device, refer to the embodiment shown in FIG. 8A.

In another embodiment, after that the electronic device receives a third operation entered by the user in the first display area, the method further includes: The electronic device obtains a biometric feature of the user. The electronic device determines that the biometric feature matches a pre-stored biometric feature. The electronic device receives a fourteenth operation entered by the user for the first control, and the electronic device switches, in response to the fourteenth operation, the first control from being displayed in the second state to being displayed in the first state. The biometric feature may include physiological data, for example, facial information, fingerprint information, or voiceprint information of the user. In this manner, unlocking efficiency can be improved when unlocking security is ensured.

In another embodiment, after that the electronic device receives a third operation entered by the user in the first display area, the method further includes: The electronic device obtains a biometric feature of the user. The electronic device determines that the biometric feature does not match a pre-stored biometric feature. The electronic device receives a fifteenth operation entered by the user. The electronic device verifies a user identity in response to the fifteenth operation. If the verification succeeds, the electronic device switches the first control from being displayed in the second state to being displayed in the first state. In this way, unlocking security can be improved.

In some embodiments, when the electronic device displays the third interface in the first display area, and displays the home screen in the second display area, the electronic device receives a fifth operation entered by the user for the third interface. In response to the fifth operation, the electronic device displays the third interface in the first display area, and displays a fifth interface of the third application in the second display area.

For example, refer to the embodiments in FIG. 4B to FIG. 5A. The electronic device displays the third interface in the first display area, and displays the home screen in the second display area. Refer to the user interface 41 shown in FIG. 4B. The fifth operation may be an operation entered by the user for the control 311. The electronic device displays the third interface in the first display area, and displays the fifth interface of the third application in the second display area. Refer to the user interface 51 shown in FIG. 5A.

In some embodiments, when the electronic device displays the third interface in the first display area, and displays the fifth interface of the third application in the second display area, the electronic device receives a sixth operation entered by the user in the second display area. The electronic device receives a seventh operation entered by the user for the third interface. In response to the seventh operation, the electronic device displays a sixth interface of the third application in the first display area, and displays the fifth interface in the second display area.

For example, refer to the embodiments in FIG. 3B to FIG. 5C and FIG. 5D. The electronic device displays the third interface in the first display area, and displays the fifth interface of the third application in the second display area. Refer to the user interface 32 shown in FIG. 3B. The sixth operation may be an operation entered by the user for the control 225. Then, the electronic device may display the user interface 52 shown in FIG. 5C. The seventh operation may be an operation entered by the user for the control 311. The electronic device displays the sixth interface of the third application in the first display area, and displays the fifth interface in the second display area. Refer to the user interface 53 shown in FIG. 5D.

In some embodiments, when the electronic device displays the first interface in the first display area, and displays the second interface in the second display area, the electronic device receives an eighth operation entered by the user. The electronic device displays a seventh interface on the display in full screen in response to the eighth operation. The seventh interface includes interface content of the first interface and interface content of the second interface. When the electronic device displays the third interface in the first display area, and displays the home screen in the second display area, the electronic device receives a ninth operation entered by the user. In response to the ninth operation, the electronic device displays the third interface in the first display area, and displays an eighth interface in the second display area. The eighth interface includes interface content of the first interface, interface content of the second interface, and interface content of the fourth interface. An operation manner of the ninth operation is the same as that of the eighth operation.

For example, the eighth operation and the ninth operation may be an operation that is used to call out a historical taskbar. The electronic device displays the first interface in the first display area, and displays the second interface in the second display area. Refer to the user interface shown in FIG. 9I. The eighth operation entered by the user may be an operation performed by the user on the historical task call-out button 904.

In some embodiments, when the electronic device displays the first interface in the first display area, and displays the second interface in the second display area, the electronic device receives a tenth operation entered by the user. The electronic device displays interface content of the first interface or interface content of the second interface on the display in full screen in response to the tenth operation. When the electronic device displays the third interface in the first display area, and displays the fourth interface in the second display area, the electronic device receives an eleventh operation entered by the user in the first display area. An operation manner of the eleventh operation is the same as that of the third operation. The electronic device receives a twelfth operation entered by the user. In response to the twelfth operation, the electronic device displays the third interface in the first display area, and displays the home screen in the second display area.

For example, the tenth operation and the twelfth operation may be an operation that is used to exit an interface and that is entered by the user. The electronic device displays the first interface in the first display area, and displays the second interface in the second display area. Refer to the user interface shown in FIG. 9I. The tenth operation entered by the user may be an operation performed by the user on the back button 902. The eleventh operation entered by the user may be an operation on a control 227.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (Solid State Disk)), or the like.

In conclusion, what is described above is merely embodiments of the technical solutions of this application, but is not intended to limit the protection scope of this application. Any modification, equivalent replacement, improvement, or the like made according to the disclosure of this application shall fall within the protection scope of this application.

What is claimed is:

1. A split-screen display method, comprising:
displaying, by an electronic device, a first interface of a first application in a first display area of a display, and displaying a second interface of a second application in a second display area of the display;
receiving, by the electronic device, a first operation entered by a user, and displaying, by the electronic device, a home screen of the electronic device on the display in full screen in response to the first operation;
displaying, by the electronic device, a third interface of a third application in the first display area, and displaying a fourth interface of a fourth application in the second display area in response to a second operation entered by the user;
switching, by the electronic device, a split screen locking control from a first display state to a second display state to enable a split screen locking function of the electronic device, in response to an operation by the user;
receiving, by the electronic device, a third operation entered by the user in the first display area, wherein the third operation is to lock display content in the first display area;
invoking, by the electronic device, an activity task stack corresponding to the first display area based on the third operation, to set a lock status of the activity task stack;
switching, by the electronic device, a display status of a lock control of the first display area to a locking state based on the lock status of the activity task stack;
receiving, by the electronic device, a fourth operation entered by the user; and
in response to the fourth operation, displaying, by the electronic device, the third interface in the first display area, and displaying the home screen in the second display area, wherein an operation manner of the fourth operation is the same as an operation manner of the first operation.

2. The method according to claim 1, further comprising:
receiving, by the electronic device, a fifth operation entered by the user for the third interface; and
in response to the fifth operation, displaying, by the electronic device, the third interface in the first display area, and displaying a fifth interface of the third application in the second display area.

3. The method according to claim 2, further comprising:
receiving, by the electronic device, a sixth operation entered by the user in the second display area;
receiving, by the electronic device, a seventh operation entered by the user for the third interface; and
in response to the seventh operation, displaying, by the electronic device, a sixth interface of the third application in the first display area, and displaying the fifth interface in the second display area.

4. The method according to claim 1, further comprising:
when the electronic device displays the first interface in the first display area, and displays the second interface in the second display area, receiving, by the electronic device, an eighth operation entered by the user;
displaying, by the electronic device, a seventh interface on the display in full screen in response to the eighth operation, wherein the seventh interface comprises interface content of the first interface and interface content of the second interface;
when the electronic device displays the third interface in the first display area, and displays the home screen in the second display area, receiving, by the electronic device, a ninth operation entered by the user; and
in response to the ninth operation, displaying, by the electronic device, the third interface in the first display area, and displaying an eighth interface in the second display area, wherein the eighth interface comprises interface content of the first interface, interface content of the second interface, and interface content of the fourth interface, and an operation manner of the ninth operation is the same as an operation manner of the eighth operation.

5. The method according to claim 1, further comprising:
when the electronic device displays the first interface in the first display area, and displays the second interface in the second display area, receiving, by the electronic device, a tenth operation entered by the user; and
displaying, by the electronic device, interface content of the first interface or interface content of the second interface on the display in full screen in response to the tenth operation.

6. The method according to claim 1, wherein the first display area comprises a first control, wherein the second display area comprises a second control, and wherein, before the receiving, by the electronic device, the third operation entered by the user in the first display area, the first control is displayed in a first state, and the second control is displayed in the first state; and
the method further comprising:
switching, by the electronic device in response to the third operation, the first control from being displayed in the first state to being displayed in a second state.

7. The method according to claim 6, wherein after the receiving, by the electronic device, the third operation entered by the user in the first display area, the method further comprising:
receiving, by the electronic device, a thirteenth operation entered by the user for the first control, and verifying, by the electronic device, a user identity in response to the thirteenth operation; and
if the verification succeeds, switching, by the electronic device, the first control from being displayed in the second state to being displayed in the first state.

8. The method according to claim 6, wherein after the receiving, by the electronic device, a third operation entered by the user in the first display area, the method further comprising:
obtaining, by the electronic device, a biometric feature of the user;
determining, by the electronic device, that the biometric feature matches a pre-stored biometric feature; and
receiving, by the electronic device, a fourteenth operation entered by the user for the first control, and switching, by the electronic device in response to the fourteenth operation, the first control from being displayed in the second state to being displayed in the first state.

9. The method according to claim 6, wherein after the receiving, by the electronic device, a third operation entered by the user in the first display area, the method further comprising:
obtaining, by the electronic device, a biometric feature of the user;
determining, by the electronic device, that the biometric feature does not match a pre-stored biometric feature;

receiving, by the electronic device, a fifteenth operation entered by the user, and verifying, by the electronic device, a user identity in response to the fifteenth operation; and if the verification succeeds, switching, by the electronic device, the first control from being displayed in the second state to being displayed in the first state.

10. An electronic device, wherein the electronic device comprises a display, a memory, and at least one processor; the memory is coupled to the at least one processor; the memory is configured to store computer program code comprising computer instructions, which when executed by the at least one processor, cause the electronic device to:

display a first interface of a first application in a first display area of the display, and display a second interface of a second application in a second display area of the display;

receive a first operation entered by a user, and display a home screen of the electronic device on the display in full screen in response to the first operation;

display a third interface of a third application in the first display area, and display a fourth interface of a fourth application in the second display area in response to a second operation entered by the user;

switch a split screen locking control from a first display state to a second display state to enable a split screen locking function of the electronic device, in response to an operation by the user;

receive a third operation entered by the user in the first display area, wherein the third operation is to lock display content in the first display area; and invoke an activity task stack corresponding to the first display area based on the third operation, to set a lock status of the activity task stack;

switch a display status of a lock control of the first display area to a locking state based on the lock status of the activity task stack;

receive a fourth operation entered by the user; and in response to the fourth operation, display the third interface in the first display area, and display the home screen in the second display area, wherein an operation manner of the fourth operation is the same as an operation manner of the first operation.

11. The electronic device according to claim 10, wherein the electronic device is further to:

receive a fifth operation entered by the user for the third interface; and in response to the fifth operation, display the third interface in the first display area, and display a fifth interface of the third application in the second display area.

12. The electronic device according to claim 11, wherein the electronic device is further to:

receive a sixth operation entered by the user in the second display area;

receive a seventh operation entered by the user for the third interface; and in response to the seventh operation, display a sixth interface of the third application in the first display area, and display the fifth interface in the second display area.

13. The electronic device according to claim 10, wherein the electronic device is further to:

when the electronic device displays the first interface in the first display area, and displays the second interface in the second display area, receive an eighth operation entered by the user;

display a seventh interface on the display in full screen in response to the eighth operation, wherein the seventh interface comprises interface content of the first interface and interface content of the second interface;

when the electronic device displays the third interface in the first display area, and displays the home screen in the second display area, receive a ninth operation entered by the user; and in response to the ninth operation, display the third interface in the first display area, and display an eighth interface in the second display area, wherein the eighth interface comprises interface content of the first interface, interface content of the second interface, and interface content of the fourth interface, wherein an operation manner of the ninth operation is the same as an operation manner of the eighth operation.

14. The electronic device according to claim 10, wherein the electronic device is further to:

when the electronic device displays the first interface in the first display area, and displays the second interface in the second display area, receiving a tenth operation entered by the user; and displaying interface content of the first interface or interface content of the second interface on the display in full screen in response to the tenth operation.

15. The electronic device according to claim 10, wherein the first display area comprises a first control, wherein the second display area comprises a second control, and wherein, before the receiving a third operation entered by the user in the first display area, the first control is displayed in a first state, and the second control is displayed in the first state; and wherein the electronic device is further to:

switch, in response to the third operation, the first control from being displayed in the first state to being displayed in a second state.

16. The electronic device according to claim 15, wherein the electronic device is further to:

receive a thirteenth operation entered by the user for the first control, and verify a user identity in response to the thirteenth operation; and if the verification succeeds, switch the first control from being displayed in the second state to being displayed in the first state.

17. The electronic device according to claim 15, wherein the electronic device is further to:

obtain a biometric feature of the user;

determine that the biometric feature matches a pre-stored biometric feature; and receive a fourteenth operation entered by the user for the first control, and switch, in response to the fourteenth operation, the first control from being displayed in the second state to being displayed in the first state.

18. The electronic device according to claim 15, wherein the electronic device is further to:

obtain a biometric feature of the user;

determine that the biometric feature does not match a pre-stored biometric feature;

receive a fifteenth operation entered by the user, and verifying, by the electronic device, a user identity in response to the fifteenth operation; and if the verification succeeds, switch the first control from being displayed in the second state to being displayed in the first state.

19. A non-transitory computer-readable storage medium, comprising instructions, wherein when the instructions are run on an electronic device, the electronic device is caused to:
- display a first interface of a first application in a first display area of the display, and display a second interface of a second application in a second display area of the display;
- receive a first operation entered by a user, and display a home screen of the electronic device on the display in full screen in response to the first operation;
- display a third interface of a third application in the first display area, and display a fourth interface of a fourth application in the second display area in response to a second operation entered by the user;
- switch a split screen locking control from a first display state to a second display state to enable a split screen locking function of the electronic device, in response to an operation by the user;
- receive a third operation entered by the user in the first display area, wherein the third operation is to lock display content in the first display area; and
- invoke an activity task stack corresponding to the first display area based on the third operation, to set a lock status of the activity task stack;
- switch a display status of a lock control of the first display area to a locking state based on the lock status of the activity task stack;
- receive a fourth operation entered by the user; and
- in response to the fourth operation, display the third interface in the first display area, and display the home screen in the second display area, wherein an operation manner of the fourth operation is the same as an operation manner of the first operation.

20. The non-transitory computer-readable storage medium according to claim 19, wherein the electronic device is further to:
- receive a fifth operation entered by the user for the third interface; and
- in response to the fifth operation, display the third interface in the first display area, and display a fifth interface of the third application in the second display area.

* * * * *